(12) United States Patent
King et al.

(10) Patent No.: US 9,189,538 B2
(45) Date of Patent: Nov. 17, 2015

(54) SYSTEM FOR ESTIMATING A DISTRIBUTION OF MESSAGE CONTENT CATEGORIES IN SOURCE DATA

(75) Inventors: Gary King, Brookline, MA (US); Daniel Hopkins, Cambridge, MA (US); Ying Lu, Loveland, CO (US)

(73) Assignee: President and Fellows of Harvard College, Cambridge, MA (US)

( * ) Notice: Subject to any disclaimer, the term of this patent is extended or adjusted under 35 U.S.C. 154(b) by 524 days.

(21) Appl. No.: 13/445,257

(22) Filed: Apr. 12, 2012

(65) Prior Publication Data
US 2012/0215784 A1    Aug. 23, 2012

Related U.S. Application Data

(63) Continuation of application No. 12/077,534, filed on Mar. 19, 2008, now Pat. No. 8,180,717.

(60) Provisional application No. 60/919,093, filed on Mar. 20, 2007.

(51) Int. Cl.
| | |
|---|---|
| *G06F 17/30* | (2006.01) |
| *G06N 99/00* | (2010.01) |
| *G06K 9/62* | (2006.01) |

(52) U.S. Cl.
CPC ........ *G06F 17/30705* (2013.01); *G06K 9/6256* (2013.01); *G06K 9/6277* (2013.01); *G06N 99/005* (2013.01)

(58) Field of Classification Search
USPC ...................................................... 706/20, 21
See application file for complete search history.

(56) References Cited

U.S. PATENT DOCUMENTS

| | | |
|---|---|---|
| 6,360,234 B2 | 3/2002 | Jain et al. |
| 6,567,980 B1 | 5/2003 | Jain et al. |
| 6,795,793 B2 | 9/2004 | Shayegan et al. |
| 6,877,134 B1 | 4/2005 | Fuller et al. |

(Continued)

OTHER PUBLICATIONS

Goodner et al., Orange, Mandarin, and Hybrid Classification Using Multivariate Statistics Based on Carotenoid Profiles, J. Agric. Food Chem. 49, 1146-1150 [online], 2001 [retrieved on Jun. 20, 2014]. Retrieved from the Internet<URL: http://pubs.acs.org/doi/pdf/10.1021/jf000866o>.*

(Continued)

*Primary Examiner* — Jeffrey A Gaffin
*Assistant Examiner* — Nathan Brown, Jr.
(74) *Attorney, Agent, or Firm* — Morgan, Lewis & Bockius LLP

(57) ABSTRACT

A method of computerized content analysis that gives "approximately unbiased and statistically consistent estimates" of a distribution of elements of structured, unstructured, and partially structured source data among a set of categories. In one embodiment, this is done by analyzing a distribution of small set of individually-classified elements in a plurality of categories and then using the information determined from the analysis to extrapolate a distribution in a larger population set. This extrapolation is performed without constraining the distribution of the unlabeled elements to be equal to the distribution of labeled elements, nor constraining a content distribution of content of elements in the labeled set (e.g., a distribution of words used by elements in the labeled set) to be equal to a content distribution of elements in the unlabeled set. Not being constrained in these ways allows the estimation techniques described herein to provide distinct advantages over conventional aggregation techniques.

16 Claims, 18 Drawing Sheets

(56) References Cited

U.S. PATENT DOCUMENTS

| 7,188,079 B2 | 3/2007 | Arnett et al. |
|---|---|---|
| 7,200,606 B2 | 4/2007 | Elkan |
| 2005/0108001 A1 | 5/2005 | Aarskog |

OTHER PUBLICATIONS

Quinn et al., "An automated method of topic-coding legislative speech over time with application to the 105th-108th US senate," Annual meetings of the society for political methodology (2006).
Ragsdale, "Strong feelings: emotional responses to presidents," Political behavior, vol. 13, No. 1, pp. 33-65 (1991).
Rosset et al., "A method for inferring label sampling mechanisms in semi-supervised learning," Advances in neural Information processing systems (2004).
Sartori, "Concept misformation in comparative politics," Amer. political Science Review, vol. 64, pp. 1033-1053 (1970).
Setel et al., "Sample registration of vital events with verbal autopsy: a renewed commitment to measuring and monitoring vital statistics," Bulletin of the world health organization, vol. 83, pp. 611-617 (2005).
Setel et al., "Validity of verbal autopsy procedures for determining causes of death in Tanzania," Tropical medical and international health, vol. 11, No. 5, pp. 681-696 (2006).
Shimodaira, "Improving predictive inference under covariate shift by weighting the log-likelihood function," Journal of statistical planning and inference, vol. 90, No. 2, pp. 227-224 (2000).
Sibai et al., "Non-communicable disease mortality rates using the verbal autopsy in a cohort of middle aged and older populations in Beirut during wartime, 1983-1993," Journal of epidemiology and community health, vol. 55, pp. 271-276 (2001).
Simon et al., "Dimensional reduction of word-frequency data as substitute for intersubjective content analysis," Political analysis, vol. 12, No. 1, pp. 63-75 (2004).
Smith et al., "A Bayesian network framework for reject inference," Proceedings of the ACM SIGKDD international conference on knowledge discovery and data mining (KDD), pp. 286-295 (2004).
Soleman et al., "Verbal autopsy: current practices and challenges," Bulletin of the world health organization, vol. 84, pp. 239-245 (2006).
Soleman et al., "WHO technical consultation on verbal autopsy tools," Geneva: http://www.who.int/healthinfo/statistics/mort-verbalautopsy.pdf (2005).
Stefanski et al., "Stimulation-extrapolation: the measurement error jack-knife," Journal of the American statistical association, vol. 90, pp. 1247-1256 (1995).
Thomas et al., "Get out the vote: Determining support or opposition from congressional floor-debate transcripts," Proceedings of EMNLP, pp. 327-335: http://www.cs.cornell.edu/home/llee/papers/tpl-convote.home.html (2006).
Widmer et al., "Learning in the presence of concept drift and hidden contexts," Machine learning, vol. 23, No. 1, pp. 69-101 (1996).
Yang "Validation of verbal autopsy procedures for adult deaths in China," International journal of epidemiology, Advance Access published Sep. 6, 2005, doi:10.1093/ije/dyi181 (2005).
Adamic et al., "The political blogosphere and the 2004 US election: divided they blog," Proceedings of the 3rd international workshop on link discovery, pp. 36-43 (2005).
Anker, "Investigating cause of death during an outbreak of Ebola virus hemorrhagic fever: Draft verbal autopsy instrument," Geneva: World health organization (2003).
Benoit et al., "Estimating Irish party policy positions using computer wordscoring: the 2002 election= a research note, "Irish political studies, vol. 18, No. 1, pp. 97-107 (2003).
Berelson et al., "Detecting collaboration in propaganda," Public opinion quarterly, vol. 11, No. 2, pp. 244-253 (1947).
Bickel et al, "Dirichlet-enhanced spam filtering based on biased samples," Proceedings of the neural information processing systems conference (NIPS) (2006).
Bishin et al., "Character counts: Honesty and fairness in election 2000," Public opinion quarterly, vol. 70, No. 2, pp. 235-248 (2006).
Blumer "Public opinion and public opinion polling," American sociological review, vol. 13, pp. 542-549 (1948).
Boulle et al., "A case study of using artificial neural networks for classifying cause of death from verbal autopsy," International journal of epidemiology, vol. 30, pp. 515-520 (2001).
Carr, "24-hour newspaper people," New York times (2007).
Carroll et al., "Nonparametric regression in the presence of measurement error," Biometrika, vol. 86, No. 3, pp. 541-554 (1999).
Cavnar et al., "N-Gram-Based text categorization," Proceedings of the third annual symposium on document analysis and information retrieval, pp. 161-175 (1994).
Chandramohan et al., "Effect of misclassification of causes of death in verbal autopsy: can it be adjusted," International journal of epidemiology, vol. 30, pp. 509-514 (2001).
Chandramohan et al., "Verbal autopsies for adult deaths: Issues in their development and validation," International journal of epidemiology, vol. 23, No. 2, pp. 213-222 (1994).
Chang et al. "LIBSVM: a library for support vector machines," http://www.csie.ntu.edu.wi~cjlin/libsvm (2001).
Collier et al., "Conceptual 'stretching' revisited: Adapting categories in comparative analysis," American political science review, vol. 87, pp. 845-855 (1993).
Converse, "changing conceptions of public opinion in the political process," The public opinion quarterly, vol. 51, part 2: supplement: 50th anniversary Issue: S12-524 (1987).
Cook et al., "Simulation-extrapolation estimation in parametric measurement error models," Journal of the American statistical association, vol. 89, pp. 1314-1328 (1994).
Das et al., "Yahoo! for Amazon: Opinion extraction from small talk on the web," Sanjiv Das, Department of finance Santa Clara University (2001).
Daum, "Frustratingly easy domain adaption," Proceedings of the 45th annual meeting of the association for computational linguistics (ACL) (2007).
Dawes et al., "Clinical versus actuarial judgment," Science vol. 243, pp. 1668-1674 (1989).
Drezner et al., "The wpoer and politics of blogs," American political science association, Chicago, IL (2004).
Elkan, "Clustering documents with an exponential-family approximation of the dirichlet compound multinomial distribution," Proceedings of the twenty-third international conference on machine learning (2006).
Elkan, "The foundations of cost-sensitive learning," Proceedings of the seventeenth international joint conference on artificial intelligence (2001).
Franklin, "Estimation across data sets: Two-stage auxiliary instrumental variables estimation," Political analysis, vol. 1, No. 1, pp. 1-23 (1989).
Gajalakshmi et al., "Verbal autopsy of 80,000 adult deaths in Tamilnadu, South India," BMC public health, vol. 4 (2004).
Gelman et al., "Not asked and not answered: Multiple imputation for multiple surveys," Journal of the American statistical association, vol. 93, pp. 846-857, http://gking.harvard.edu/files/abs/not-abs.shtml. (1999).
Gerner et al., "Machine coding of event data using regional and international sources," International studies quarterly, vol. 38, No. 1, pp. 91-119 (1994).
Grindle, "Going local: Decentralization, democratization, and the promise of good governance," Kennedy School of Government, Harvard University (2005).
Hand, "Classifier technology and the illusion of progress," Statistical science, vol. 21, No. 1, pp. 1-14 (2006).
Hindman et al., "Googlearchy: How a few heavily-linked sites dominate politics on the web," Midwest political science association, Chicago, IL (2003).
Hopkins et al., "Extracting systematic social science meaning from text," Harvard University, pp. 1-38, http://gking.harvard.edu/files/abs/words-abs.shtml. (2007).
Jiang et al., "Instance weighting for domain adaption in NLP," Proceedings of the 45th annual meeting of the association for computational linguistics, (ACL), pp. 264-271 (2007).

(56) References Cited

OTHER PUBLICATIONS

Kalter, "The validation of interviews for estimating morbidity," Health policy and planning, vol. 7, No. 1, pp. 30-39 (1992).

King et al., "An automated information extraction tool for international conflict data with performance as good as human coders: A rare events evaluation design," International organization, vol. 57, pp. 617-642, http://gking.harvard.edu/files/abs/infoexabs.shtml. (2003).

King et al., "Analyzing incomplete political science data: An alternative algorithm for multiple imputation," American political science review, vol. 95, pp. 49-69, http://gking.harvard.edu/files/abs/evil-abs.shtml. (2001).

King et al., "The dangers of extreme counterfactuals," Political analysis, vol. 14, No. 2, pp. 131-159, http://king.harvard.edu/files/abs/counterft-abs.shtml. (2006).

King et al., "Verbal autopsy methods with multiple causes of death," Statistical science, pp. 1-24, http://gking.harvard.edu/files/abs/vamc-abs.shtml. (2007).

King et al., "Verbal autopsy methods with multiple causes of death," pp. 1-13, http://gking.harvard.edu/files/abs/words-abs.shtml. (2006).

Kolari et al., "SVMs for the Blogosphere: Blog Identification and splog detection," American association for artificial intelligence spring symposium on computational approaches to analyzing weblogs (2006).

Kolbe et al., "Content-analysis research: An examination of applications with directives for improving research reliability and objectivity," The journal of consumer research, vol. 18, No. 2, pp. 243-250 (1991).

Kuchenohoff et al., "A general method for dealing with misclassification in regression: The misclassification SIMEX," Biometrics, vol. 62, pp. 85-96 (2006).

Laver et al., "Extracting policy positions from political texts using words as data," American political science review, vol. 97, No. 2, pp. 311-331 (2003).

Lenhart et al., "Bloggers: A portrait of the internet's new storytellers," http://www.pewinternet.org/. (2006).

Levy et al., "A three population model for sequential screening for bacteriuria," American journal of epidemiology, vol. 91, pp. 148-154 (1970).

Lopez et al., "Life tables for 191 countries. Geneva: World health organization," (2000).

Lyman et al., "How much information 2003," Technical report University of California, http://www2.sims.berkeley.edu/research/projects/how-much-info-2003 (2003).

Madsen et al., "Modeling word burstiness using the Direichlet distribution," Proceedings of the twenty Second international conference on machine learning, pp. 545-553 (2005).

Marcus, "Emotions in politics," Annual Review of political science, vol. 3, pp. 221-250 (2006).

Marcus, "The structure of emotional response: The 1984 presidential candidates," American political science review, vol. 82, No. 3, pp. 737-761 (1988).

Mathers et al., "Counting the dead and what they died from: An assessment of the global status of cause of death data," Bulletin of the world health organization, vol. 83, pp. 171-177 (2005).

Maude et al, "The effect of different sensitivity, specificity and cause-specific mortality fractions on the estimation of differences in cause specific mortality rates," Epidemiology, vol. 26, No. 5, pp. 1097-1106 (1997).

Morris et al, "Predicting the distribution of under-five deaths by cause in countries without adequate vital registration systems," International journal of epidemiology, vol. 32, pp. 1041-1051 (2003).

Pacque-Margolis et al., "Application of the verbal autopsy during a clinical trial," Social science medicine, vol. 31, No. 5, pp. 585-591 (1990).

Pang et al, "Thumbs up? Sentiment classification using machine learning techniques," Proceedings of the conference on empirical methods in natural language processings, pp. 79-86 (2002).

Porter, "An algorithm for suffix stripping," Program, vol. 14, No. 3, pp. 130-137 (1980).

Quigley et al, "Validity of data-derived algorithms for ascertaining causes of adult death in two African sites using verbal autopsy," Tropical medicine and international health, vol. 5, pp. 33-39 (2000).

Gamson, "Talking politics," New York, NY, Cambridge Univ. Press (1992).

Ginsberg, "The captive public: How mass opinion promotes state power," New York, NY, Basic Books (1986).

Herbst, "Numbered voices: How opinion polling has shaped American politics," Chicago, IL: Univ. of Chicago Press (1993).

Hoppa et al., "Paleodemography," Cambridge, UK:, Cambridge Univ. Press (2002).

Huckfeldt et al., "Citizens, politics and social communication," New York, NY, Cambridge Univ. Press (1995).

Jones et al., "The politics of attention: How government prioritizes problems," Chicago, IL: Univ. of Chicago Press (2005).

Krippendorff, "Content analysis: an introduction to its methodology," Sage Publications (2003).

Lee, "Mobilizing public opinion: Black insurgency and racial attitudes in the civil rights era," Chicago, IL: Univ. of Chicago Press (2002).

Little et al, "Statistical analysis with missing data," John Wiley & Sons, Inc. 2nd edition (2002).

Mutz, "Impresonal influence: how perceptions of mass collectives affect political attitudes," New York, NY, Camrbidge Univ. Press (1998).

Neuendorf, "The content analysis guidebook," Sage publications (2001).

Rokeach, "The nature of human values," New York: Free press (1973).

Thisted, "Elements of statistical computing: numerical computation," Florida: Chapman and Hall (1988).

Verba et al., "Voice and equality: civic volunteerism in American politics," Cambridge, MA: Harvard Univ. Press (1995).

Waples et al., "What reading does to people: A summary of evidence on the social effects of reading and a statement of problems for research," The Univ. of Chicago Press (1940).

Zaller, The anature and origins fo mass opinion, New York, NY, Cambridge Univ. Press (1992).

King et al., "Comparing incomparable survey responses: Evaluating and selecting anchoring vignettes," Political analysis advance access, pp. 1-21 (2006).

Gakidou et al., "Death by survey: Estimating adult mortality without selection bias from sibling survival data," Demography, vol. 43, No. 3, pp. 569-585 (2006).

International search report and written opinion mailed Jul. 1, 2008 for international application No. PCT/US2008/003606.

International preliminary report on patentability mailed Oct. 1, 2-009 for international application No. PCT/US2008/003606.

Koumpis, Automatic categorization of voicemail transcripts using stochastic language models [online] retrieved on Jul. 21, 2011, http://server.quid5.net/~koumpis/pubs/pdf/tsd04.pdf (2004).

Sojka et al., "Text, speech and dialogue," 7th international conference, TSD 2004 Brno, Czech Republic, Sep. 8-11, 2001 proceedings [online], retrieved on Jul. 21, 2011, http://citeseerx.ist.psu.edu/search?q=%22Text%2C+Speech+and+Dialogue%2C+7th+Internatioanl +Conference%2C+TSD+2004 (2004).

Kuchenhoff et al., A General method for dealing with misclassification in regression: The misclassification SImEX, [online], retrieved on Jul. 25, 2011, http:www.musc.edu/~richa/journalclub/MC-SIMEX-Biometrics.pdf. (2006).

* cited by examiner

SYSTEM FOR ESTIMATING A DISTRIBUTION OF MESSAGE CONTENT CATEGORIES IN SOURCE DATA

CROSS-REFERENCE TO RELATED APPLICATION

This application is a continuation of and claims the benefit of U.S. Application Serial No. 12/077,534, now U.S. Patent No. 8,180,717, filed Mar. 19, 2008, which claims the benefit under 35 U.S.C. §119(e) of U.S. Provisional Application No. 60/919,093, entitled "Extracting Systematic Social Science Meaning from Text," filed Mar. 20, 2007.

FIELD OF THE INVENTION

This invention relates to the field of data mining systems. More particularly, it relates to a system and method for estimating the distribution of message content among a set of categories, taking as input data from a source of unstructured, structured, or only partially structured source data.

BACKGROUND

Efforts to extract meaning from source data—including documents and files containing text, audio, video, and other communication media—by classifying them into given categories, have a long history. In Europe in the late 1600s, for example, the Church kept track of the spread of nonreligious printed matter that it thought challenged its authority by classifying newspaper stories and studying the resulting distribution. Some early prominent social scientists also did systematic textual analysis, including on the social-psychological effects of reading different material, and on evidence for cross-national coordination in war propaganda.

Content analyses like these have spread to a vast array of fields, with automated methods now joining projects based on hand coding. Systematic content analyses of all types have increased at least six-fold from 1980 to 2002. Moreover, the recent explosive increase in web pages, blogs, emails, digitized books and articles, audio recordings (converted to text), and electronic versions of formal government reports and legislative hearings and records creates many challenges for those who desire to mine such voluminous information sources for useful meaning.

Applicants have appreciated that, frequently, it is not the specific content of an individual element of source data (e.g., a document in a set of documents or one or thousands of calls to a call center) that is of interest, but, rather, a profile or distribution of the data elements among a set of categories. Many conventional techniques rely on individual classification of elements of source data (i.e., individual documents in a set of documents) to determine such a distribution. This is done in a variety of ways, including automated analysis of the elements and/or hand coding of elements by humans. Individual classification of elements by hand coding may be done in any suitable manner, such as by having workers review individual elements, then categorize the elements based on their review. For large data sets, prior attempts at both hand coding and automated coding of each elements have proven time-consuming and expensive.

Conventional techniques for determining distribution of classifications have focused on increasing the percentage of individual elements classified correctly, and techniques for doing so, and then assuming an aggregate proportion of individually classified elements is representative of a distribution in a broader population of unexamined elements. Unfortunately, substantial biases in aggregate proportions such as these can remain even with impressive classification accuracy of individual elements, and the challenge increases with the size and complexity of the data set, leaving these conventional techniques unsuitable for many applications.

Accordingly, individual classification of elements of source data—including by automated analysis or hand coding—on a large scale is infeasible. Indeed, large-scale projects based solely on individual classification have stopped altogether in some fields. Applicants have appreciated, however, that there is a growing desire for performing analyses, including classification, of source data, and, correspondingly, a fast-growing need for automated methods for performing these analyses.

Accordingly, there is need for improved techniques for mining a set of data to determine useful properties, including a distribution of data elements among a set of categories of interest.

SUMMARY

In one embodiment, there is provided a computer-implemented method, the method comprising acts of receiving as input from a digital data source storing digital content a categorization of a first set of elements among a plurality of categories, each of the first set of elements being classified in one of the plurality of categories such that the first set has a first distribution of elements across categories; calculating an estimated distribution of elements in a second set among the plurality of categories without constraining the estimated distribution of elements in the second set to be equal to the first distribution of elements across categories of the first set; and outputting the estimated distribution of elements in the second set.

In another embodiment, there is provided a computer-implemented method, the method comprising acts of receiving as a first input from a computer storage medium storing digital content a categorization of a first set of elements among a plurality of categories, each of the first set of elements being classified in one of the plurality of categories such that the first set has a first distribution of elements across categories; receiving as a second input a second set of elements; calculating an estimated distribution of the elements in the second set among the plurality of categories to be different than the first distribution of the elements in the first set; and outputting the estimated distribution of elements in the second set.

In another embodiment, there is provided a computer-implemented method, the method comprising acts of receiving as input from a computer storage medium storing digital content a categorization of a first set of elements among a plurality of categories; calculating an estimated distribution of elements in a second set among the plurality of categories, wherein each of the first and second sets has a content distribution of content of elements, and wherein calculating is performed without constraining the second content distribution of content of the elements in the second set to be equal to a first content distribution of content of the elements in the first set; and outputting the estimated distribution of elements in the second set.

In another embodiment, there is provided a computer-implemented method, the method comprising acts of receiving as input from a computer storage medium a categorization of a first set of elements among a plurality of categories, the first set of elements having a distribution among the plurality of categories; calculating an estimated distribution of elements in a second set among the plurality of categories by applying only a single constraint between the first and second sets, the single constraint requiring that for a plurality of word stem profiles occurring in the first and second sets of elements, a prevalence of each of the word stem profiles in the elements in each of the categories is substantially similar for the first and second sets of elements; and outputting the estimated distribution of elements in the second set.

In another embodiment, there is provided a computer-implemented method, the method comprising acts of receiving as input a categorization of a first set of elements among a plurality of categories, the first set of elements having a first distribution among the plurality of categories; creating a first estimated distribution of elements in a second set among the plurality of categories by applying a first process for calculating the first estimated distribution of elements in the second set among the plurality of categories; modifying the first estimated distribution of elements in the second set among the plurality of categories to create a second estimated distribution of elements in the second set by applying information relating to estimated misclassifications performed by the first process on the second set of elements; and outputting the second estimated distribution.

In another embodiment, there is provided a computer-implemented method comprising acts of receiving as first input a categorization of a first set of elements among a plurality of categories, the first set of elements having a distribution among the plurality of categories; receiving as second input a first estimated distribution of elements in a second set among the plurality of categories that was created by applying a first process for estimating a distribution of elements in the second set among the plurality of categories; modifying the first estimated distribution of elements in the second set among the plurality of categories to create a second estimated distribution of elements in the second set by applying information relating to estimated misclassifications performed by the first process on the second set of elements; and outputting the second estimated distribution.

In another embodiment, there is provided a computer-implemented method, the method comprising acts of receiving as input a categorization of a first set of elements among a plurality of categories, each of the first set of elements being classified in one of the plurality of categories such that the first set has a first distribution of elements across categories; calculating an estimated distribution of elements in a second set among the plurality of categories without constraining the estimated distribution of elements in the second set to be equal to the first distribution of elements across categories of the first set; calculating a probability that a particular element of the second set is in a particular category; and outputting the probability that a particular element is in the particular category.

In another embodiment, there is provided a computer-implemented method, the method comprising acts of receiving as first input a categorization of a first set of elements among a plurality of categories, each of the first set of elements being classified in one of the plurality of categories such that the first set has a first distribution of elements across categories; receiving as second input an estimated distribution of elements in a second set among the plurality of categories calculated without constraining the estimated distribution of elements in the second set to be equal to the first distribution of elements across categories of the first set; calculating a probability that a particular element of the second set is in a particular category; and outputting the probability that a particular element is in the particular category.

In another embodiment, there is provided a computer-implemented method comprising acts of receiving as input an estimated distribution of elements in a set among a plurality of categories calculated without individually classifying elements in the set calculating a probability that a particular element of the set is in a particular category; and outputting the probability that a particular element is in the particular category.

In another embodiment, there is provided an apparatus comprising at least one computer-readable medium encoded with computer-executable instructions which, when executed, carry out the methods and techniques described herein; and at least one processor adapted to execute the computer-executable instructions.

In another embodiment, there is provided at least one computer-readable medium encoded with computer-executable instructions which, when executed, carry out the methods and techniques described herein.

DETAILED DESCRIPTION

Figure 1:
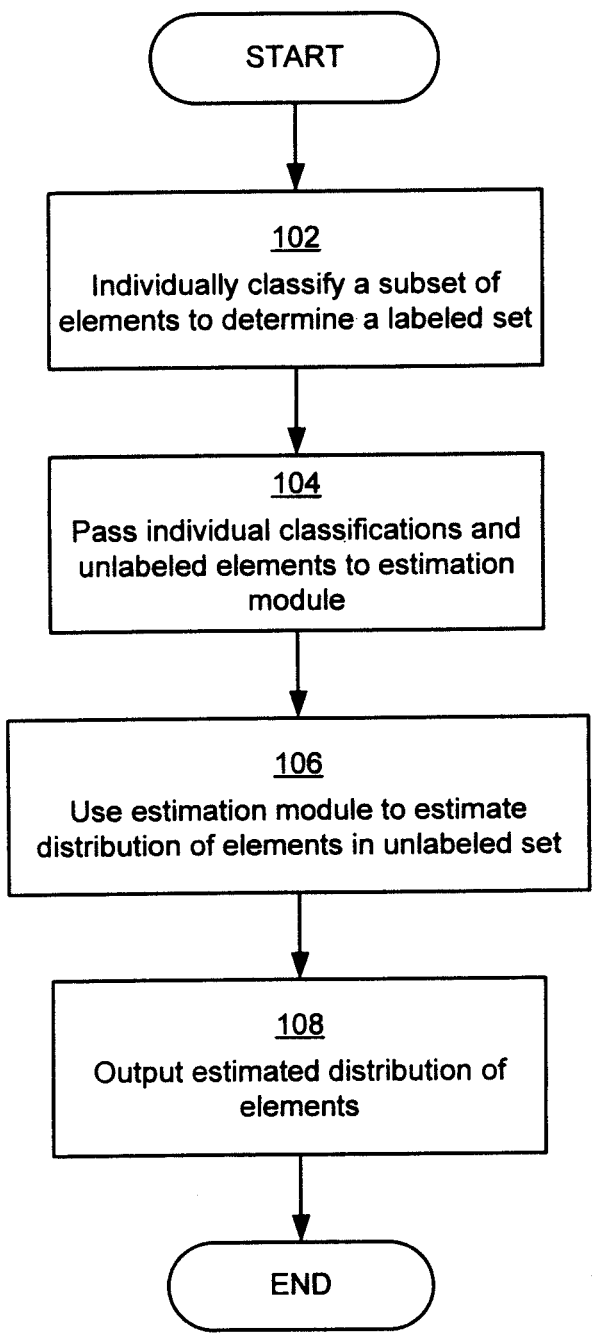
FIG. 1 is a flowchart of a generic process for estimating a proportional distribution of elements in source data without performing individual classification of all elements.

Conventional methods of automating analysis of source data all suffer from several distinct disadvantages. Classifying every individual element with total or near total accuracy, is, as a practical matter, infeasible with large data sets. As a result, sampling is often used instead. Some conventional methods, for example, require that a purely random sample be selected and examined. Examination of this sample will yield certain conclusions, and these conclusions are then assumed to apply to the broader set. As used herein, a "random sample" is a statistical term of art meaning that the particular subset of elements selected for examination has characteristics which closely mimic the characteristics of the broader element set. Selecting such a purely random subset is infeasible in most applications, but many techniques rely on an untenable assumption that such a sample has been procured and that it provides a statistically valid indication of the distribution of elements in the set as a whole. However, these techniques are inherently flawed if the sample is not truly random or if it is not large enough to reduce the margin of error to desired limits, or if classifications are in error. Some alternative conventional techniques attempt to bolster the assumptions by attempting to maximize the percent of individual elements correctly classified. However, imperfection leaves open the possibility of substantial estimation bias for the aggregate proportions of interest when the estimation method maximizes its capacity to predict each individual element's categorization as opposed to the overall distribution of elements across categories.

Applicants have further appreciated that the aim of providing accurate estimates of the proportion of elements in categories, particularly with attractive statistical properties, has not even been a goal of most conventional work in automated methods for predicting classification of elements of input source data. Instead, most conventional work, rather than estimating a proportion of elements in categories, has instead focused on accurately classifying a plurality of individual elements to determine an aggregate distribution in a set of labeled elements, then assuming the distribution holds true for a set of unanalyzed, unlabeled elements. As described above, there are significant, inherent problems with this approach, particularly with large data sets.

In contrast with these conventional approaches, the techniques disclosed herein are directed to a new method of computerized content analysis that gives "approximately unbiased and statistically consistent estimates" of a distribution of elements of structured, unstructured, and partially structured source data among a set of categories by analyzing a distribution of small set of individually-classified elements in a plurality of categories and then using the information determined from the analysis to extrapolate a distribution in a larger population set. As discussed in greater detail below, this extrapolation is performed without constraining the distribution of the unlabeled elements to be equal to the distribution of labeled elements, nor constraining a content distribution of content of elements in the labeled set (e.g., a distribution of words used by elements in the labeled set) to be equal to a content distribution of elements in the unlabeled set. Not being constrained in these ways allows the estimation techniques described herein to provide distinct advantages over conventional aggregation techniques, as discussed in greater detail below.

Embodiments of the method may be described below with reference to methods described by Daniel Hopkins and Gary King in "Extracting systematic social science meaning from text," published March, 2008, and available at http://gking.harvard.edu/ and in the file of this application in the United States Patent and Trademark Office, and incorporated herein by reference.

Structured, unstructured, and partially structured source data that may be analyzed by embodiments of the invention may comprise any suitable type or types of data in any suitable format. For example, elements of the source data may comprise textual, audio, and/or video data encapsulated in files, streams, database entries, or any other suitable data format. The elements of the source data may be supplied by or retrieved from any suitable source, such as structured or partially structured sources including customer feedback results submitted by customers or surveying companies (which may indicate, for examples, ratings from 1-10; ratings from "good" to "bad" or other ordered categories; ordered labels such as "red," "green," "blue" or others; and/or unstructured text such as general comments), or retrieved from unstructured sources including various web sites on the Internet such as blogs ("web logs") including text, audio, and/or video blog entries. The data to be analyzed may be associated with any suitable topic(s) or subject(s), including information related to marketing or advertising data, consumer products and services, financial services, politics or government, intelligence, healthcare and pharmaceuticals, education, and nonprofits, among others. The information to be analyzed may include opinions expressed by individuals, and the techniques described herein may be useful in determining an overall distribution of opinions in various categories (i.e., percentages of opinions in a "positive" and a "negative" categories, or any other suitable category or categories using any suitable stratification scheme) that may be used in responding to feedback received. For example, if the techniques described herein determine from source data that a company's product is, on the whole, being negatively described in blog entries, then the company may redesign the product or change a marketing strategy. Accordingly, the techniques described herein may be useful for providing information to brand managers, product managers, account managers and sales teams, marketing departments, politicians, government agencies, investors and fund managers, universities, business development teams, strategy and executive teams, agents for high profile individuals (e.g., publicists), and consumers, among others.

One aspect of the invention, embodying at least one object, is directed to a system and method that receives as input data a potentially large set of elements of source data—examples of which are described below—and a seed set of data from the same source (which may or may not be a subset of the potentially large set) which has been individually classified into a selected set of mutually exclusive categories. The seed set may, but need not, be a random sample from the large set. With this information, an exemplary approach in accordance with one embodiment of the invention gives approximately unbiased and statistically consistent estimates of the proportion of all the elements in each category without individually classifying the elements of the source data other than the seed set.

Another aspect of the invention is directed to a system and computer-implemented method for improving the accuracy of the results of conventional classification techniques. For example, a process may receive as input an estimated distribution of elements in categories from a conventional aggregation technique, and perform correction of the estimated proportions of elements in categories to determine a more accurate distribution of elements in the categories.

Another aspect of the invention is directed to a system and computer-implemented method for estimating an individual classification for elements in an unlabeled set of elements of source data. Some implementations of this technique may accept as input information determined from an individual classification of elements in a labeled set of elements, and use the information to perform an estimation of a category for a particular element in an unlabeled set of elements of source data. Such a technique may be used in connection with, or as an alternative to, techniques described herein for estimating a distribution of an unlabeled set of elements in categories without performing individual classification of the unlabeled set of elements.

It should be appreciated that the various aspects of the invention discussed above may be implemented alone or in any suitable combination with one another, as embodiments of the invention may implement any one or aspects of the invention.

It should be appreciated that, as used herein, an estimator is a computer-implemented procedure, algorithm, or method that is applied to a set of structured or unstructured source data (e.g., text documents) and yields a set of "estimates" (e.g., estimated distribution of elements in categories). A "statistically consistent" estimator is one which, when applied to a set of data, converges to the true value being estimated as the sample size gets larger. An "approximately unbiased" estimator is one which, on average across repeated samples drawn from the same population, produces an estimate that is equal to the true value being estimated.

It should also be appreciated that any suitable technique may be implemented for providing the source data to computers operating according to the principles described herein. For example, the source data may be information which was submitted to an organization (or a digitized version of submitted information) in the form of comment cards, phone conversations, e-mails, voice mail messages, or any other format, and/or the source data may be information which was retrieved by an organization in the form of random surveys or surveys of persons or users fitting a particular category (e.g., known users of a product or people in a certain demographic).

Alternatively or additionally, the source data may be retrieved by an organization or a process from publicly-accessible information, such as by retrieving published works such as books, articles, papers, and/or web pages. Retrieving publicly-accessible information may be done in any suitable manner, such as by using any suitable web crawler.

The techniques described herein may be implemented in of various computing systems, examples of which are described in greater detail below. Such systems generally involve the use of suitably-configured data processing equipment to implement a number of modules, each providing one or more operations needed to complete execution of such techniques or methods. Each module may be implemented in its own way; all need not be implemented the same way.

As an example of such implementations, the modules may be implemented in a computing apparatus operating as one or more web servers, which may act to accept input from client computers, receive necessary information from a digital storage source (e.g., local and/or remote computer storage media such as a register, memory, or hard disk, a stream of data from an input device or over a network, or from another process executing on the web server), and provide information including web pages to client computers. In one implementation of some of the techniques described herein, a server may implement a web crawler, accepting as input one or more source URLs of web pages to begin crawling, and return to the server the text of web pages found at the URLs. The web crawler may then proceed to retrieve the text of web pages to which the web pages of the original URLs linked, and the text of the web pages to which the second set of web pages linked, and so on to whatever limit is imposed, to retrieve a data set of information. The text of the data set may then be filtered, preprocessed, and analyzed according to any suitable technique, and estimations of a distribution of the elements (i.e., web pages) in the data set may be calculated according to one or more of the techniques described herein. The estimations may then be provided to a user of a client computer in a desired form, such as a web page comprising an analysis of the estimations, such that the user may review the information and make decisions based on it. For example, if the source data set is filtered such that web pages that do not discuss a particular product X are eliminated from the data set, the analysis may yield a set of estimations of how the web pages describe product X across categories (e.g., what percentage of web pages describe it as a good product, and which describe it as a bad product). The estimations may then allow the user to, for example, determine whether product X is well-regarded in the market or if changes need to be made to the product and/or to marketing strategies.

FIG. 1 shows an exemplary process 100 which may implement some, but not necessarily all, of the principles described herein. It should be appreciated that process 100 is merely illustrative of the types of processes that may be implemented by some embodiments, and that other processes may be implemented.

As shown generally in FIG. 1, a process 100 implementing some of the principles disclosed herein may, at block 102, receive from a digital storage medium an individually classified small set (e.g., subset of the source data), with the classification based on a set of chosen categories. Each datum is classified into a single category. This may be done in any suitable manner, including by any suitable automated techniques for performing individual classification and/or by hand coding. (Hand coding, as it involves the exercise of human judgment, is outside the scope of this invention. Thus, block 102 may be considered optionally included in some embodiments.) While in some embodiments of the invention elements of the small set may be chosen for having specific qualities, embodiments of the invention may operate with any suitable small set, including a randomly- or pseudo-randomly-selected small set, and any small set having characteristics that differ in dramatic but specific ways from characteristics of the broader population of source data.

In act 104, an estimation module receives the individual classifications determined in act 102 and, in act 106, analyzes the remaining elements in the source data (i.e., the elements not classified in act 102) without determining individual classifications for these remaining elements. In act 108, the estimation module outputs a distribution of elements among categories that may be used in analyzing and responding to the source data. For example, as discussed above, if the source data is a plurality of customer opinions, a product designer may use the distribution of opinions to redesign a product or redesign a marketing strategy.

Alternative processes for implementing the techniques shown in FIG. 1 are described in greater detail below in connection with, for example, FIG. 5.

Figure 2:
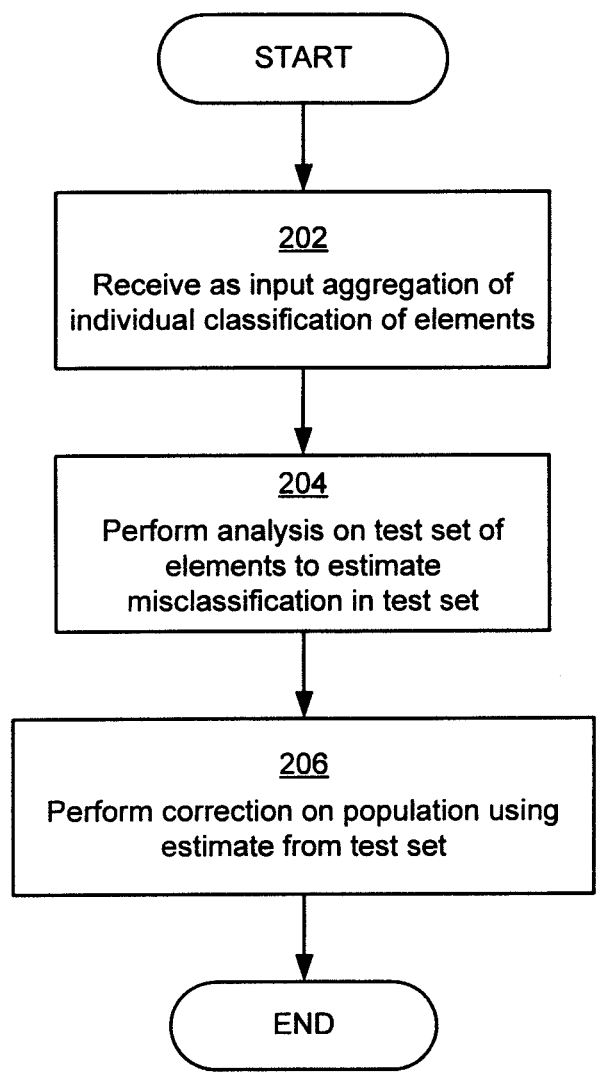
FIG. 2 is a flowchart of a generic process for performing correction of results of a conventional process for performing aggregation of individual classification.

A second exemplary process for implementing the techniques described herein is shown in FIG. 2 as process 200. As before, it should be appreciated that process 200 is merely exemplary of the types of processes which may be implemented in accordance with the principles described herein, and that other processes are possible.

Process 200 implements a technique for performing correction of the distribution estimations of a conventional classification process. Process 200 begins in block 202, wherein an estimation module receives as input an aggregation of individual classifications performed by such a conventional classification method. In block 204, the estimation module estimates misclassification probabilities by examining a test set of elements in a labeled set of elements in the input. In block 206, the misclassification estimations of block 204 are then used to perform correction on the estimates accepted as input in block 202, and the process ends. Alternative processes for implementing the techniques shown in FIG. 2 are described in greater detail below in connection with, for example, FIG. 4.

Embodiments of the invention work without parametric modeling assumptions and even when the subsample differs dramatically from the target population in both the language used and the element category frequencies. Although hand coding with much larger numbers of elements is infeasible, embodiments of the invention may scale up easily. Embodiments of the invention may also go a step further and correct for the less-than-perfect levels of inter-coder reliability commonly seen in applications. This latter correction may involve more uncertainty than the first methodological advance, but estimates from it will normally be preferable even compared to estimates from directly individually classifying all elements in the population.

These advances were enabled, in part, by Applicants' appreciation that one of the common goals in previous approaches that was of interest to scholars in computer science, statistics, text data mining, and computational linguistics was not of much interest for many social science applications, and thus could be dropped. That is, embodiments of the invention estimate the proportion of elements within each category the user specifies, but do so without the intermediate step of classifying individual elements and then calculating the proportion within each category. This is an important limitation for some purposes, but not for most social science applications. To be clear, individual-level classifications, when available, provide more information than aggregates, since they sometimes enable one to aggregate in unanticipated ways or serve as variables in regression-type analyses, but the quantities of real interest to social scientists rarely seem to be these individual classifications. It appears that a similar point also applies to related academic areas.

Thus, for example, some embodiments of the invention may not be useful in to sorting constituents' letters to a member of Congress by policy area, but may be useful for accurately estimating the distribution of letters across policy areas—which makes the method useless in helping a legislator route letters to the most informed staffer to draft a response, but would be useful in helping the legislator track intensity of constituency expression by policy. Similarly, some embodiments of the invention cannot classify individual email as spam or not, but could accurately estimate the fraction of email that is spam—which makes the method less useful as a spam filter but more useful for understanding the sociology of the Internet. Moreover, embodiments of the method will normally give more accurate estimates of the aggregate proportion of letters by policy, or emails which are spam, or customer opinions that are positive, than conventional techniques which sort the predictions of the best available classification techniques into categories and compute proportions.

Although the availability of textual material of interest to social scientists is growing dramatically, learning how to analyze these texts is not always straightforward. Many of the steps required are more difficult than they seem at first, and few are discussed in much detail in the literature.

In the examples given below, Applicants describe using the techniques described herein to analyze blogs for determining distribution of opinions on selected topics. However, it should be appreciated that embodiments of the invention are not limited to analyzing blogs or any other specific type of source data, and can be as easily applied to any set of source data, including natural language text documents such as speeches, open ended survey responses, multiple choice and other structured survey or similar responses, candidate web sites, congressional legislation, judicial opinions, newspaper editorials, company reports, private diaries, treaties, scholarly journal articles, or others, and any of the sources described above.

Description of Blogs

Blogs are postings on the Web from time to time, in the form of a diary (i.e., dated entries), usually listed in reverse chronological order. Anyone may create and own a blog (for free), and she may post on it whatever she wishes and completely determine the content of what is seen by readers. A minority of blogs are read widely whereas others are read by only a few close friends or associates, but it is the opinions expressed that are interest in this example, not the readers or readership. Some blogs allow comments on the posts from others, but the focus in this example is on the main posts by the blog author. Posts sometimes include only a sentence or two, and typically are about a paragraph in length, but sometimes go on for several printed pages. The growth of blogs has been explosive, from essentially none in 2000 to estimates in 2007 that ranged from 39 to 100 million worldwide.

These developments have led to the widespread view that "we are living through the largest expansion of expressive capability in the history of the human race" (Carr, D. "24-Hour Newspaper People." *New York Times,* 15 Jan., 2007)) Blogs give individuals the ability to publish their views to a potentially worldwide audience for free, and at the same time give social scientists the ability to monitor the views of tens of millions more people on a daily basis than any previous technology in history. What was once studied with a single snapshot of a few thousand brief survey responses can now be studied with the daily views of millions of people. Blogs capture what might have been in an earlier era hallway conversations, soapbox speeches, musings of individuals in their private diaries, or purely private thoughts, and their ease of use encourages many more, and more detailed, expressions of individual opinions than ever before.

Exemplary applications, described below, of the techniques described herein make reference to an exemplary implementation of one embodiment directed to the ongoing national conversation about the American presidency, including specifically posts that are all or in part about President George W. Bush or any of the major contenders for the 2008 major party presidential nominations. Conversations like these have gone on throughout American history, but the development of this new technology (blogs) means that for the first time ordinary Americans can participate, without even having to stand on the soapbox in their public squares. In the examples described below, the techniques described herein may be useful in measuring, on a daily basis, how positive or negative the average sentiment is in the "blogosphere" (a term referring to a collection of blogs) about each politician on a list. This information may then be useful for politicians in tracking voter responses to the positions they take, such that they may focus their efforts on a particular topic or topics in response to the data (e.g., if results show that a large proportion of blog authors believe a candidate to be weak on national security, the candidate may tailor his or her campaign to demonstrate strength in this area). Just like survey researchers, this embodiment of the invention has no special interest in the opinions of any specific individual, only the social science generalization about each politician, which might translate roughly into "the word on the street." In essence, this embodiment of the invention allows users to create a type of "daily opinion poll" that summarizes the views of people who join the national conversation to express an opinion.

Previous efforts to measure sentiments from the national conversation include more limited samples, such as studies of newspaper editorials or Sunday morning talk shows. Embodiments of the invention, rather than focusing exclusively on blogs, could alternatively or additionally analyze these information sources, although many of the individuals involved—including politicians, journalists, and pundits—now also have their own blogs.

It should be appreciated, however, that embodiments of the invention are not limited to the above goals or to the exemplary implementations described below in conjunction with the blog research example, as embodiments of the invention may be implemented in any suitable manner to determine the proportional distribution of any suitable collection of source data among any desired categories.

Overview of Application of these Techniques to Blogs

In one example, posts from highly political people who frequently blog about politics are collected, as are the postings of ordinary Americans who normally blog about gardening or their love lives but choose to join the national conversation about the presidency for one or more posts. Bloggers' opinions are counted when they decide to post and not otherwise. In this example (and in other, similar applications of the techniques described herein), the specific goal may be to determine an overall distribution of the elements of the source data received by an estimation module operating according to the techniques described herein into one of the following seven categories:

| Label | Category |
|-------|----------|
| −2 | extremely negative |
| −1 | negative |
| 0 | neutral |
| 1 | positive |
| 2 | extremely positive |
| NA | no opinion expressed |
| NB | not a blog |

Although the first five categories may be logically ordered, the set of all seven categories has no necessary ordering (which, e.g., rules out innovative approaches like wordscores, which at present requires a single dimension). The NA category is a logical distinction that is separate from a neutral expressed opinion (category 0). Typically, though not necessarily, bloggers often write to express opinions; as a result, category 0 is not common although it and NA occur commonly if the blogger has it in mind to write primarily about something other than the politician studied herein. Category NB was included to ensure that the category list was exhaustive, which may be important in some applications of the principles described herein given the diverse nature of the Web sites which may be input to the estimation module when techniques such as conventional Web crawlers (i.e., computer programs which automatically retrieve publicly-accessible Web pages by, for example, downloading a Web page and then downloading all Web pages to which the first Web page links) are used to provide the input to an estimation module.

This coding scheme represents an especially difficult test case both because of the mixed types included in the exemplary categorization scheme and since computer scientists have found that "sentiment categorization is more difficult than topic classification" (Pang, Bo, Lillian, Lee, and Shivakumar Vaithyanathan. 2002. "Thumbs Up? Sentiment Classification using Machine Learning Techniques." *Proceedings of the Conference on Empirical Methods in Natural Language Processing, pp.* 79-86). In fact, blogs generally seem like a difficult case for automated content analysis, since the language used ranges from the Queen's English (or equivalent in another language) to very informal vernacular and abbreviations, often including poor grammar, such as "my crunchy gf thinks dubya hid the wmd's!" and overall tends strongly toward the informal. In addition, blogs have little common internal structure, and nothing like the inverted pyramid format of newspaper columns. They can change in tone, content, style, and structure at any time, and the highly interactive nature of bloggers commenting on each other's blogs sometimes makes trends spread quickly through the blogosphere.

Although in small quantities or large amounts of time individual elements can be individually classified (using hand coding or automated methods), using individual classification to track large numbers of opinions in real time is infeasible. A random sample could be drawn, but since opinions sometimes change rapidly over time, it would be necessary in some scenarios to draw a different sample very frequently—e.g., daily. Individually classifying sufficient numbers to provide such as random sample each day or week is essentially impossible; either resource constraints would bind, or training quality would be sacrificed with larger numbers of coders. And, even if possible, the time of those who would serve as coders, and resources used to pay them, can be redirected if using embodiments of the systems and methods taught herein.

Preprocessing of Source Data in Embodiments of the Invention

To analyze text statistically (such as the blog text of this example, or other text including transcripts of audio and video sources in other applications of the techniques described herein), in some embodiments of the invention natural language may be represented as numerical variables. For example, in one embodiment, the variable of interest summarizes an entire element of the source data (e.g., a blog post in the running example) with a category into which it falls. (Although a blog may have content that could justify its classification into multiple categories, it is assumed, for simplicity of implementation but not to exclude the use of multiple categories in other embodiments, that a blog is classified into only one category.) This may be done statistically, as a function of numeric variables that are coded directly from the text. To code these additional variables, four additional steps may be performed in some implementations of the techniques described herein, each of which work without human input and all of which are designed to abstract the complexity of text to the essentials needed for further analysis.

Figure 3:
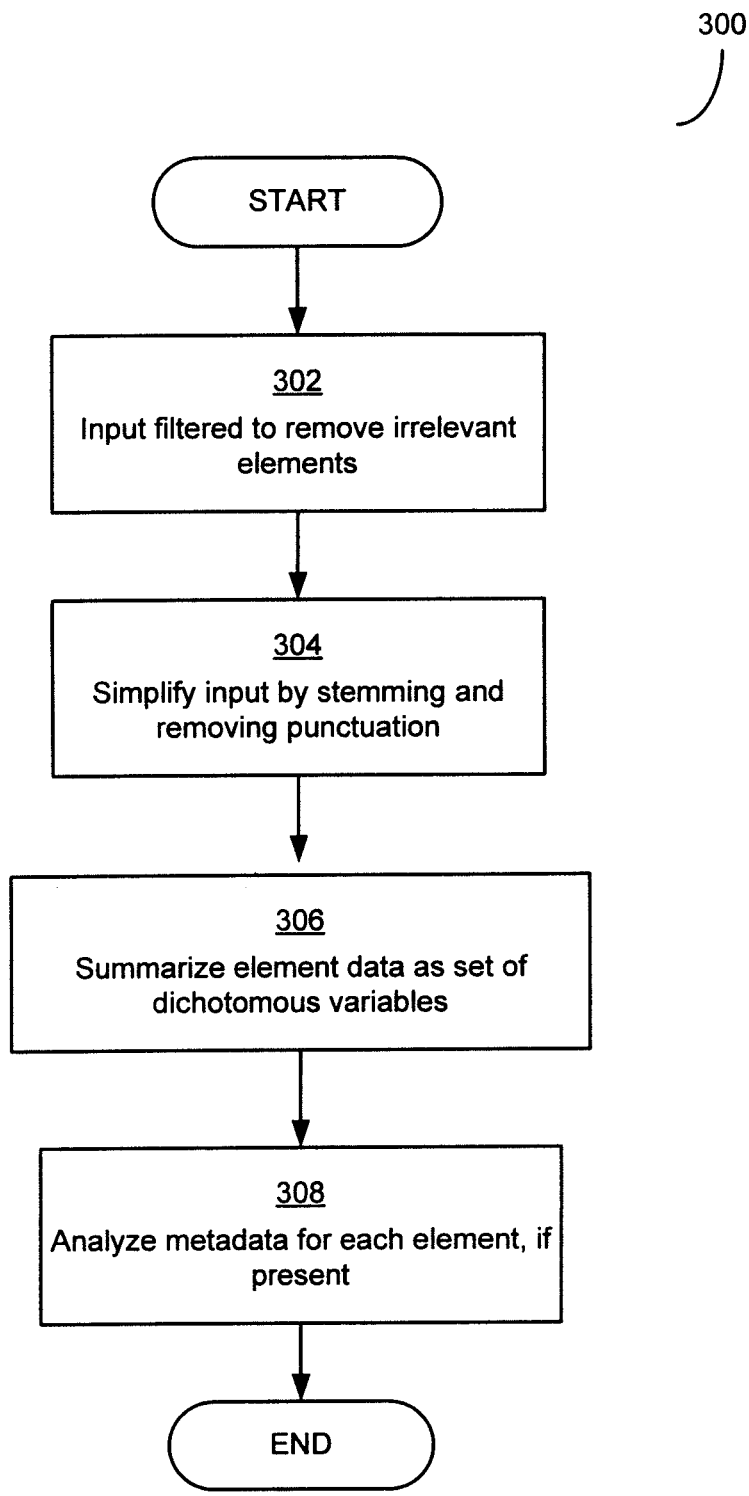
FIG. 3 is a flowchart of an exemplary process for performing preprocessing text data that may be used by embodiments of the invention which analyze text to perform data abstraction.

A source module in the running example (i.e., analysis of blogs) may receive an input of eight public blog directories and two other sources obtained privately. An engine of the source module (e.g., a programmed processor) then "crawls" the links or "blogroll" on each of these blogs (i.e., examines the blog for links to other blogs which may be subsequently examined) to identify a source set of blogs. Preprocessing may then be performed as in the illustrative process 300 of FIG. 3. It should be appreciated, however, that preprocessing may take any suitable form comprising any suitable action or actions in implementations which do perform preprocessing, and that the steps outlined in this example of FIG. 3 may require some modification for applications to source data other than blogs or other textual sources.

Process 300 begins in block 302 wherein, for practical reasons, the set of elements preferably is filtered in one or more ways. For example, in this example non-English language blogs (or more generally, text in other languages not of interest) may be filtered out, as well as spam blogs or "splogs." This can be done in any suitable way, as the techniques described herein are not limited to using any specific filtering techniques. As an example, consider a focus on blog posts about President George W. Bush that, in this example, are defined as those which use the terms "Bush", "George W.", "Dubya", or "King George." This filtering procedure may be repeated for 2008 presidential candidate Hillary Clinton by applying a filter to keep blog posts which mention "Senator Clinton", "Hillary", "Hitlery", and "Mrs. Clinton." The same may be done for other presidential candidates or noteworthy figures to provide more source data, but, for simplicity, results of this filtering are not included in this example. Applying these filters, from millions of posts downloaded on a daily basis, the source data for this example was narrowed to 4,303 blog posts about President Bush collected between Feb. 1 and Feb. 5, 2006, and 6,468 posts about Senator Clinton collected between Aug. 26 and Aug. 30, 2006. It should be appreciated that the techniques described herein work without filtering (and even with foreign language blogs), but filters help focus the data set on particular elements of interest.

The text within each element of the source data (i.e., the text of the blogs) may then be run through a second preprocessing step in block 304 to improve ease of analysis. In this step, all the words may be converted to lower case (so that "These" and "these" are recognized as the same), and all punctuation marks may be removed. Another common type of preprocessing that may be performed in this step is "stemming," which maps a word to its stem and reduces some of the language complexity by reducing the number of possible "words" to be summarized quantitatively. For example, stemming processes may reduce "consist", "consisted", "consistency", "consistent", "consistently", "consisting", and "consists", to their stem, which is "consist." Stemming blogs does strip out information, in addition to reducing complexity, but the long experience in this literature is that the trade off seems well worth it.

In a third preprocessing step, in block 306 the preprocessed text of each element may be summarized as a set of dichotomous variables: one type for the presence or absence of each word (or "unigram"), a second type for the presence or absence of each word pair in a given sequence (or "bigram"), a third type for the presence or absence of each word triplet in sequence (or "trigram"), and so on to all "n-grams". In some implementations of the techniques described herein, "words" may be defined as any set of continuous alphanumeric characters bounded by spaces (after deleting punctuation and perhaps stemming) and observed in at least one of the elements in the database; by this definition, words are therefore not limited to those that appear in common dictionaries. Using the presence or absence of an n-gram in an element, rather than a count of the n-grams in the element, abstracts the data in a useful way in many applications (e.g., in many applications, but not necessarily all, the second time the word "awful" appears in a blog post does not add anywhere near as much information as the first). Of course, in some applications of the techniques described herein, counts of the number of times an n-gram appears in an element may be informative and may be alternatively or additionally included. However, even with this abstraction, in the blog example the number of variables remaining is astounding—orders of magnitude larger than the number of blogs. For example, the sample of 10,771 blog posts about President Bush and Senator Clinton included 201,676 unique unigrams, 2,392,027 unique bigrams, and 5,761,979 unique trigrams. This merely confirms that bloggers will not run out of new ways of saying things any time soon, but it also means some further simplification may be necessary. The usual choice is to consider only dichotomous stemmed unigram indicator variables (the presence or absence of each of a list of word stems), which has been found to be sufficient for many situations. In this example, the narrowed set includes only 164,292 unique possibilities. More emphasis may also be put on variables that are not too rare or prevalent across elements (so that these variables do vary), such as deleting stemmed unigrams appearing in fewer than 1 percent or greater than 99 percent of all elements, which results (in this example) in only 3,672 variables. These procedures effectively group the infinite range of possible blog posts to "only" $2^{3,672}$ distinct types. This makes the problem feasible but still represents a huge number (larger than the number of elementary particles in the universe). Procedures like these are common in the information extraction literature.

In many applications, elements may also come with metadata, or information about the element that is not strictly part of the data of the element. Accordingly, in block 308, this metadata (if available) is (or at least optionally may be) analyzed. For the exemplary implementation using blogs as the source data, the URL of the blog, the title, or the blogroll, for example, may convey some additional information. For example, one could code blogrolls by whether they cite the top 100 liberal or top 100 conservative blogs as an indication of the partisan identification of the blogger. Other possibilities include an indicator for whether a word appears near the start or end of the text, or a procedure to tag each word with a part of speech to attempt to include bigrams when unigrams will lose meaning in ways relevant to the categorization scheme (e.g., by replacing the two unigrams "not very" with "not_very") or to include information from the linkage structure among the set of blogs. These additions and others provide important advantages in some applications. Overall, the conclusion of the literature is that a brute force unigram-based method, with rigorous empirical validation, will typically account for the majority of the available explanatory power.

Techniques for Analysis of Data Employed by Some Embodiments of the Invention

In some embodiments of the methods taught herein, source data may be divided into two sets of elements.

The first is a small set called the "labeled set," for which each element i (i=1, . . . , n) is individually classified into, or somehow otherwise labeled with, a category from a categorization scheme (examples of n categories are discussed below) established prior to the classification effort. This may be done in any suitable manner, such as by hand coding or through application of any suitable individual classification techniques. The element category variable is denoted as $D_i$, which in general takes on the value $D_i=j$, for possible categories j=1, . . . , J. In the running example, $D_i$ takes on the potential values {−2, −1, 1, 0, 1, 2, NA, NB}.

The second, larger set of elements is described herein as the "target population," in which each element l (for l=1, . . . , L) has an unobserved classification $D_l$. Sometimes the labeled set will be a sample from (i.e., subset of) the population and so the two overlap; more often it will be a nonrandom (or it could be a random or a pseudo-random) sample from a different source than the population, such as from earlier in time, though still the same kind of data.

The user need not provide any other variables, as everything else is computed directly from the elements by an estimation module that operates as below described. To define these variables for the labeled set, denote $S_{ik}$ as equal to 1 if word stem k (k=1, . . . , K) is used at least once in element i (for i=1, . . . , n) and 0 otherwise (and similarly for the population set substituting index i with index l). This makes the abstract summary of the text of element i the set of these variables, $\{S_{i1}, \ldots, S_{iK}\}$, which may be summarized as the K×1 vector of word stem variables $S_i$. $S_i$ may be considered to be a word stem profile because it provides a summary of all the word stems under consideration used in an element, as considered to be a content distribution for the labeled set as it provides a distribution of content (e.g., words) in the elements of the labeled set. This vector can also include other features of the text such as based on any n-gram, or variables coded from the metadata.

The quantity of interest in most of the conventional, supervised learning literature is the set of individual classifications for all elements in the population:

$$\{D_1, \ldots, D_L\}. \quad (1)$$

In contrast, the quantity of interest for most social science scholarship, and the quantity of interest in many applications of the techniques disclosed herein, is the aggregate proportion of all (or a subset of all) these population elements that fall into each of the categories:

$$\{P(D=1), \ldots, P(D=J)\}'=P(D) \quad (2)$$

where P(D) is a J×1 vector, each element of which is a proportion computed by direct tabulation:

$$P(D=j) = \frac{1}{L}\sum_{l=1}^{L} 1(D_l = j) \quad (3)$$

where 1(a)=1 if a is true and 0 otherwise.

Element category $D_i$ is one variable with many possible values, whereas word profile $S_i$ constitutes a set of dichotomous variables. This means that P(D) is a multinomial distribution with J possible values and P(S) is a multinomial distribution with $2^K$ possible values, each of which is a possible word stem profile.

The exemplary embodiments described herein can be implemented in any of numerous ways, including by commercial entities taking any of numerous forms. For example, in the description provided above, the creation of a labeled set (e.g., by hand coding) and the estimating P(D) of the unlabeled set of elements (i.e., the distribution of elements among the plurality of categories) is described as being related processes. However, it should be appreciated that these processes can be performed by different entities (e.g., one that performs the estimation and another that performs the generation of the labeled set). Alternatively, a first entity seeking to estimate the distribution of elements in categories may create the labeled set itself, but then seek the services of a second entity that may receive this labeled set and perform the estimating as described herein. Thus, the entity that performs the estimation may receive the labeled set from any source (including creating the labeled set itself or receiving it from another entity). Accordingly, it should be appreciated that as used herein, the reference to receiving a labeled set or a categorization of labeled elements does not imply that the labeled set was created by another entity, as the labeled set can be received not only from another entity but from the same entity (or even individual(s)) who created the labeled set. Neither does it assume the labeled set is produced "by hand" as the product of human judgment. It may be created manually by application of precise rules which do not allow for the exercise of judgment or it may be created in an automated fashion by applying such rules to input text, also. Any of these approaches will provide a usable labeled set. Thus, while the labeled set is needed, it may be taken as input to the estimation module performing the estimations on the unlabeled set; that is, as a "given" when the estimation is performed.

Contrasts with Conventional Techniques

Advantages of the techniques described herein can be better understood when contrasted with existing approaches. Thus, discussed below are the problems with two existing methods that can be used to estimate social aggregates rather than individual classifications. Two such methods include "direct sampling" and "the aggregation of individual element classifications" produced by conventional supervised learning algorithms. Also shown below is how accurate estimation depends on the quantity of interest and related evaluative criterion, and how most of the literature and conventional approaches have goals that do not always coincide with those of most social scientists or other users of the techniques described herein.

Perhaps the simplest method of estimating P(D) is to identify a well-defined population of interest, draw a random sample from the population, individually classify all the elements in the sample (e.g., by hand coding), and tabulate the individually-classified elements into each category. Drawing proper inferences with this method requires only basic sampling theory. It does not even require abstract numerical summaries of the text of the elements such as word stem profiles or classifications of individual elements in the population set.

The second approach to estimating P(D) is standard in the supervised learning literature. The idea is to first use the labeled sample to estimate a functional relationship between element category D and word features S. Typically, D serves as a multicategory dependent variable and is predicted with a set of explanatory variables $\{S_{i1}, \ldots, S_{iK}\}$, using some statistical (or machine learning, or rule-based) method. Then the coefficients of the model estimated, and the whole data generating process, are assumed the same in the labeled sample as in the population. The coefficients are then ported to the population and used with the features measured in the population, $S_j$, to predict the classification for each population element $D_j$. Social scientists who use these approaches follow the same steps and then aggregate the individual classifications via Equation 3 above to estimate their quantity of interest, P(D). Many models have been chosen to perform the basic classification task, including regression, discriminant analysis, radial basis functions, multinomial logit, CART, random forests, neural networks, support vector machines, maximum entropy, and others. Much work goes into fitting and comparing the performance of these models in individual applications, but the conventional wisdom seems to be that the choice of the statistical method is less important than the information in the individually-classified data set and the features chosen.

Unfortunately, in two circumstances, both of which appear common in practice, the standard supervised learning approach will fail for estimating the quantity of interest in many applications of the techniques described herein. The first circumstance also invalidates the simple direct sampling estimator in most applications.

First, when the labeled set is not a random sample from the population, both methods fail. Yet, as discussed above, "in many, perhaps most real classification problems the data points in the [labeled] design set are not, in fact, randomly drawn from the same distribution as the data points to which the classifier will be applied. . . . It goes without saying that statements about classifier accuracy based on a false assumption about the identity of the [labeled] design set distribution and the distribution of future points may well be inaccurate" (Hand, David. 2006. "Classifier Technology and the Illusion of Progress." *Statistical Science* 21(1):1-14.) Deviations from randomness may occur due to what Hand calls "population drift," which occurs when the labeled set is collected at one point and meant to apply to a population collected over time (as in the blogs example), or for many other reasons.

The lack of random sampling would seem to be an even more common characteristic of real social science applications, which have many aggregate quantities of interest, but a single individually-classified data set is typically insufficient to estimate all the quantities. That is, a study that asks only a single question is rare. Almost all analyses also study questions within subdivisions of their population of interest. The subdivisions may include time periods to help identify trends or, to seek out other patterns, they may include subdivisions by policy areas, speakers, countries, income groups, partisan identification, or others. If a separate random sample could be drawn from each subdivision, each separate P(D) could be estimated by direct sampling, but the burdens of individual classification would quickly overwhelm any researcher's coding capacity. And even in the unlikely case where a random sample could be collected for each, scholars continually develop new questions, and thus new quantities of interest, quicker than any classification team could respond.

The second exemplary failure condition is more subtle but more insidious: The data generation process assumed by the standard supervised learning approach predicts D with S, modeling P(D|S). However, this is not always the way the world works. To take the running example, bloggers do not start writing and only afterword figure out their affect toward the president: they start with a view, which is abstracted here as an element category, and then set it out in words. That is, the right data generation process is the inverse of what is being modeled, where S should be predicated with D, and inferring P(S|D). The consequence of using P(D|S) instead is the requirement of two assumptions needed to generalize from the labeled sample to the population. The first assumption is that S "spans the space of all predictors" of D (Hand, 2006), which means that once you control for measured variables, there exist no other variable that could improve predictive power at all. In problems involving human language, including the blog example, this assumption is virtually never met, since S is intentionally an abstraction of the content of the element and so by definition does not represent all existing information. As such, S does not span the space of all predictors. The other assumption is that the class of models chosen for P(D|S) includes the "true" model. This is a more familiar assumption to social scientists, but it is of course no easier to meet. In this case, finding even the best model or a good model, much less the "true one," would be extraordinarily difficult and time consuming given the huge number of potential explanatory variables coded from text in unigrams, bigrams, etc.

Embodiments of the processes and systems described herein avoid each of these impossible assumptions even without a labeled set that is a random sample from the population.

The criteria for success in the supervised learning literature is the percentage correctly classified in an (out of sample) test set. This is one reasonable criterion when the focus is on individual-level classification, but it is sometimes insufficient even if the goal is individual classification and can be seriously misleading for the general purpose of estimating aggregate classification frequencies. For example, in some conventional methods, the percent correctly predicted ranged from 77 percent to 83 percent. This is an excellent classification performance for the difficult problem of sentiment analysis these methods analyzed, but suppose that all the misclassifications were in a particular direction for one or more categories. In that situation, the statistical bias (the average difference between the true and estimated proportion of elements in a category) in using this method to estimate the aggregate quantities of interest could be enormous, ranging as high as 17 to 23 percentage points.

In fact, except at the extremes, there exists no necessary connection between low misclassification rates and low bias: It is easy to construct examples of learning methods that achieve a high percent of individual elements correctly predicted and large biases for estimating the aggregate element proportions, as well as other methods that have a low percent correctly predicted but nevertheless produce relatively unbiased estimates of the aggregate quantities. For example, flipping a coin is not a good predictor of which party will win a presidential election, but it does happen to provide an unbiased estimate of the percentage of Democratic victories since the first World War. Evidence on bias would be useful for individual classification but is essential for estimating social science aggregate quantities of interest. Yet, since authors in this literature are interested primarily in individual classification, they do not usually report the different types of misclassification errors their methods produce or bias in estimating the aggregates. As such, the bulk of the supervised learning literature offer no indication of whether the methods proposed would work well for some applications in which an estimation of aggregate proportions is desired. This problem may be overcome by the techniques described herein.

Techniques for Statistically Consistent Estimates of Element Distribution

Having a different quantity of interest than the supervised learning literature is not merely a different focus; it also poses an opportunity to substantially improve the quality of estimates of aggregate quantities of interest and with far less onerous assumptions.

Described below are principles which may be used for two techniques for optimized estimation of element category proportions having more accuracy and using fewer assumptions than the conventional techniques described above. The first technique may be useful for correcting estimations using conventional classification methods; the second technique may be used as a stand-alone procedure for estimating a distribution of elements of source data in categories without performing individual classification of all elements or relying on random-sampling assumptions.

First Technique for Corrected Aggregations of Individual Classification

Figure 4:
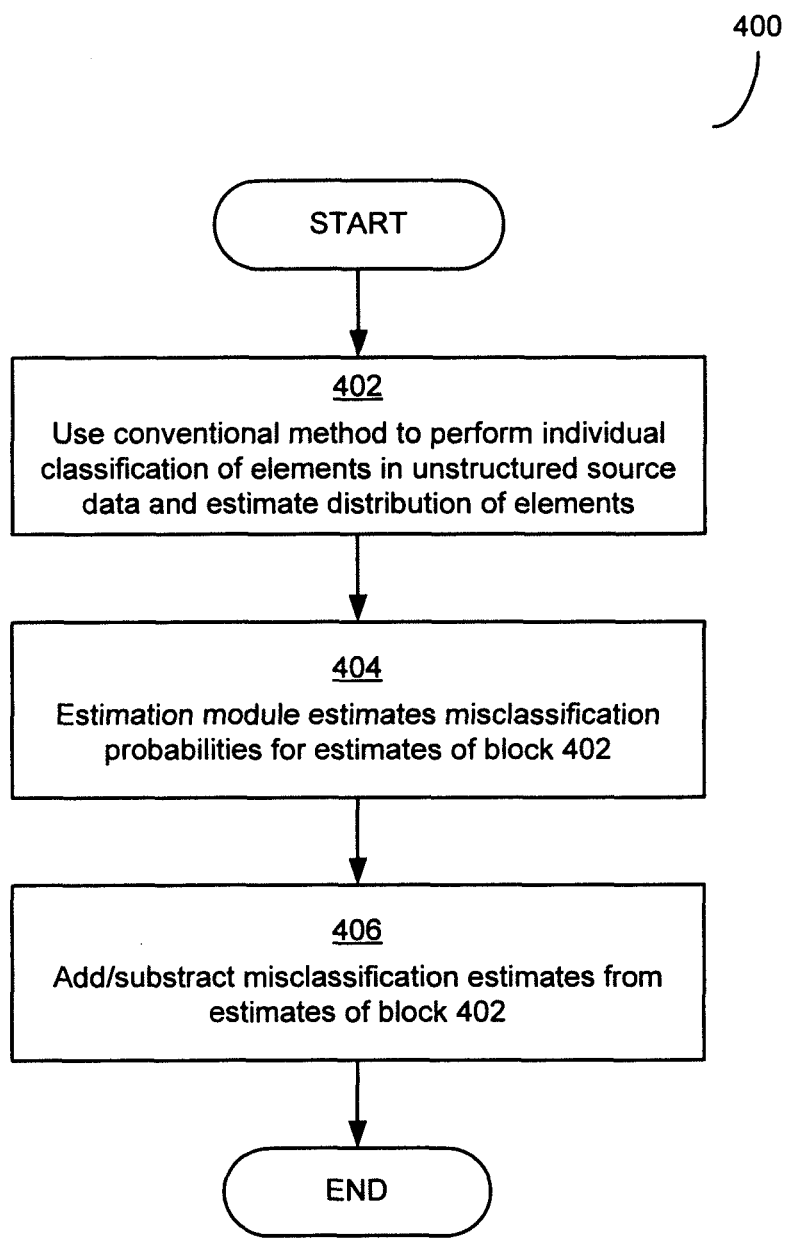
FIG. 4 is a flowchart of an exemplary process that may be implemented by embodiments of the invention to perform correction of results of a conventional process for performing aggregation of individual classification.

FIG. 4 shows a flowchart of an exemplary process 400 for performing correction on aggregations of individual classifications performed by conventional methods. It should be appreciated that the process shown in FIG. 4 is merely illustrative of techniques which may implement some of the principles disclosed herein, and that other techniques are possible.

The process 400 begins in block 402, in which any suitable method or method(s) for making individual-level classification decisions are applied to a set of elements in source data. The method used in block 402 may be any suitable technique for individual classification, including any of those offered in the supervised learning literature (e.g., multinomial logit or other suitable technique). In many implementations, the actions of block 402 may comprise applying an individual classification model to a labeled set, using that model to classify each of the unlabeled elements in the population of interest, and the classifications aggregated to obtain a raw, uncorrected estimate of the proportion of elements in each category. This approach is commonly used by those who use classification techniques to study category proportions, but it should be appreciated that other techniques may be used for performing individual-level classification.

In block 404, an estimation module implemented in accordance with the principles described herein estimates misclassification probabilities. This may be done in any suitable manner, including by dividing the labeled set of elements into a training set and a test set. A classification method (such as the same classification method applied in block 402) is then applied to the training set alone and predictions are made for the test set, $\hat{D}_i$ (ignoring the test set's labels). Then the test set's labels from block 402 are used to calculate the specific misclassification probabilities between each pair of actual classifications given each true value, $P(\hat{D}_i=j|D_i=j')$. These misclassification probabilities do not indicate which specific elements are misclassified, but they can be used to correct the raw estimate of the element category proportions.

For example, suppose it is determined, in predicting the test set proportions from the training set in block 404, that 17 percent of the elements classified in block 402 as D=1 really should have been classified as D=3. For any one individual classification in the population, this fact is of no help. But for element category proportions, it may be easy to use. In block 406, using the determinations of block 404, 17 percent is subtracted from the raw estimate of the category 1 proportion in the population, P(D=1), and added to category 3, P(D=3). Even if the raw estimate was badly biased, which can occur even with optimal individual element classification, the resulting corrected estimate would be unbiased and statistically consistent so long as the population misclassification errors were estimated well enough from the labeled set (a condition discussed below). Even if the percent corrected predicted is low, this corrected method can give unbiased estimates of the category frequencies.

This technique may be implemented in any suitable manner using any suitable calculations, an example of which is discussed below. Consider first a dichotomous D with values 1 or 2, a raw estimate of the proportion of elements in category 1 from some method of classification, $P(\hat{D}=1)$, and the true proportion (corrected for misclassification), $P(D=1)$. The raw estimate $P(\hat{D}=1)$ can be based on the proportion of individual elements classified into category 1. However, a better estimate for classifiers that give probabilistic classifications is to sum the estimated probability that each element is in the category for all elements. For example, if 100 elements each have a 0.52 probability of being in category 1, then all individual classifications are into this category. However, since it is only expected that 52 percent of elements to actually be in category 1, a better estimate is $P(\hat{D}=1)=52.0$. Then two forms of correct classification may be defined as "sensitivity," sens≡$P(\hat{D}=1|D=1)$ (sometimes known as "recall"), and "specificity," or spec≡$P(\hat{D}=2|D=2)$. For example, sensitivity is the proportion of elements that were predicted to be in category 1 among those actually in category 1.

The proportion of elements estimated to be in category 1 come from only one of two sources: elements actually in category 1 that were correctly classified and elements actually in category 2 but misclassified into category 1. This accounting identity, known as the Law of Total Probability, may be represented as $$P(\hat{D}=1)=(\text{sens})P(D=1)+(1-\text{spec})P(D=2). \tag{4}$$

Since Equation 4 is one equation with only one unknown [since P(D=1)=1−P(D=2)], it is easy to solve. As first showed, the solution is $$P(D=1) = \frac{P(\hat{D}=1) - (1-spec)}{sens - (1-spec)}. \tag{5}$$

This expression can be used in practice by estimating sensitivity and specificity in the first stage analysis (separating the labeled set into training and test sets as discussed above or more formally by cross-validation), and using the entire labeled set to predict the (unlabeled) population set to give $P(\hat{D}=1)$. Plugging in these values in the right side of Equation 5 gives a corrected, and statistically consistent, estimate of the true proportion of elements in category 1.

King and Lu (2007) show how to generalize Equation 4 to include any number of categories in "Verbal Autopsy Methods with Multiple Causes of Death," September, 2007, available at http://gking.harvard.edu/. This paper is hereby incorporated by reference in its entirety and a portion of the paper is reproduced below. King and Lu (2007) accomplish this by substituting j for 1, and summing over all categories instead of just 2:

$$P(\hat{D}=j) = \sum_{j'=1}^{J} P(\hat{D}=j|D=j')P(D=j') \qquad (6)$$

Given P($\hat{D}$) and the misclassification probabilities, P($\hat{D}$=j|D=j') which generalize sensitivity and specificity to multiple categories, this expression represents a set of J equations (i.e., defined for j=1, ..., J) that can be solved for the J elements in P(D). This is aided by the fact that the equations include only J−1 unknowns since elements of P(D) must sum to 1.

As discussed above, a conventional method meeting all the assumptions required for optimal classification performance can still give biased estimates of the element category proportions. Offered here are techniques for determining statistically consistent estimates of element category proportions that operate without having to improve conventional individual classification accuracy and with no assumptions beyond those already made by the individual element classifier. In particular, classifiers require that the labeled set be a random sample from the population. Techniques operating according to these principles only require a special case of the random selection assumption: that the misclassification probabilities (sensitivity and specificity with 2 categories or P($\hat{D}$=j|D=j') for all j and j' in Equation 6) estimated with data from the labeled set also hold in the unlabeled population set. This assumption may be wrong, but if it is, then the assumptions necessary for the original classifier to work are also wrong and will not necessarily even give accurate individual classifications. This approach will also work with a biased classifier.

Second Technique for Determining Proportions without Determining Individual Classification The second technique discussed herein for determining category proportions requires no parametric statistical modeling, individual element classification, or random sampling from the target population. This technique also properly treats S as a consequence, rather than a cause of, D.

Figure 5:
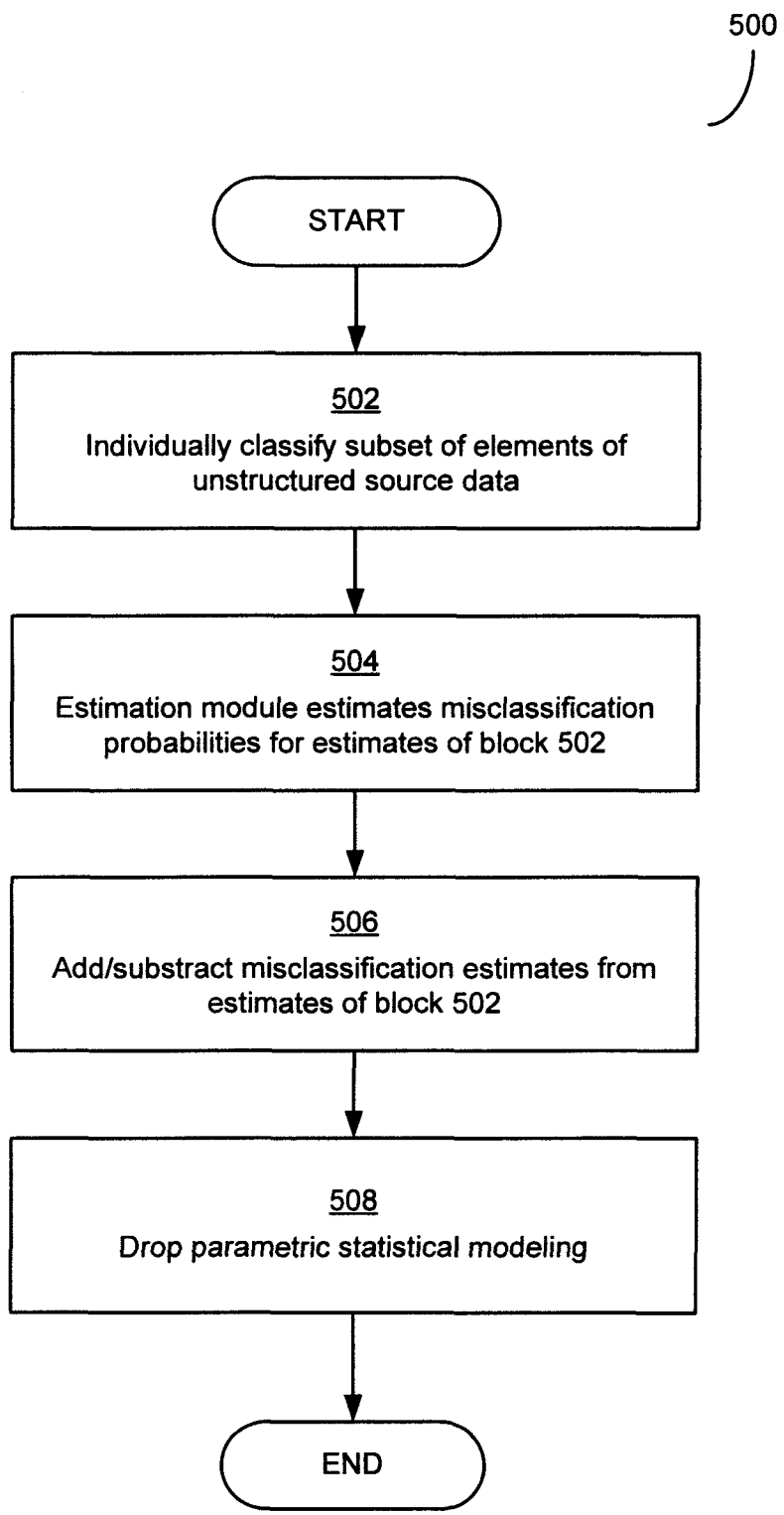
FIG. 5 is a flowchart of an exemplary process that may be implemented by embodiments of the invention for estimating a proportional distribution of elements in source data without performing individual classification of all elements.

FIG. 5 shows a flowchart of an exemplary process 500 for performing a statistically consistent and approximately unbiased estimation of a distribution of elements of source data into a set of element categories without needing to individually classify all elements or rely on any assumptions that a classified set is a statistically random sample. It should be appreciated that the process shown in FIG. 5 is merely illustrative of techniques which may implement some of the principles disclosed herein, and that other techniques are possible.

The process 500 begins in block 502, in which any suitable method or method(s) for making individual-level classification decisions are applied to a set of elements in source data. The method used in block 502 may be any suitable technique for individual classification, including any of those offered in the supervised learning literature (e.g., multinomial logit or other suitable technique). In many implementations, the actions of block 502 may comprise applying an individual classification model to a labeled set, using that model to classify each of the unlabeled elements in the population of interest, and the classifications aggregated to obtain a raw, uncorrected estimate of the proportion of elements in each category. This approach is commonly used by those who use classification techniques to study category proportions, but it should be appreciated that other techniques may be used for performing individual-level classification.

In block 504, an estimation module implemented in accordance with the principles described herein estimates misclassification probabilities. This may be done in any suitable manner, including by dividing the labeled set of elements into a training set and a test set. A classification method (such as the same classification method applied in block 502) is then applied to the training set alone and predictions are made for the test set, $\hat{D}_i$ (ignoring the test set's labels). Then the test set's labels from block 502 are used to calculate the specific misclassification probabilities between each pair of actual classifications given each true value, P($\hat{D}_i$=j|D$_i$=j'). These misclassification probabilities do not indicate which specific elements are misclassified, but they can be used to correct the raw estimate of the element category proportions.

In block 506, the same procedure is followed and the entire labeled set is used to predict the distribution in the population, P(D). A method that will do better than whichever supervised learning method chosen originally is to use that method and correct it for these misclassification probabilities. For example, suppose it is determined in block 504, in predicting the test set P(D) from the training set, that 23 percent of the elements embodiments of the invention classified as D=1 really should have been classified as D=3. For any one individual classification in the population, this fact is of no help, since it is not known whether any particular element was misclassified or not. But for aggregate element classification frequencies, it may be easy to use. In block 506, 23 percent is subtracted from the raw estimate of the category 1 proportion, P(D=1) and added to category 3, P(D=3). Even if the raw estimate was badly biased, the resulting corrected estimate would be unbiased and statistically consistent (so long as the population misclassification errors were estimated well enough from the labeled set). Even if the percent correctly predicted is low, this corrected method can give unbiased estimates of the aggregate element category frequencies.

This technique may be implemented in any suitable manner using any suitable calculations, an example of which is discussed below. Consider first a dichotomous D with values 1 or 2, a raw estimate of the proportion of elements in category 1 from some method of classification, P($\hat{D}$=1), and the true proportion (corrected for misclassification), P(D=1). Then define the two forms of misclassification as "sensitivity," sens=P($\hat{D}$=1|D=1) (sometimes known as "recall"), and "specificity," or spec=P($\hat{D}$=2|D=2). For example, sensitivity is the proportion of elements that were predicted to be in category 1 among those actually in category 1.

The proportion of elements estimated to be in category 1 as the actual proportion of category 1 elements correctly classified times the proportion actually in category 1, plus the proportion of category 2 elements misclassified (into category 1) times the true proportion in category 2 is:

$$P(\hat{D}=1) = (sens)P(D=1) + (1-spec)P(D=2) \qquad (7)$$

Then, Equation 7 can be solved for the true P(D=1) (since P(D=1)=1−P(D=2)) as $$P(D=1) = \frac{P(\hat{D}=1) - (1-spec)}{sens - (1-spec)} \qquad (8)$$

This expression can be used in practice by estimating sensitivity and specificity from the first stage analysis, separating the labeled set into training and test sets, and using the entire labeled set to predict the (unlabeled) population set to give P($\hat{D}$=1). Plugging in these values on the right side of Equation 8 gives a corrected estimate of the true proportion of elements in category 1.

Equation 7 may be generalized to include any number of categories for applications beyond those have a dichotomous D. King and Lu (2007) (referenced above) show how to accomplish this by substituting j for 1, and summing over all categories instead of just 2:

$$P(\hat{D}=j) = \sum_{j'=1}^{J} P(\hat{D}=j|D=j')P(D=j') \qquad (9)$$

Given P($\hat{D}$) and the misclassification probabilities, P($\hat{D}$=j|D=j') which generalize sensitivity and specificity to multiple categories, this expression represents a set of J equations (i.e., defined for j=1, ..., J) that can be solved for the J elements in P(D). This is aided by the fact that the equations include only J−1 unknowns since elements of P(D) must sum to 1. Although Equations 8 and 9 require some parametric method for estimating the aggregate proportions, P($\hat{D}$=j), individual classifications $\hat{D}_i$ (for all i) are not necessarily needed.

Finally, in block 508, drop parametric statistical modeling altogether, as shown in King and Lu (2007). Instead of using a statistical or machine learning method that uses S and D to estimate P($\hat{D}$=j) and then correcting via Equation 9, as was shown in the first technique described above, King and Lu (2007) replace $\hat{D}$ in Equation 9 with S, and write:

$$P(S=s) = \sum_{j=1}^{J} P(S=s|D=j)P(D=j). \qquad (10)$$

In fact, any observable implication of the true D can be used in place of $\hat{D}$, and since $\hat{D}$ is a function of S—because the words chosen are by definition a function of the element category—it certainly can be used. To simplify, Equation 10 is rewritten as an equivalent matrix expression:

$$\underset{2^K \times 1}{P(S)} = \underset{2^K \times J}{P(S|D)} \underset{J \times 1}{P(D)} \qquad (11)$$

where, as indicated, P(S) is the probability of each of the $2^K$ possible word stem profiles occurring, P(S|D) is the probability of each of the $2^K$ possible word stem profiles occurring within the elements in category D (columns of P(S|D) corresponding to values of D), and P(D) is the J-vector quantity of interest.

Elements of P(S) can be estimated by direct tabulation from the target population, without parametric assumptions; instead, the proportion of elements observed with each pattern of word profiles is computed. Because D is not observed in the population, P(S|D) cannot be estimated directly. Rather, the assumption is made that its value in the labeled, hand-coded (or otherwise individually classified) sample, $P^h$(S|D), is the same as that in the population, $$P^h(S|D)=P(S|D), \qquad (12)$$

and the labeled sample is used to estimate this matrix. Parametric assumptions are avoided here too, by using direct tabulation to compute the proportion of elements observed to have each specific word profile among those in each element category.

In principle, P(D) could be estimated in Equation 8 assuming only the veracity of Equation 12 and the accuracy of estimates of P(S) and P(S|D), by solving Equation 11 via standard regression algebra. That is, if P(D) is thought of as the unknown "regression coefficients" β, P(S|D) as the "explanatory variables" matrix X, and P(S) as the "dependent variable" Y, then Equation 11 becomes Y=Xβ (with no error term). This happens to be a linear expression but not because of any assumption imposed on the problem that could be wrong. The result is that P(D) can be determined via the usual regression calculation: β=(X'X)$^{-1}$X'y (with proper constraints, as discussed above). This calculation does not require classifying individual elements into categories and then aggregating; it estimates the aggregate proportion directly.

This simple approach presents two challenges in the exemplary implementation using blogs, and accordingly may be found in some other applications of the principles described herein. First, K is typically very large and so $2^K$ is far larger than any current computer could handle. Second is a sparseness problem since the number of observations available to tabulate for estimating P(S) and P(S|D) is much smaller than the number of potential word profiles (n<<$2^K$). To avoid both of these issues, in some implements, sets of between approximately 10 and 200 words may be randomly chosen (the number being chosen by cross-validation within the labeled set, once for each data set type). In each set, P(D) may be calculated, the results averaged. Because S is treated as a consequence of D, using sets of S introduces no new assumptions. This procedure turns out to be equivalent to a version of the standard approach of smoothing sparse matrices via kernel densities. Standard errors and confidence intervals may be computed via bootstrapping.

A key advantage of estimating P(D) directly without the intermediate step of computing the individual classifications is that the assumptions required to make it work are remarkably less restrictive. The necessary assumptions can still be wrong, and as a result estimates may be biased, but the dramatic reduction in their restrictiveness means that under the new approach it is more likely that something close to the right answer will be calculated in many applications where valid inferences were not previously likely.

As described above, to apply conventional direct sampling or standard supervised learning approaches, three conditions must be true or assumed: the labeled element set must be a statistically random sample from the target population; the set of word stem profiles must span all the predictive information in the elements; and the class of parametric models chosen must include something close to the "true" data generation process. Primarily, because the data generation process followed by many sources of data is P(S|D) (as discussed above in connection with blogs), but these models are based on P(D|S), satisfying these assumptions in real data would be unlikely and a justification of them would, in many applications, be forced at best.

In contrast, some embodiments of the new approaches described herein allow the distribution of elements across word stem profiles, P(S), and the distribution of elements across the categories, P(D), to each be completely different in the labeled set and population set of elements. For example, if a word or pattern of words becomes more popular between the time the labeled set was individually classified and the population elements were collected—or new terms or expressions appear in the source data—no biases would emerge.

Similarly, if elements in certain categories became more prevalent in the population than in the labeled set, no biases would be created. In the running blog example, no bias would be induced if the labeled set includes a majority of conservative Republicans who defend everything President Bush does and the target population has a super-majority liberal Democrats who want nothing more than to end the Bush presidency. This cannot hold in conventional approaches, as changes in either P(D) or P(S) between the labeled and population sets would be sufficient to doom any of the conventional classification-based approaches. In contrast, so long as words and expressions retain a particular meaning or usage (e.g., as long as "idiot" remains an insult), techniques operating according the principles described herein can make appropriate use of that information, even if the word or expression becomes less common (a change in P(S)) or if there are fewer people who deserve it (a change in P(D)).

A theoretical assumption of some techniques described herein is Equation 12—that the language used to describe a particular elements category is generally the same in both samples. To be more specific, among all elements in a given category, the prevalence of particular word profiles in the labeled set should be the same as in the population set. To use the blogging example, the language bloggers use to describe an "extremely negative" view of Hillary Clinton in the labeled set must at least be a subset of the way she is described in the target population. They do not need to literally write the same blog posts, but rather need to use similar word profiles so that $P^h(S|D=-2)=P(S|D=-2)$. The number of examples of each category need not be the same either in the two element sets. And as discussed above, the proportion of examples of each element category and of each word profile can differ between the two element sets (i.e., the labeled set and the unlabeled set).

Applying the methodologies described above has the advantage not only of requiring fewer and less restrictive assumptions but also of being considerably easier to use in practice. Applying the conventional supervised learning approach is difficult, even if one is optimistic about meeting its assumptions. Choosing the "true" model is nearly impossible, while merely finding a "good" specification with thousands of explanatory variables to choose from can be extraordinarily time consuming. One needs to fit numerous statistical models, consider many specifications within each model type, run cross-validation tests, and check various fit statistics. Social scientists have a lot of experience with specification searches, but all the explanatory variables mean that even one run would take considerable time and many runs would need to be conducted.

The problem is further complicated by the fact that social scientists are accustomed to choosing their statistical specifications in large part on the basis of prior theoretical expectations and results from past research, whereas the overwhelming experience in the information extraction literature is that radically empirical approaches work best. For example, one might attempt to implement techniques to carefully choose words or phrases to characterize particular element categories (e.g., "awful", "irresponsible," "impeach" etc., to describe negative views about President Bush), and, indeed, this approach will often work to some degree. Yet, a raw empirical search for the best specification, ignoring these theoretically chosen words, will typically turn up predictive patterns that would not have been thought of ex ante, such that, overall, this empirical, even "atheoretical" specification search approach, usually works better. Indeed, methods based on highly detailed parsing of the grammar and sentence structure in each element can also work, but the strong impression from the literature is that the extensive, tedious work that goes into adapting these approaches for each application are more productively put into collecting more individually classified examples and then using an automatic specification search routine.

Techniques for Performing Individual Classification

Embodiments of the invention are also directed toward techniques for performing individual classification of elements of source data. It should be appreciated that these techniques are merely exemplary of those that may be employed for performing individual classification of elements, and that embodiments of the invention which implement some or all of the principles described herein are not limited to performing individual classification using these techniques or any other particular technique.

As above, because these techniques have broad implications for the general problem of individual classification in a variety of applications, the discussion is generalized here in terms of elements with the notations S referring to what is called in the classifier literature features or covariates and D denoting category labels.

As discussed above and as taught by Hand (2006), many classical supervised classification techniques rely on the assumption that the data in the design set are randomly drawn from the same distribution as the points to be classified in the future. In other words, conventional individual classifiers make the assumption that the joint distribution of the data is the same in the unlabeled (community) set as in the labeled (hospital) set $P(S, D)=P^h(S, D)$. This assumption is a highly restrictive and often unrealistic condition. If P(D|S) fits exceptionally well (i.e., with near 100 percent sensitivity and specificity), then this common joint distribution assumption is not necessary, but classifiers rarely fit that well.

In many applications of classifying techniques (e.g., the blog example above), assuming common joint distributions or nearly perfect predictors is almost always wrong. Hand (2006) gives many reasons why these assumptions are wrong as well in many other types of classification problems. Additionally, because P(S) and $P^h(S)$ are directly estimable from the unlabeled and labeled sets respectively, these features of the joint distribution can be directly compared and this one aspect of the common joint distribution assumption can be tested directly. Of course, the fact that this assumption can be tested also implies that this aspect of the common joint distribution assumption need not be made in the first place. In particular, as shown above, it is unnecessary to assume that $P(S)=P^h(S)$ or $P(D)=P^j(D)$ when trying to estimate the aggregate proportions. These assumptions are also unnecessary in individual classifications.

Thus, instead of assuming a common joint distribution between the labeled and unlabeled sets, a considerably less restrictive assumption may be made that only the conditional distributions are the same: $P(S|D)=P^h(S|D)$. (As above, the needed joint distribution in the unlabeled set is determined by multiplying this conditional distribution estimated from the labeled set by the marginal distribution P(S) estimated directly from the unlabeled set.) Thus, to generalize the results to apply to individual classification, which requires an estimate of $P(D_l|S_l=s_l)$, Bayes theorem may be used:

$$P(D_l | S_l = s_l) = \frac{P(S_l = s_l | D_l = j)P(D_l = j)}{P(S_l = s_l)} \quad (13)$$

Figure 6:
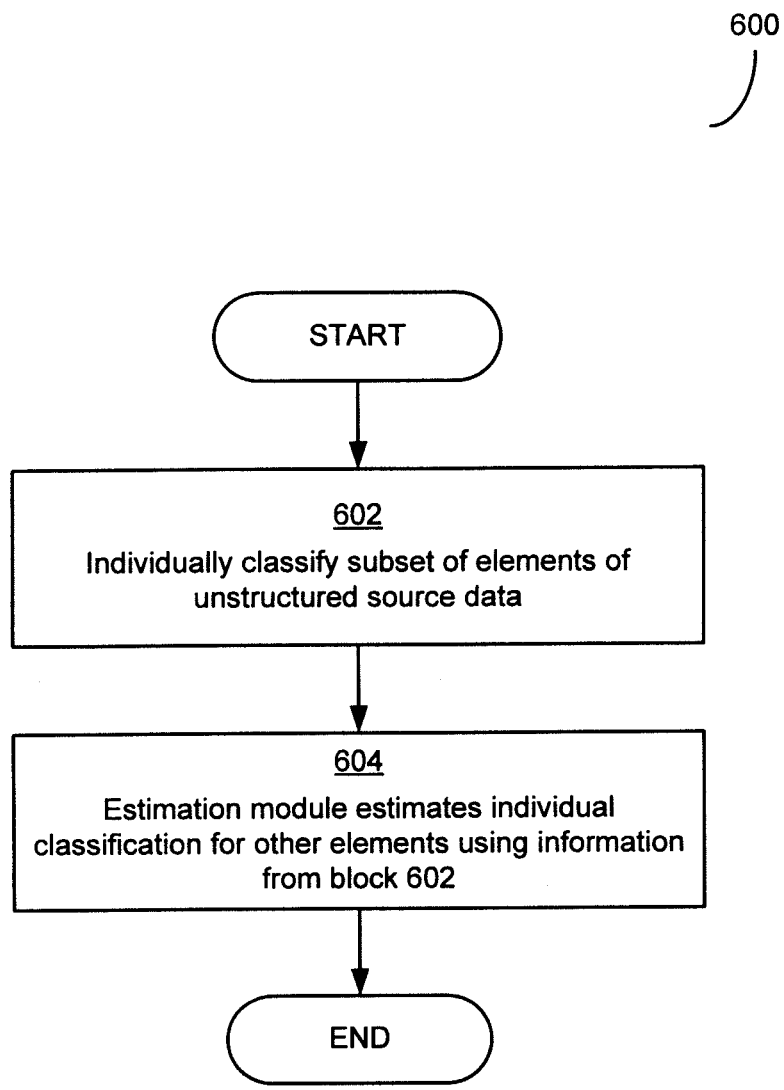
FIG. 6 is a flowchart of a exemplary process that may be implemented by embodiments of the invention for determining individual classifications of elements of source data.

FIG. 6 shows an exemplary process 600 for using Equation 13, though it should be appreciated that process 600 is merely exemplary of techniques which may be implemented according to these principles. Process 600 begins in block 602, in which elements of source data are individually classified in any suitable manner, such as through a conventional automated process for individual classification, through hand coding, or through any other process. In block 604, an estimation module uses Equation 13 and information determined in block 602 to perform estimations of classification on individual elements in the unlabeled population. Block 604 may be performed in any suitable manner, such as by using $P(S_i=s_i|D_i=j)$ from the labeled set, the estimated value of $P(D_i=j)$ from, for example, any of the procedures described above or any other technique, and the $P(S_i=s_i)$ directly estimated nonparametrically from the unlabeled set in the manner set forth below.

As with the techniques described above, subsets of S and average different estimates of $P(D_i|S_i=s_i)$ may be used, although this time the averaging is via committee methods since each subset implies a different model (with the result constrained so that the individual classifications aggregate to the $\hat{P}(D)$ estimate). Each of these lower dimensional subsets (labeled "sub") also imply easier-to-satisfy assumptions than the full conditional relationship, $P(S_{sub}|D)=P_h(S_{sub}|D)$.

Figure 7:
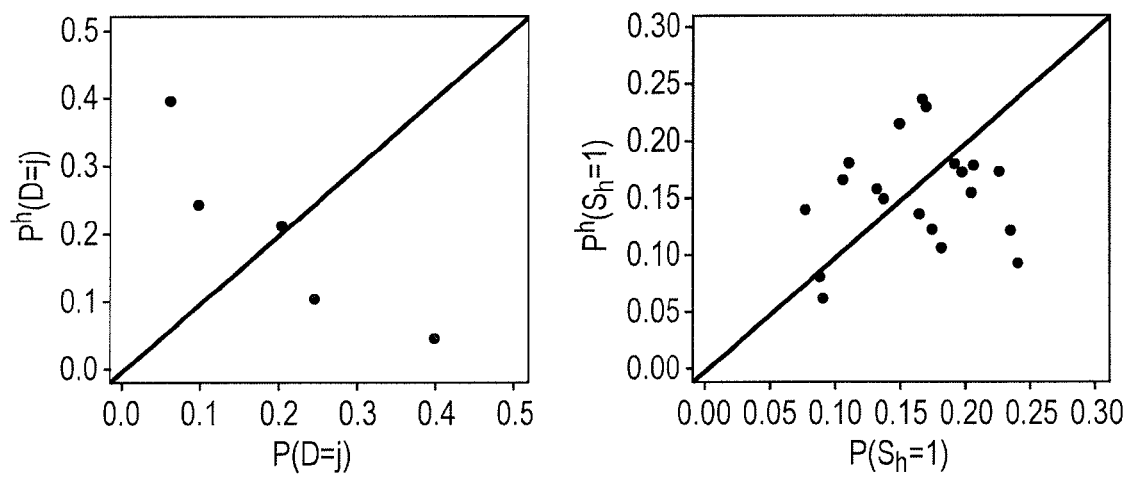
FIG. 7 show simulated data of proportions of observations in a labeled and population set (in the left panel) and proportion with a feature present (in the right panel)

The power of these results can be illustrated with a simple simulation. For simplicity, assume that features are independent conditional on the category labels in the labeled set, $P^h(S=s|D)=\Pi_{k=1}^K P(S_k=s_k|D)$, which is empirically reasonable except for heterogeneous residual categories. In the example, the data is then simulated, with 5 element categories, 20 word stem profiles (features), and 3000 elements in the labeled and unlabeled sets. The data is generated so as to have very different marginal distributions for P(S) and P(D). FIG. 7 gives these marginal distributions, plotting the unlabeled set values horizontally and labeled set vertically; note that few points are near the 45 degree line. These data are generated to violate the common joint distribution assumptions of all existing standard classifiers, but still meet the less restrictive conditional distribution assumption.

Figure 8:
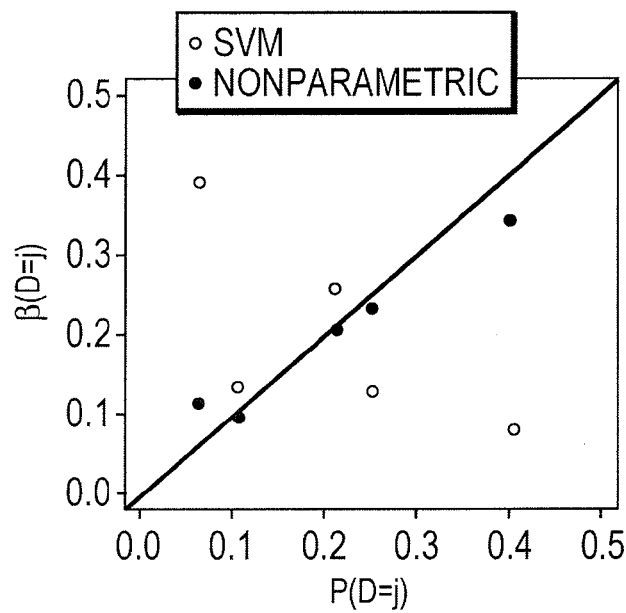
FIG. 8 shows a comparison of results of individual classification by a conventional support vector machine as compared to techniques operating according to some of the principles discussed herein.

For comparison, a standard support vector machine classifier is then run on the simulated data (such as one disclosed by Chang and Lin (2001) or any other suitable classifier), which classifies only 40.5 percent of the observations correctly. In contrast, the simple nonparametric alternative operating according to the principles disclosed herein classifies 59.8 percent of the same observations correctly. One advantage of the method described herein comes from the adjustment of the marginals to fit $\hat{P}(D)$ in the "unlabeled" set. This can be seen by viewing the aggregate results, which appear in FIG. 8 with the truth plotted horizontally and estimates vertically. Note that the estimates (plotted with black disks) are much closer to the 45 degree line for every true value than the SVM estimates (plotted with open circles).

This section illustrates only the general implications of one exemplary strategy for individual classification. It should be straightforward to extend these results to provide a simple but powerful correction to any existing classifier, as well a more complete nonparametric classifier, and such variations are intended to be a part of this disclosure.

Results of Application of Exemplary Techniques

Having described exemplary methods for estimating the distribution of elements in categories, it may be shown how embodiments of the invention work in practice. A simple simulated example is shown first, followed by several real examples from different fields, which are then followed with an empirical examination of selecting varying numbers of elements to be individually classified to determine the labeled set.

Simulations with Blog Data

In this example, a simulated data set of 5 words is chosen having $2^5=32$ possible word profiles. To generate a realistic labeled data set, $P^h(D)$ is set to be the empirical distribution tabulated from the individually classified blogs. Then the population element category frequencies, P(D), are set to very different values. It is assumed that the same distribution of language used for each category is approximately the same in the two sets, so that Equation 9 holds. A value $\tilde{D}$ is then drawn from $P^h(D)$, the simulation modeled according to $P^h(S|\tilde{D})$, and the simulated matrix $\tilde{S}$ drawn from this density. This is repeated 1,000 times to produce the labeled data set, and analogously for the population.

Figure 9:
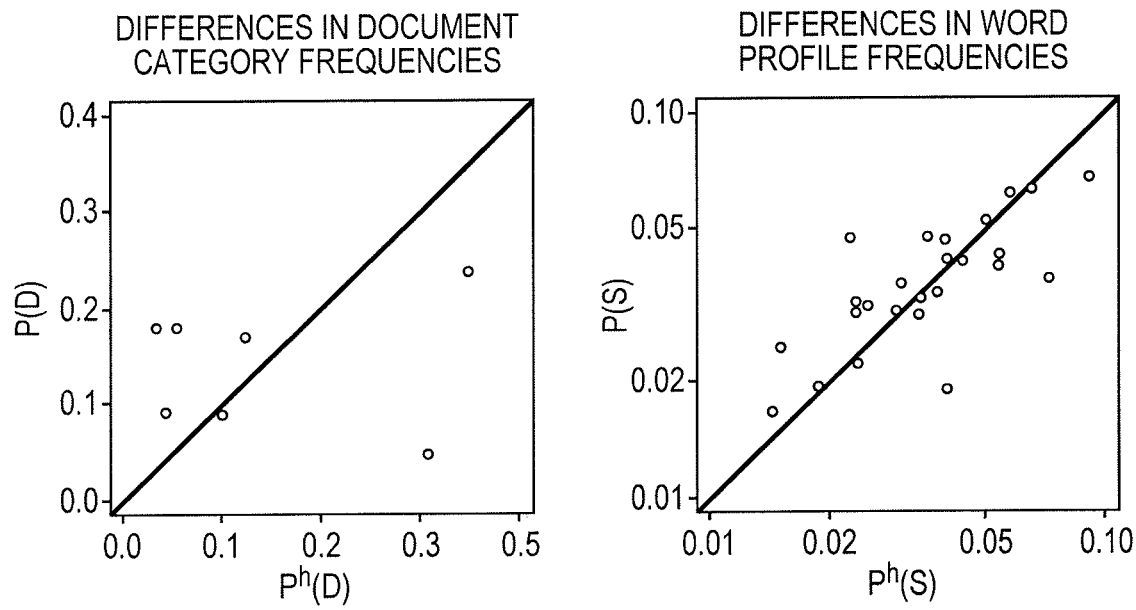
FIG. 9 shows differences between labeled and population element sets that would bias conventional supervised learning estimators.

FIG. 9 summarizes the sharp differences between the individually classified and population distributions in these data. The left graph plots $P^h(D)$ horizontally by P(D) vertically, where the seven circles represent the category proportions. If the proportions were equal, they would all fall on the 45° line. If one used the labeled, individually classified sample in this case via direct sampling to estimate the element category frequencies in the population, the result would not even be positively correlated with the truth.

The differences between the two distributions of word frequency profiles appear in the right graph (where for clarity the axes, but not labels, are on the log scale). Each circle in this graph represents the proportion of elements with a specific word profile. Again, if the two distributions were the same, all the circles would appear on the diagonal line, but again many of the circles fall far from this line, indicating the large differences between the two samples.

Figure 10:
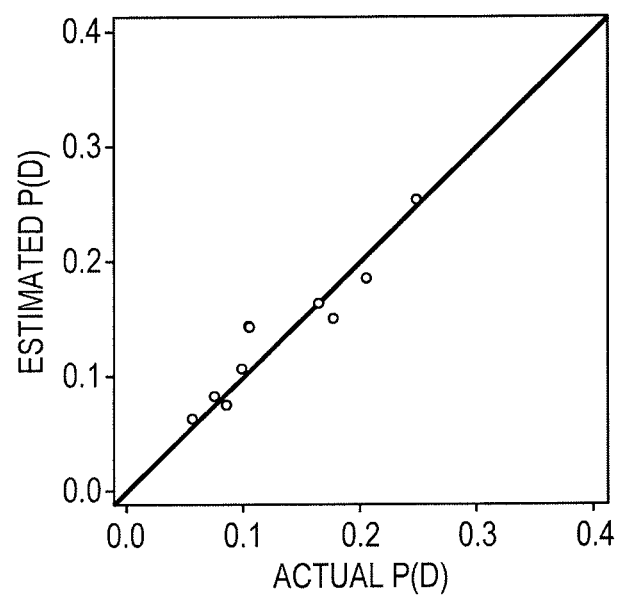
FIG. 10 depicts how despite the differences in P(D) and P(S) between the labeled and test sets shown in FIG. 6, a nonparametric estimator according to one embodiment of the invention remains approximately unbiased and statistically consistent.

Despite the considerable differences between the labeled data set and the population, and the fact that even much smaller differences would bias standard approaches, embodiments of the invention still produce accurate estimates. FIG. 10 presents illustrative results. The actual P(D) is on the horizontal axis and the estimated version is on the vertical axis, with each of the seven circles representing one of the element frequency categories. Estimates that are accurate fall on the 45° line. In fact, the points are all huddled close to this equality line, with even the maximum distance from the line for any point being quite small.

Simulations Using Other Data

Figure 11:
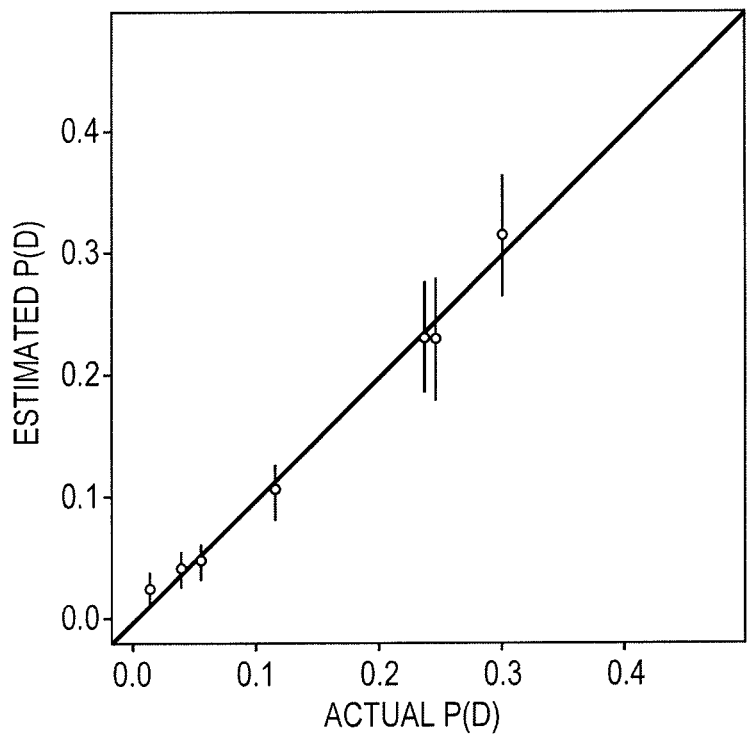
FIG. 11 shows several plots giving the estimated element category frequencies (vertically) by the actual frequencies (horizontally)

Three direct out-of-sample tests of embodiments of the invention in different types of data are described below. The first starts with 4,303 blog posts which mention George W. Bush. These posts include 201,676 unique words and 3,165 unique word stems among those appearing in more than 1 percent and fewer than 99 percent of the posts. The data set is randomly divided in half between the labeled set and unlabeled set, and half (or 713) of the posts coded −2 or NB among those in the unlabeled set are then randomly deleted. An unlabeled set therefore intentionally selects on (what would be considered, in standard supervised learning approaches) the dependent variable. This adjustment would create selection bias in the standard approach but, as shown herein, leaves inferences from the techniques described herein approximately unbiased. The results from the nonparametric estimator of some embodiments of the invention appear in FIG. 11. This graph plots one circle for each of the seven categories, with 95 percent confidence intervals appearing as a vertical line through it. Clearly, most of the points are quite close to the 45 degree line, indicating approximately unbiased estimates, and all are within the 95 percent confidence intervals.

Figure 12:
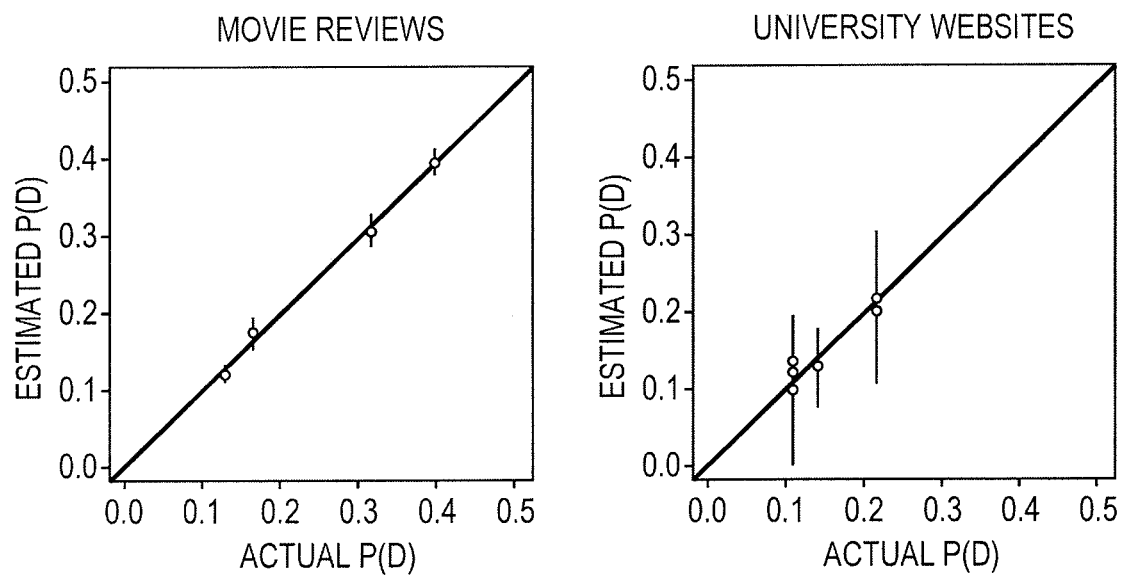
FIG. 12 displays the accuracy of the nonparametric method in recovering the distribution of ordered categories for movie reviews and university websites.

A second example is from a standard corpus of movie review ratings commonly used in the computer science literature to evaluate supervised learning methods. The categorization is one, two, three, or four stars indicating the quality of the movie. The results using the nonparametric estimator appear in the left graph in FIG. 12, and are again quite accurate. Deviations from the 45° line are due to slight violations of the assumption in Equation 9, perhaps due to category drift.

The final example is from the Carnegie Mellon University Text Learning Group on university web sites, another standard computer science corpus used to test supervised learning methods. This project classified University webpages in 1997 as belonging in one of seven non-ordered categories (student, faculty, staff, department, course, project, or other). In this example, all 8,275 webpages are used as the training set and a deliberately-skewed sample of 930 as the test set. The results appear on the right graph in FIG. 12. Again, a nonparametric method gives estimates that are all clustered near the 45° line and within the 95 percent confidence intervals, indicating highly accurate estimates.

Exemplary Techniques for Selecting a Number of Elements in the Labeled Set

Any remaining bias in the exemplary estimator is primarily a function of the assumption in Equation 9. In contrast, efficiency, as well as confidence intervals and standard errors, are primarily a function of how many elements are individually classified. But how many is enough? Individual classification may be expensive and time consuming and so it is desirable to limit its use as much as possible, subject to acceptable uncertainty intervals.

Figure 13:
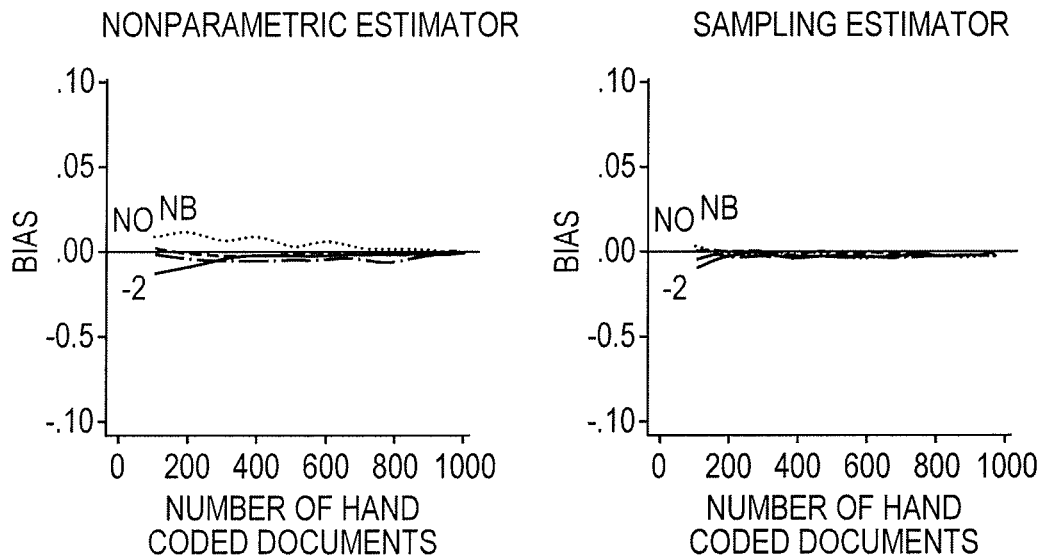
FIG. 13 shows an estimate of bias in the categorization techniques employed by embodiments of the invention by number of individually-classified elements.

To study this question, bias is set aside by randomly sampling the labeled set directly from the population. For both an estimator in accordance with one exemplary technique disclosed herein (on the left) and the conventional direct sampling estimator (on the right), FIG. 13 plots the bias vertically by the number of individually-classified elements in the labeled test set horizontally. Zero bias is indicated by a horizontal line.

In these data, a direct sampling approach is clearly optimal, and the right graph shows the absence of bias no matter how many elements are in the labeled set. The estimator operating according to the principles disclosed herein, in the left graph, is also approximately unbiased for the entire range of corpus sizes. That is, even for as few as 100 individually classified elements, both estimators are unbiased, and even the largest deviations of bias from zero is never much more than a single percentage point. The difference is that the dispersion around zero bias is slightly higher for the estimator than the error in direct sampling.

Figure 14:
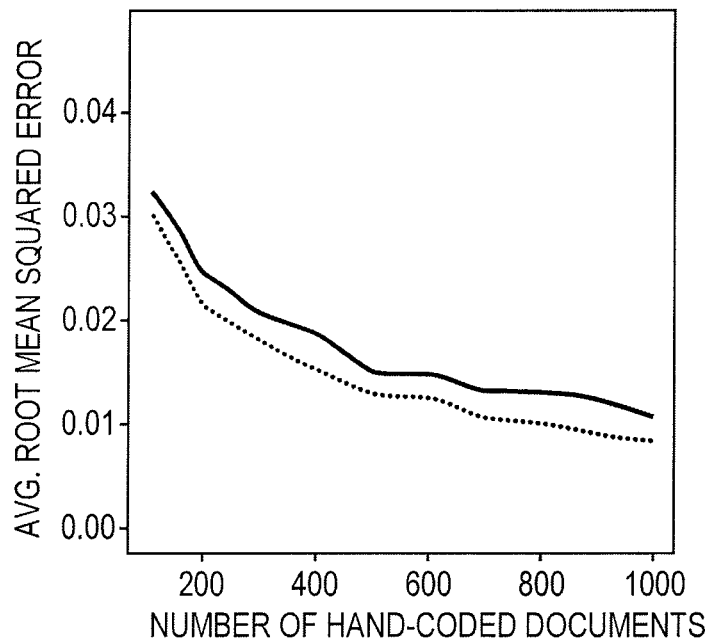
FIG. 14 shows a graph of the average root mean square error of elements misclassified by number of individually-classified elements of both a conventional method and a method according to one embodiment of the invention.

This pattern is easier to see in FIG. 14 where the root mean square error (RMSE) averaged across the categories is plotted vertically by the number of individually-classified elements horizontally for one embodiment of the invention (straight line) and the direct sampling estimator (dashed line). RMSE is lower for the direct estimator, of course, since this sample was drawn directly from the population and little computation is required, although the difference between the two is only about two tenths of a percentage point.

For one exemplary application of the techniques described herein, which will have considerably lower RMSE than the direct sampling when random sampling from the population is not possible, the RMSE drops fast as the number of individually classified elements increase. Even the highest RMSE, with only 100 elements in the labeled set, is only slightly higher than 3 percentage points, which would be acceptable for many applications (e.g., applications in the social sciences). (For example, most national surveys have a margin of error of at least 4 percentage points, even when assuming random sampling and excluding all other sources of error.) At about 500 elements, the advantage of more individual classification begins to suffer diminishing returns. In part this is because there is little more error to eliminate as, in this example, the technique then has an average RMSE of only about 1.5 percentage points.

The conclusion here is that individually classifying more than about 500 elements to estimate a specific quantity of interest is probably not necessary, unless one is interested in much more narrow confidence intervals than is common or in specific categories that happen to be rare. For some applications, as few as 100 elements may even be sufficient.

Techniques for Compensating for Unreliability in Classification

Developing categories, training coders or automated classifying techniques, and conducting individual classification of large scale sets is often a very difficult task. Although scholars no longer concede that "the procedures and the categories used in content analysis cannot be standardized," (Waples, D., Berelson, B., and Bradshaw, F. R. 1940. "What Reading Does to People: A Summary of Evidence on the Social Effects of Reading and a Statement of Problems for Research." The University of Chicago Press) the difficulty of the task is widely recognized. Inter-coder reliability (i.e., the rate at which two processes or two coders will agree on an individual classification) is measured in many different ways in the literature, but the rates tend to be lower with more categories and more theoretically interesting coding schemes. Reliability rates are not perfect in almost any study when elements are individually classified.

For example, in one experiment, at least two coders (i.e., human coders or automated processes for individual classification operating according to any suitable technique) categorize each of 4,169 blog posts. In this experiment, the coders agreed on the classification of 66.5 percent of the blog posts; they agreed on 71.3 percent of blog posts among those when both coders agreed the post contained an opinion; and they agreed on 92 percent of the posts for an aggregated classification of negative, neutral, or positive opinions among posts with opinions. Table 1 gives more detailed information about these results. For any two coders, arbitrarily named 1 and 2, each row in the table gives the probability of coder 2's classification given a particular classification d which coder 1 chose, $P(D_2|D_1=d)$, with the marginal probability for coder 1 appearing in the last column, $P(D_1)$. For instance, when coder 1 chooses category −2, coder 2 will choose the same category 70 percent of the time, category −1 10 percent of the time, category 0 1 percent of the time, and so on across the first row. This matrix is estimated from all 4,169 ordered coding pairs from five coders going in both directions. The "misclassification" (or "confusion") matrix in this table includes information from all combinations of observed ordered coder pairs. These numbers are comparable to other studies of individually classified data.

TABLE 1

|    | −2  | −1  | 0   | 1   | 2   | NA  | NB  | $P(D_1)$ |
|----|-----|-----|-----|-----|-----|-----|-----|----------|
| −2 | .70 | .10 | .01 | .01 | .00 | .02 | .16 | .28      |
| −1 | .33 | .25 | .04 | .02 | .01 | .01 | .35 | .08      |
| 0  | .13 | .17 | .13 | .11 | .05 | .02 | .40 | .02      |
| 1  | .07 | .06 | .08 | .20 | .25 | .01 | .34 | .03      |
| 2  | .03 | .03 | .03 | .22 | .43 | .01 | .25 | .03      |
| NA | .04 | .01 | .00 | .00 | .00 | .81 | .14 | .12      |
| NB | .10 | .07 | .02 | .02 | .02 | .04 | .75 | .45      |

Unfortunately, "the classical supervised classification paradigm is based on the assumption that there are no errors in the true class labels" and "that the classes are well defined" (Hand, 2006). Indeed, many applications, including the blog example above, make this same dubious assumption. The problem may be due to "conceptual stretching" (Collier, D. and Mahon, J. 1993. "Conceptual 'Stretching Revisited: Adapting Categories in Comparative Analysis." American Political Science Review 87(4 December):845-855) or "concept drift" (Widmer, G. and Kubat, M. 1996. "Learning in the presence of concept drift and hidden contexts." Machine Learning 23(1):69-101.) that could in principle be fixed with a more disciplined study of the categories or coder training. Or it may be that no amount of training could produce 100 percent reliability due to an inherent, irreducible uncertainty in representing human language in fixed categories. To some degree the latter is accurate, but a scientific approach to measurement means one must continually strive for better category definition, documentation, training, and evaluation.

Of course, no matter how careful procedures are, at some point conclusions must be drawn from the data with whatever level of misclassification remains. Judging from the literature, this point is almost always reached prior to eliminating all risk of misclassification. Many scholars simply act as if there exists no misclassification on average. Discussed below are the consequences of this procedure and a way to partially ameliorate the problem.

In some implementations of the techniques discussed herein, a technique called simulation-extrapolation (SIMEX)—proposed by J. Cook and L. Stefanski in "Simulation-extrapolation estimation in parametric measurement error models," *Journal of the American Statistical Association* 89:1314-1328, 1994—may be adapted to the problem of imperfectly coded content analyses. SIMEX turns out to be closely related to the jackknife (L. A. Stefanski and J. R. Cook in "Simulation-Extrapolation: The Measurement Error Jackknife," *Journal of the American Statistical Association* 90(432, December):1247-1256, 1995), and has subsequently been applied to several types of models. Below, first offer some intuition is offered, then some formalization, and finally an empirical illustration.

It should be appreciated that the embodiments described herein to address imperfect coding can be used together with any technique, including the techniques disclosed herein, for estimating the distribution of elements among categories, such as being implemented as at least a part of block 402 of process 400, or block 502 of process 500, both discussed above. The embodiments of the invention directed to addressing imperfect coding are not limited in this respect and can be used with any other technique for categorizing elements or determining a distribution of elements.

To build intuition, one implementation is illustrated by considering what occurs during research as a coding scheme becomes clearer, the coding rules improve, and coder training gets better. For clarity, imagine that through five successive rounds, different, more highly trained coders classify the same set of elements with improved coding rules. If done well, the results of each round will have higher rates of inter-coder reliability than the last. The final round will be best, but it will still not be perfect. If this process could be continued indefinitely, all misclassification may be banished, but this is typically infeasible.

Now suppose an estimate of the percent of elements in category 2 is 5 percent in the first round, 11 percent in the second, 14 percent in the third, 19 percent in the fourth, and 23 percent in the last round. The question, then, is what to do once these results are observed. The procedures conventionally used would have us use 23 percent as best estimate of the proportion in category 2. This is not an unreasonable approach, but it appears to leave some information on the table and thus might be improved on. In particular, if the proportion of elements in category 2 is increasing steadily as the levels of inter-coder reliability improve, then this proportion may be reasonably extrapolated to the point where inter-coder agreement is perfect. It may be concluded, then, that the true proportion in category 2 is actually somewhat larger than 23 percent. This idea may be formalized by building some type of regression model to predict the category 2 proportion with the level of inter-coder reliability and extrapolate to the unobserved point where reliability is perfect. Since this procedure involves extrapolation, it is inherently model dependent and so uncertainty from its inferences will exceed the nominal standard errors and confidence intervals. However, even using the figure from the final round and doing no subsequent processing still involves an extrapolation; it is just that the extrapolation ignores the information from previous rounds of coding. So using 23 percent as the estimate and ignoring this idea is no safer.

Figure 15:
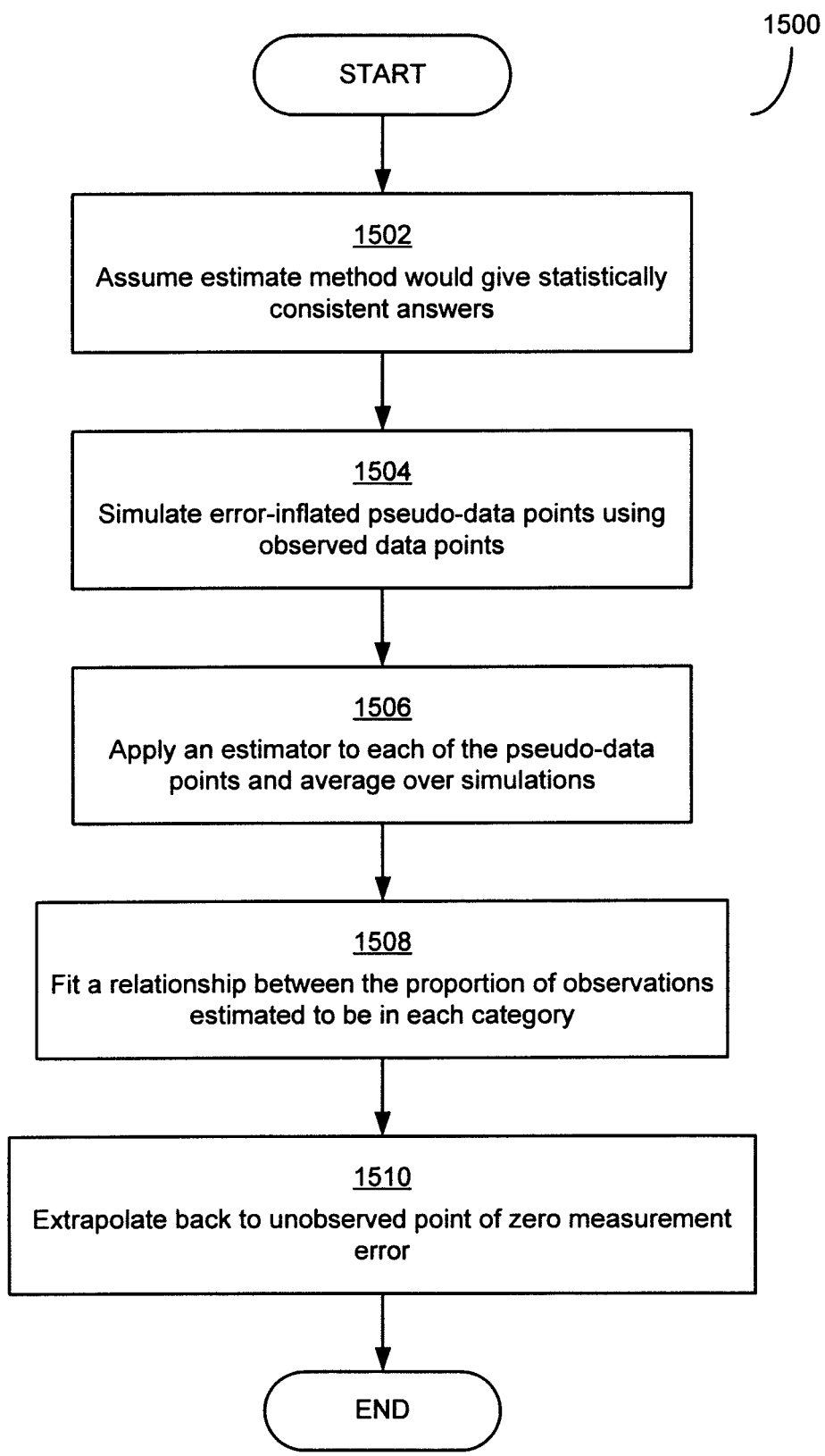
FIG. 15 shows a flowchart of an exemplary process for performing compensation on misclassifications in a labeled set of elements of data.

Since firing one's coders after each round of training is not feasible in most research, in one exemplary implementation of this compensation technique the observed misclassifications are used to simulate what would have happened to the element category proportions if there were even lower levels of inter-coder reliability, and extrapolate back to the point of no misclassification. An exemplary implementation of this SIMEX procedure is shown as process 1500 in FIG. 15, which involves five steps (though other processes implementing this procedure may comprise greater or fewer steps). First, in block 1502, a compensation module assumes that the estimation method used would give statistically consistent answers if it were applied to data with no misclassification. The same method applied to error-prone data is presumably biased. However, in this problem, the type of misclassification turns out to be easy to characterize, as in Table 1. Second, in block 1504, the compensation module takes each observed data point $D_i$ in the labeled set and simulate M error-inflated pseudo-data points, using the misclassification matrix in Table 1. This is done by drawing a new value of $\tilde{D}_i$ from the probability density in the row corresponding to the original observed value, effectively drawing $\tilde{D}_i$ from $P(\tilde{D}_i|D_i)$ given the observed data point $D_i$. This step creates a set of simulated data set by adding the same amount and type of measurement error that exists in the observed data to these pseudo-data. This procedure may be repeated with the pseudo-data just created to produce a sequence of sets, each with M additional error-inflated pseudo-data sets. Third, in block 1506, the compensation module applies an estimator in accordance with the techniques described above to each of the simulated pseudo-data sets, average over the M simulations for each level of added error. This leads to a sequence of pseudo-estimators, each corresponding to different levels of inter-coder reliability. Next, in block 1508, the compensation module fits a relationship between the proportion of observations estimated to be in each category from each error-inflated pseudo-data set and the amount of added error. Finally, in block 1510, the compensation module extrapolates back to the unobserved point of zero measurement error, transforms the results, and the process ends.

Figure 16:
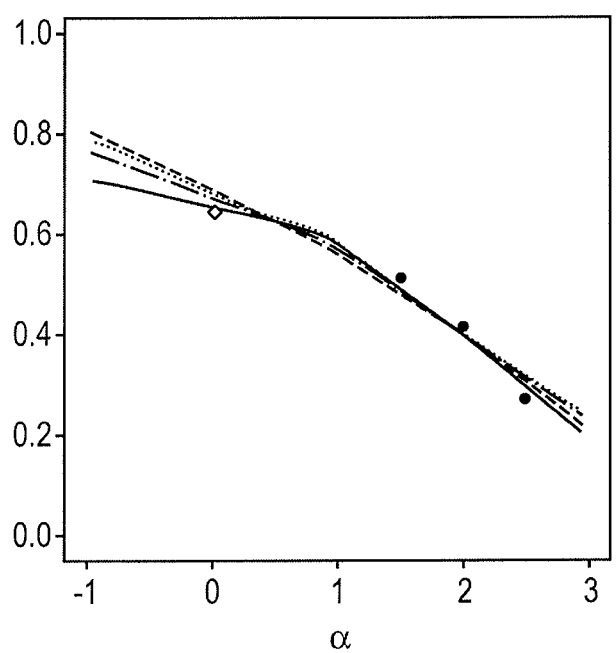
FIG. 16 shows an analysis of the proportion of elements in a category as the element distributions are adjusted according to one implementation of a simulation-extrapolation algorithm.

FIG. 16 gives an example of this procedure for one category from the blog data. The vertical axis of this graph is the proportion of observations in category NB. The horizontal axis, labeled α, gives the number of additional units of misclassification error added to the original data, with the observed data at value 0. The estimate of the element of $P(D=\{NB\})$ from the original data (corresponding to the last round of coding from the example in the previous paragraph) is denoted with a diamond above the value of zero. A value of α of 1 means that the original data was adjusted according to the misclassification matrix in Table 1 once; 2 means twice, etc. Some noninteger values are also included. In the application, it seems likely that the proportion of elements estimated that would have been estimated to be in category NB, if the coders had perfect rates of inter-coder reliability, would be higher than the proportion from the actual observed data.

All applications begin with the point estimated from the observed data at zero (marked by a diamond in the figure), and extrapolate it over to the horizontal axis value of −1, which denotes the data with no misclassification error. The implicit extrapolation used in almost all prior content analysis research occurs by effectively drawing a flat line from the diamond to the vertical axis on the left; this flat line is used regardless of what information is available. This procedure is not always wrong but it comes with no evidence that it is right and obviously offers no flexibility when new information arises.

The question is whether there might be sufficient information in the simulated error-inflated data to extrapolate better than using the existing flat line extrapolation procedure. In many cases, there is. In the example in FIG. 15, estimates from these error-inflated data also appear, as well as several alternative (LOESS-based) models used to form possible extrapolations. The result is model dependent by nature, but the same is the case whether the information from the simulated data is used or ignored.

Figure 17:
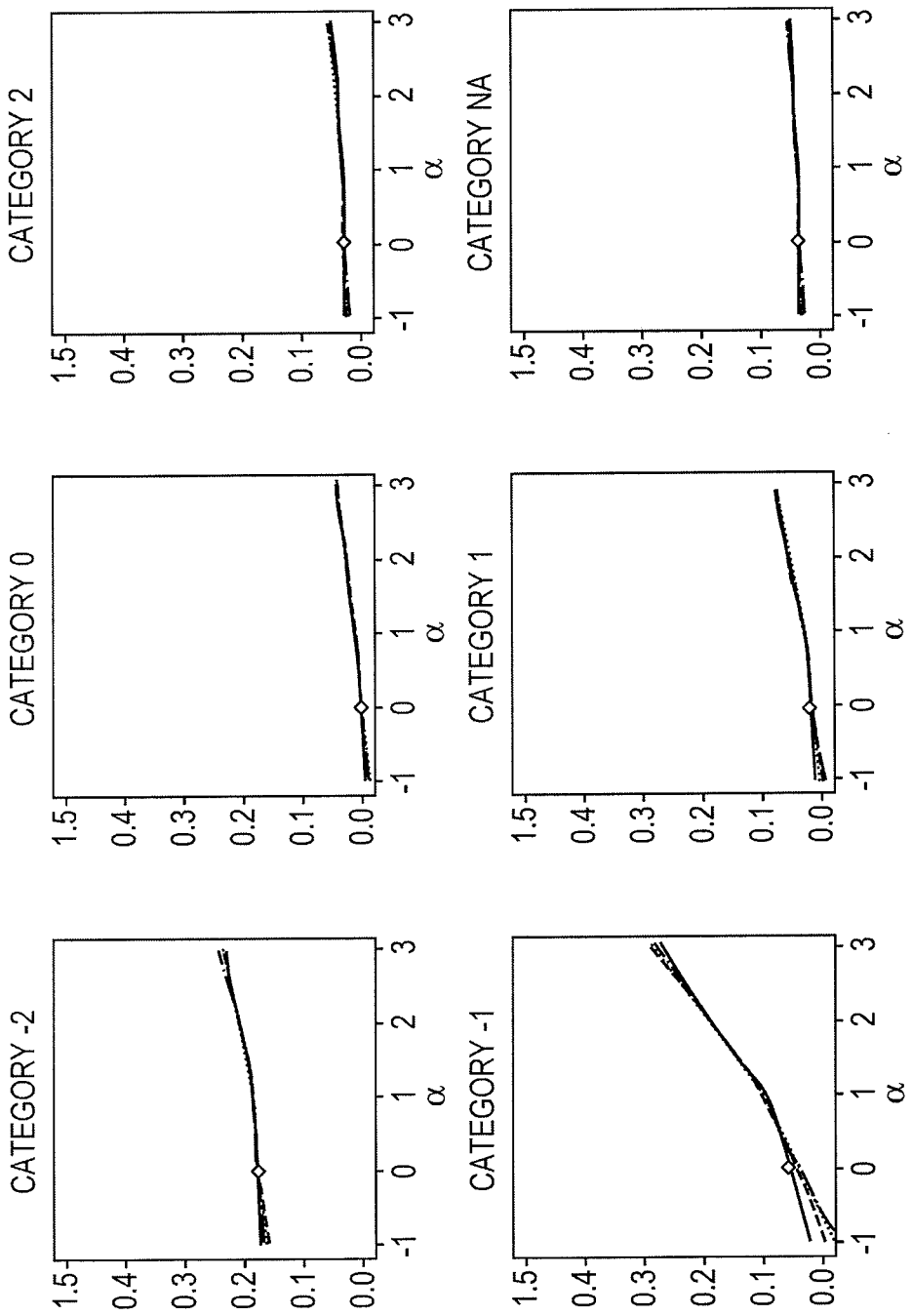
FIG. 17 shows an analysis of the proportion of elements in other categories as element distributions are adjusted according to one implementation of a simulation-extrapolation algorithm.

FIG. 17 presents analogous results from the remaining six element categories. In each case, there appears to be some additional information that may be useful in extrapolating the true proportion of elements to the left of the curve. Some of the uncertainty in extrapolation is illustrated in the graphs via separate lines, each from a different method used to extrapolate, but of course numerous other models could have been used instead. The key point of this section is that extrapolation is necessary whether or not this SIMEX procedure is used. The only other choice is to go back to trying to improve the categories, coding rules, and coder training.

Other Problems that May be Experienced in Some Applications

Discussed next are five problems that could arise that, if not addressed, could cause some of the techniques described herein to be biased or inefficient when applied to some applications and some types of source data, as well as ways to ameliorate these problems.

For some embodiments of the invention, a key issue is the assumption in Equation 12 that $P(S|D)$ is the same in the labeled and population sets. So if elements are being studied over a long time period, where the language used to characterize certain categories is likely to change, it would not be optimal to select the labeled test set only from the start of the period. Checking whether this assumption holds is not difficult and merely requires individually classifying some additional elements closer to the quantity presently being estimated and using them as a validation test set. If the data are collected over time, one can either individually classify several data sets from different time periods or gradually add classified elements collected over time.

Second, as King and Lu (2007) describe, each category of D should be defined so as not to be too heterogeneous. If a category is highly heterogeneous, then there may not be a single set of word profiles that could be used to characterize the language used for all elements in that category. This can be seen when one tries to describe the category and finds oneself using many different examples. This problem seems more likely to occur for residual or catch-all categories. Imagine how category "NB" (not a blog) in the data could be described. This is difficult since there are innumerable types of web sites that are not blogs, each with potentially very different language; yet this category was beneficial in the above example since the web search algorithm was not perfect. More bias may be found in estimating category NB than the others in the exemplary categorization. The small but noticeable bias in this category is apparent at the top line on the left in FIG. 13.

Third, some implementations of the techniques described herein involve choosing the number of word stems to use in each randomly chosen subset, when estimating $P(D)$ in applications wherein the source data comprises textual elements. While choosing the number of random subsets may be easy in some applications (the more the better, and so like any simulation method should be chosen based on available computer time and the precision needed), the number of word stems to use in each random subset should be chosen more carefully. Choosing too few or too many will leave $P(S)$ and $P(S|D)$ too sparse or too short and may result in attenuation bias due to measurement error in $P(S|D)$, which serve as the "explanatory variables" in the estimation equation. To make this choice in practice, a cross-validation technique may be used, such as by dividing the labeled set into a training and test set. (This division may be made randomly to ensure that this auxiliary study is not confounded by potential violations of the assumption in Equation 12.) The algorithm is not very sensitive to this choice, and so there is typically a range of values that work well. In practice, the number of word stems to choose to avoid sparseness bias mainly seems to be a function of the number of unique word stems in the elements. Although one can make the wrong choice, and making the right choice may take some effort, fixing any problem that may arise via these types of cross-validation tests is not difficult.

Fourth, a reasonable number of elements in each category of D should be individually classified. Although the efficiency of embodiments of the invention was studied as a function of the number of individually classified elements, these results would not hold if by chance some categories had very few individually classified elements and small differences in the proportions in these population categories were significant to a particular application. This makes sense, of course, since the method relies upon examples from which to generalize. Discovering too few examples for one or more categories can be dealt with in several ways. Most commonly, one can alter the definition of the categories, or can change the classification rules.

However, even if examples of some categories are rare, they may be sufficiently well represented in the much larger population set to be of interest. To deal with situations like this, it is preferable to find more examples from these relatively rare categories. Doing so by merely increasing the size of the individually classified data set would usually not be feasible and in any event would be wasteful given that it would result in many more coded elements in the more prevalent categories, but it may be possible to use available metadata to find the extra elements with higher probability. In the blogs data, blog posts of certain types may be found via links from other posts or from popular directories of certain types of blogs. Fortunately, the labeled set is assumed to be generated conditional on the categories, and so no bias is induced if extra examples of certain categories are added. In other words, $P(D)$ is already assumed to differ in the labeled and population sets and so selecting on D to over-represent some categories causes no difficulties with the techniques described herein.

Finally, techniques operating according to the principles disclosed herein rely upon access to reliable information. The original elements should contain the information needed, the individually classification steps should be reliable enough to extract the information from the elements, and the abstract quantitative summary of the element (in S) should be a sufficiently accurate representation and enough to estimate the quantities of interest. Each of these steps should involve considerable thought and careful study. For example, elements that do not contain the information needed should not be used to estimate quantities of interest. If humans cannot code elements into well-defined categories with some reasonable level of reliability, then automated procedures are unlikely to succeed at the same task. And of course many choices are available in producing abstract numerical summaries of written text elements.

Throughout all these potential problems, the best approach seems to be the radically empirical procedure suggested in the supervised learning literature: If the procedure chosen works, it works; if it doesn't, it doesn't. And so it is preferable to verify that procedures work, subdividing a labeled set into training and (truly out of sample) test sets and directly testing hypotheses about the success of the procedure directly. This should then ideally be repeated with different types of labeled test sets.

Relatedly, standard errors and confidence intervals take a very different role in this type of research than the typical observational social science work. Unlike many social science problems, if uncertainty is too large, it may be reduced by individually classifying some additional elements. In fact, sequential sampling is perfectly appropriate: After finding a valid categorization scheme, individually classify 100 elements and compute the quantities of interest and their confidence intervals or standard errors. If these estimates indicate more uncertainty than desired, individually classify more elements, add them to the first set, and reestimate. One can continue this procedure until one's confidence intervals are the desirable length. No bias will be induced by this sequential sampling plan.

Choosing Element Categories

An important part of any content analysis project, using either an entirely individual classification approach or some supervised learning method, is producing an acceptable categorization scheme. The difficulty is often surprising and frustrating to those who come anew to content analysis projects, but obvious once tried. The problem (and opportunity) is that human language and reasoning admits to an extraordinarily large and complicated set of possible expressed opinions, and no theory exists which can reliably predict what categorization scheme will work for any given set of elements ex ante.

Unfortunately, these problems are not often discussed in sufficient detail in published research. Although it appears to be the same in most areas of application, Kolbe and Burnett ("Content-Analysis Research: An Examination of Applications with Directives for Improving Research Reliability and Objectivity." *The Journal of Consumer Research* 18(2):243-250. 1991) summarize an extensive review of content analyses in consumer research by writing "Most factors pertaining to objectivity were either unreported or unattended by authors. Problems with reliability reporting . . . were also present." Social science content analysis literature and experienced researches in the area indicate that a great deal of work typically goes into improving reliability. However, this work is not often discussed in published work, success remains at best uneven, and intercoder reliability statistics go unreported (or not fully reported) in about half of all published content analysis work. Some suggestions are therefore offered below. While the techniques described herein can be used with a labeled set produced using any technique, below are some suggestions for effective coding.

It should be appreciated that the suggestions offered below may improve category selection in some, but not necessarily all, applications, and that categories may be selected in any suitable manner. The invention is not limited to operating with any particular number or type of categories, nor to operating with any particular process or technique for selecting categories.

The basic rules of coding are: (1) Find a categorization scheme that encodes the social science question being asked in categories that are mutually exclusive (so each element goes into only one category) and exhaustive (so all elements are classified). The categories may be purely nominal, ordered, partially ordered, unidimensional, multidimensional, or mixed. If the categories of interest are not mutually exclusive, researchers should determine subsets that are mutually exclusive, or else can categorize elements on multiple dimensions. The coding scheme used above in the blog example illustrates a number of these features. One possibility not included is categories with higher dimensional orderings, such as affect by partisanship, in addition to categories like NA and NB. One can also code the same elements in multiple parallel categorization schemes. (2) Produce a coding manual or set of classifying rules clear enough so that coders (e.g., human workers or automated classification processes) can be trained, at least in principle, by looking only at the manual and not querying operators or supervisors (thus ensuring that the research procedures are fully public, do not require the supervisor's involvement, and so are replicable at least in principle). (3) Measure the extent to which different classifiers can classify the same elements in the same ways (i.e., measure inter-classifier reliability). And (4) check for validity, ideally by comparison to some external gold standard, or more commonly in practice by the researcher reading and checking that the categories and codings reflect the theoretical concepts of interest. Of course, one cannot have validity without reliability and so much of the work in producing a coding scheme involves iterating between category definition and inter-coder reliability checks.

Checking inter-coder reliability is time-consuming and expensive, and ensuring that communications with coders are formalized in a set of written documents sometimes feels like an unnecessary hurdle in the way of progress. However, rigorous evaluation—large numbers of elements coded by two or more coders who only read a set of coding rules and do not interact with each other while coding—has no substitutes. Similarly, the various compromises that are made, such as having a third coder resolve discrepancies, or having two coders who disagree compare their respective reasoning or, in the event that coders are humans, talk out their differences, may often be reasonable compromises after a coding scheme is established, but they can make rigorous evaluation difficult if not impossible.

A fundamental difficulty in meeting these rules is that categorization schemes that seem theoretically appropriate before confronting the data often turn out to have low inter-coder reliability. Studying the exceptions then quickly reveals problems with the "theory." Adjustments can then go in two directions, often at the same time. One is to further articulate the categories, and the other is to simplify, usually by combining categories. The former may be theoretically more attractive, but it imposes even more burdens on coders, and so can lead to lower levels of inter-coder reliability.

These difficulties (and others) are illustrated below through the extensive attempts to find appropriate coding schemes for blogs for the example above. For one simple example, a dichotomous coding rule was used for whether a blog post was about the policies of President Bush and his administration or his personal character. This is a standard theoretical distinction in a large body of research, and is represented in many survey questions, theoretical discussions, and empirical analyses. But all this only means that the distinction is logically consistent and of theoretical interest; it does not mean that ordinary people express themselves the way these and other creative professional political scientists conceptualize the world. Indeed, it was found that no matter how precise the coding rules were made, and how the coders were trained, the inter-coder reliability rates in classifying according to this rule were lower than expected.

For example, consider the following two excerpts, each from a separate blog post, which clearly do not fit the policy/character distinction:

Example 1: "... What do I see in Bin Laden's words? I see a very desperate criminal trying in every way he knows to get us to agree to stop pushing him. I see that we are winning and he knows it, thus he will try to hit us in the spots that he thinks are weak so that we will give up. That means he will find the lies to which he discerns that Americans are susceptible and tell them to us. I am glad once again that Bush is president and not someone who would back down in front of terrorist threats."(http://floa.blogspot.com/2006_01_01_archive.html)

Example 2: "In spite of market and administration hype, the economy is on the decline. There are no positive trends. The latest unemployment statistics are deliberate, numerical deceptions. Using the workforce participation rate used in January of 2001, the current unemployment rate is actually 7.2 percent, not 5.2 percent as deceptively stated by the Bush administration." (http://unlawfulcombatnt.blogspot.com/2006/11/economy-updates.html)

Exceptions like these may be responded to with various common coding tricks. For example, coders may be instructed to identify the primary thrust of the criticism, and/or instructed that any criticism of policy should be classified as policy even if it also mentions character attributes. Coders may also be instructed that references only to specific policy actions should be coded as policy. Coding rules may be established wherein posts which do not reference specific policies are to be coded as character. Categories may be further articulated, by including a "both" category, in addition to "policy" and "character," to deal explicitly with ambiguous posts. In the blog example, throughout all these attempted solutions inter-coder reliability remained low. It turns out that deciding when a post was "both" was itself highly ambiguous, and that category turned out to have almost zero inter-coder reliability. No coding scheme for this distinction came close. Thus, in the blog example above it was determined that a categorization scheme based on this standard political science distinction was not feasible to use for categorizing political commentary by ordinary Americans.

Selection from King and Lu

A portion of the King and Lu paper of 2007, described above and incorporated herein by reference, is now reproduced herein. King and Lu apply some of the techniques above to verbal autopsy data to determine a distribution of causes of death. This selection is offered herein to provide another example of applications of the techniques described above, particularly in the case of data that may be considered partially structured.

National and international policymakers, public health officials, and medical personnel need information about the global distribution of deaths by cause in order to set research goals, budgetary priorities, and ameliorative policies. Yet, only 23 of the world's 192 countries have high quality death registration data, and 75 have no cause-specific mortality data at all. Even if data of dubious quality is included, less than a third of the deaths that occur worldwide each year have a cause certified by medical personnel.

Verbal autopsy is a technique "growing in importance" for estimating the cause-of-death distribution in populations without vital registration or other medical death certification. It involves collecting information about symptoms (including signs and other indicators) from the caretakers of each of a randomly selected set of deceased in some population of interest, and inferring the cause of death. Inferences in these data are extrapolated from patterns in a second data set from a nearby hospital where information on symptoms from caretakers as well as validated causes of death are available.

Verbal autopsy studies are now widely used throughout the developing world to estimate cause-specific mortality, and are increasingly being used for disease surveillance and sample registration. Verbal autopsy is used on an ongoing basis and on a large scale in India and China, and in 36 demographic surveillance sites around the world. The technique has also proven useful in studying risk factors for specific diseases, infectious disease outbreaks, and the effects of public health interventions.

In this paper, the best current verbal autopsy approaches and the not-always-fully-appreciated assumptions underlying them are described. It is also shown that a key problem researchers have in satisfying most of the assumptions in real applications can be traced to the constraint existing methods impose by requiring the analysis of only one cause of death at a time. Current methods are generalized to allow many causes of death to be analyzed simultaneously. This simple generalization turns out to have some considerable advantages for practice, such as making it unnecessary to conduct expensive physician reviews, specify parametric statistical models that predict the cause of death, or build elaborate expert algorithms. Although the missing (cause of death) information guarantees that verbal autopsy estimates always have an important element of uncertainty, the new method offered here greatly reduces the unverified assumptions necessary to draw valid inferences.

Denote the cause of death j (for possible causes $j=1, \ldots, J$) of individual i as $D_i=j$. Bereaved relatives or caretakers are asked about each of a set of symptoms (possibly including signs or other indicators) experienced by the deceased before death. Each symptom k (for possible symptoms $k=1, \ldots, K$) is reported by bereaved relatives to have been present, which are denoted for individual i as $S_{ik}=1$, or absent, $S_{ik}=0$. The set of symptoms reported about an individual death, $\{S_{i1}, \ldots, S_{iK}\}$, is summarized as the vector $S_i$. Thus, the cause of death $D_i$ is one variable with many possible values, whereas the symptoms $S_i$ constitute a set of variables, each with a dichotomous outcome.

Data come from two sources. The first is a hospital or other validation site, where both $S_i$ and $D_i$ are available for each individual i ($i=1, \ldots, n$). The second is the community or some population about which an inference is desired, where $S_l$ (but not $D_l$) is observed for each individual l ($l=1, \ldots, L$). Ideally, the second source of data constitutes a random sample from a large population of interest, but it could also represent any other relevant target group.

The quantity of interest for the entire analysis is P(D), the distribution of cause-specific mortality in the population. Public health scholars are not normally interested in the cause of death $D_l$ of any particular individual in the population (although some current methods require estimates of these as intermediate values to compute P(D)), they are interested in the cause of death for subgroups, such as age, sex, or condition.

The difficulty of verbal autopsy analyses is that the population cause of death distribution is not necessarily the same in the hospital where D is observed. In addition, researchers often do not sample from the hospital randomly, and instead over-sample deaths due to causes that may be rare in the hospital. Thus, in general, the cause of death distribution in the two samples cannot be assumed to be the same: $P(D) \neq P^h(D)$.

Since symptoms are consequences of the cause of death, the data generation process has a clear ordering: Each disease or injury D=j produces some symptom profiles (sometimes called "syndromes" or values of S) with higher probability than others. These conditional probability distributions are represented as $P^h(S|D)$ for data generated in the hospital and $P(S|D)$ in the population. Thus, since the distribution of symptom profiles equals the distribution of symptoms given deaths weighted by the distribution of deaths, the symptom distribution will not normally be observed to be the same in the two samples: $P(S) \neq P^h(S)$.

Whereas P(D) is a multinomial distribution with J outcomes, P(S) may be thought of as either a multivariate distribution of K binary variables or equivalently as a univariate multinomial distribution with $2^K$ possible outcomes, each of which is a possible symptom profile. The $2^K$ representation is usually used.

The most widely used current method for estimating cause of death distributions in verbal autopsy data is the following multi-stage estimation strategy:

1. Choose a cause of death, which is referred to here as cause of death D=1, apply the remaining steps to estimate P(D=1), and then repeat for each additional cause of interest (changing 1 to 2, then 3, etc).
2. Using hospital data, develop a method of using a set of symptoms S to create a prediction for D, labeled $\hat{D}$ (and which takes on the value 1 or not 1). Some do this directly using informal, qualitative, or deterministic prediction procedures, such as physician review or expert algorithms. Others use formal statistical prediction methods (called "data-derived algorithms" in the verbal autopsy literature), such as logistic regression or neural networks, which involve fitting $P^h(D|S)$ to the data and then turning it into a 0/1 prediction for an individual. Typically this means that if the estimate of $P^h(D=1|S)$ is greater than 0.5, set the prediction as $\hat{D}=1$ and otherwise set $\hat{D}\neq 1$. Of course, physicians and those who create expert algorithms implicitly calculate $P^h(D=1|S)$, even if they never do so formally.
3. Using data on the set of symptoms for each individual in the community, $S_l$, and the same prediction method fit to hospital data, $P^h(D_l=1|S_l)$, create a prediction $\hat{D}_l$ for all individuals sampled in the community (l=1, . . . , L) and average them to produce a preliminary or "crude" estimate of the prevalence of the disease of interest, $P(\hat{D}=1)=\Sigma_{l=1}^{L}\hat{D}_l/L$.
4. Finally, estimate the sensitivity, $P^h(\hat{D}=1|D=1)$, and specificity, $P_h(\hat{D}\neq 1|D\neq 1)$, of the prediction method in hospital data and use it to "correct" the crude estimate and produce the final estimate:

$$P(D=1) = \frac{P(\hat{D}=1) - [1 - P^h(\hat{D}\neq 1 | D\neq 1)]}{P^h(\hat{D}=1 | D=1) - [1 - P^h(\hat{D}\neq 1 | D\neq 1)]} \quad (14)$$

5. This correction, sometimes known as "back calculation", is useful because the crude prediction, $P(\hat{D}=1)$, can be inaccurate if sensitivity and specificity are not 100%.

A variety of creative modifications of this procedure have also been tried. These include meta-analyses of collections of studies, different methods of estimating $\hat{D}$, many applications with different sets of symptoms and different survey instruments, and other ways of combining the separate analyses from different diseases. See also work in statistics and political science that use different approaches to methodologically related but substantively different problems.

The method described above makes three key assumptions that are described below. Then in the following section, a generalized approach is developed that reduces reliance on the first assumption and renders the remaining two unnecessary.

The first assumption is that the sensitivity and specificity of $\hat{D}$ estimated from the hospital data are the same as that in the population:

$$P(\hat{D}=1|D=1)=P^h(\hat{D}=1|D=1)$$

$$P(\hat{D}\neq 1|D\neq 1)=P^h(\hat{D}\neq 1|D\neq 1). \quad (15)$$

The literature contains much discussion of this assumption, the variability of estimates of sensitivity and specificity across sites, and good advice about controlling their variability.

A less well known but worrisome aspect of this first assumption arises from the choice of analyzing the J-category death variable as if it were a dichotomy. Because of the composite nature of the aggregated $D\neq 1$ category of death, it is assumed here that what makes up this composite is the same in the hospital and population. If it is not, then the required assumption about specificity (i.e., about the accuracy of estimation of this composite category) cannot hold in the hospital and population, even if sensitivity is the same. In fact, satisfying this assumption is more difficult than may be generally understood. To make this point, the decomposition of specificity is first assumed to be one minus the sum of the probability of different misclassifications times their respective prevalences:

$$P(\hat{D}\neq 1 | D\neq 1) = 1 - \sum_{j=2}^{J} P(\hat{D}=1 | D=j)\frac{P(D=j)}{P(D\neq 1)}, \quad (16)$$

which emphasizes the composite nature of the $D\neq 1$ category. Then it is asked: under what conditions can specificity in the hospital equal that in the population if the distribution of cause of death differs? The mathematical condition can be easily derived by substituting Equation 16 into each side of the second equation of Equation 14 (and simplifying by dropping the "1—" on both sides):

$$\sum_{j=2}^{J} P(\hat{D}=1 | D=j)\frac{P(D=j)}{P(D\neq j)} = \sum_{j=2}^{J} P^h(\hat{D}=1 | D=j)\frac{P^h(D=j)}{P^h(D\neq j)} \quad (17)$$

If this equation holds, then this first assumption holds. And if J=2, this equation reduces to the first line of Equation 15 and so, in that situation, the assumption is unproblematic.

However, for more than two diseases specificity involves a composite cause of death category. It is known that the distribution of causes of death (the last factor on each side of Equation 17) differs in the hospital and population by design, and so the equation can hold only if a miraculous mathematical coincidence holds, whereby the probability of misclassifying each cause of death as the first cause occurs in a pattern that happens to cancel out differences in the prevalence of causes between the two samples. For example, this would not occur according to any theory or observation of mortality patterns offered in the literature. Verbal autopsy scholars recognize that some values of sensitivity and specificity are impossible when Equation 14 produces estimates of P(D=1) greater than one. They then use information to question the values of, or modify, estimates of sensitivity and specificity, but the problem is not necessarily due to incorrect estimates of these quantities and could merely be due to the fact that the procedure requires assumptions that are impossible to meet. In fact, as the number of causes of death increase, the required assumption can only hold if sensitivity and specificity are each 100 percent. This is not the case in real data.

The text describes how this first assumption can be met by discussing specificity only with respect to cause of death 1. In the general case, Equation 17 for all causes requires satisfying $$\Sigma_j P(\hat{D} \neq j | D \neq j) - (J-2) = \Sigma_j [P(\hat{D} \neq j | D \neq j) + P(\hat{D} = j | D = j)] P(D = j) \quad (18)$$

For small J>2, this will hold only if a highly unlikely mathematical coincidence occurs; for large J, this condition is not met in general unless sensitivity and specificity is 1 for all j.

The second assumption is that the (explicit or implicit) model underlying the prediction method used in the hospital must also hold in the population: $P(D|S)=P^h(D|S)$. For example, if logistic regression is the prediction method, this assumption is made by taking the coefficients estimated in hospital data and using them to multiply by symptoms collected in the population to predict the cause of death in the population. This is an important assumption, but not a natural one since the data generation process is the reverse: P(S|D). And, even if the identical data generation process held in the population and hospital, $P(S|D)=P^h(S|D)$, there would be no reason to believe that $P(D|S)=P^h(D|S)$ holds. The assumption might hold by luck, but coming up with a good reason why it should be believed that this holds in any real case seems unlikely.

This problem is easy to see by generating data from a regression model with D as the explanatory variable and S as the simple dependent variable, and then regressing S on D: Unless the regression fits perfectly, the coefficients from the first regression do not determine those in the second. Similarly, when Spring comes, one is much more likely to see many green leaves; but visiting the vegetable section of the supermarket in the middle of the winter seems unlikely to cause the earth's axis to tilt toward the sun. Of course, it just may be that a prediction method can be found for which $P(D|S)=P^h(D|S)$ holds, but knowing whether it does or even having a theory about it seems unlikely. It is also possible, with a small number of causes of death, that the sensitivity and specificity for the wrong model fit to hospital data could by chance be correct when applied to the population, but it is hard to conceive of a situation when one would know this ex ante. This is especially true given the issues with the first assumption: the fact that the composite $D \neq 1$ category is by definition different in the population and hospital implies that different symptoms will be required predictors for the two models, hence invalidating this assumption.

An additional problem with the current approach is that the multi-stage procedure estimates P(D=j) for each j separately, but for the ultimate results to make any sense the probability of a death occurring due to some cause must be 100%: $\Sigma_{j=1}^J P(D=j)=1$. This can happen if the standard estimation method is used, but it will hold only by chance.

The key problem underlying the veracity of each of the assumptions above can be traced to the practice of sequentially dichotomizing the J-category cause of death variable. In analyzing the first assumption, it is seen that specificity cannot be equal in hospital and population data as the number of causes that make up the composite residual category gets large. In the second assumption, the practice of collapsing the relationship between S and D into a dichotomous prediction, $\hat{D}$, requires making assumptions opposite to the data generation process and either a sophisticated statistical model, or an expensive physician review or set of expert algorithms, to summarize P(D|S). And finally, the estimated cause of death probabilities do not necessarily sum to one in the existing approach precisely because D is dichotomized in multiple ways and each dichotomy is analyzed separately.

Dichotomization has been used in each case to simplify the problem. However, it is shown below that most aspects of the assumptions with the existing approach are unnecessary once the J-category cause of death variable is treated as having J categories. Moreover, it is simpler conceptually than the current approach. This technique begins by reformulating the current approach so it is more amenable to further analysis and then generalizing it to the J-category case.

Under the current method's assumption that sensitivity and specificity are the same in the hospital and population, the back-calculation formula in Equation 1 can be rearranged as $$P(\hat{D}=1)=P(\hat{D}=1|D=1)P(D=1)+P(\hat{D}=1|D\neq 1)P(D\neq 1) \quad (19)$$

and Equation 5 rewritten in equivalent matrix terms as $$\underset{2\times 1}{P(\hat{D})} = \underset{2\times 2}{P(\hat{D}|D)} \underset{2\times 1}{P(D)} \quad (20)$$

where the extra notation indicates the dimension of the matrix or vector. So $P(\hat{D})$ and $P(D)$ are now both 2×1 vectors, and have elements $[P(\hat{D}=1), P(\hat{D}\neq 1)]'$ and $[P(D=1), P(D\neq 1)]'$, respectively; and $P(\hat{D}|D)$ is a 2×2 matrix where $$P(\hat{D}|D) = \begin{pmatrix} P(\hat{D}=1|D=1) & P(\hat{D}=1|D\neq 1) \\ P(\hat{D}\neq 1|D=1) & P(\hat{D}\neq 1|D\neq 1) \end{pmatrix}.$$

Whereas Equation 14 is solved for P(D=1) by plugging in values for each term on the right side, Equation 20 is solved for P(D) by linear algebra. Fortunately, the linear algebra required is simple and well known from the least squares solution in linear regression. $P(\hat{D})$ is thus recognized as taking the role of a "dependent variable," $P(\hat{D}|D)$ as two "explanatory variables," and P(D) as the coefficient vector to be solved for. Applying least squares yields an estimate of P(D), the first element of which, P(D=1), is exactly the same as that in Equation 10. Thus far, only the mathematical representation has changed; the assumptions, intuitions, and estimator remain identical to the existing method described above.

The advantage of switching to matrix representations is that they can be readily generalized, which can be done in two important ways. First, the modeling necessary to produce the cause of death for each individual $\hat{D}$ is dropped, and S is used in its place directly. And second, D is not dichotomized, but instead treated as a full J-category variable. Both generalizations can be implemented via a matrix expression that is the direct analogue of Equation 19:

$$P(S) = P(S|D)P(D) \atop {}_{2^K \times 1} \quad {}_{2^K \times J} \quad {}_{J \times 1} \qquad (21)$$

The quantity of interest in this expression remains P(D). Although nonparametric estimation methods may be used, in principle P(S) could be estimated by direct tabulation, by simply counting the fraction of people in the population who have each symptom profile. Since one does not observe and cannot directly estimate P(S|D) in the community (because D is unobserved), it is estimated here from the hospital and an equality P(S|D)=$P^h$(S|D) is assumed. Also, $P^h$(S|D=j) is estimated for each cause of death j in the same way as done for P(S).

The only assumption required for connecting the two samples is P(S|D)=$P^h$(S|D), which is natural as it directly corresponds to the data generation process. It is not assumed that P(S) and $P^h$(S) are equal, P(D) and $P^h$(D) are equal, or P(D|S) and $P^h$(D|S) are equal. In fact, prediction methods for estimating P(D|S) or $\hat{D}$ are entirely unnecessary here, and so unlike the current approach, this approach does not require parametric statistical modeling, physician review, or expert algorithms.

Equation 7 can be solved for P(D) directly. This can be done conceptually using least squares. That is, P(S) takes the role of a "dependent variable," P(S|D) takes the role of a matrix of J "explanatory variables," each column corresponding to a different cause of death, and P(D) is the "coefficient vector" with J elements for which a solution is desired. This procedure can also be modified using any suitable methods to ensure that the estimates of P(D) are each between zero and one and together sum to one by changing least squares to constrained least squares.

Although producing estimates from this expression involves some computational complexities, this is a single equation procedure that is conceptually far simpler than current practice. As described above, the existing approach requires four steps, applied sequentially to each cause of death. In contrast, estimates from this proposed alternative only require understanding each term in Equation 19 and solving for P(D).

Since deaths are not observed in populations in which verbal autopsy methods are used, realistic validation of any method is, by definition, difficult or impossible. Simulations of this method are presented below in two separate ways in data from China and Tanzania.

China: An analysis was done of 2,027 registered deaths from hospitals in urban China collected and analyzed by Alan Lopez and colleagues. Seventeen causes of death were coded, and 56 (yes or no) symptoms were elicited from caretakers. Three separate analyses were conducted with these data. The first test was designed to meet the assumptions of the method by randomly splitting these data into halves. Although all these data were collected in hospitals, where both S and D can be observed, the first set is labeled "hospital data," for which both S and D are used, and the second "population data," for which only S is used during estimation. An actual verbal autopsy analysis is emulated by using these data to estimate the death frequency distribution, P(D), in the "population data." Finally, for validation, the actual cause of death variable for the "population data" that were set aside during the analysis is unveiled and compared to the estimates.

Figure 18:
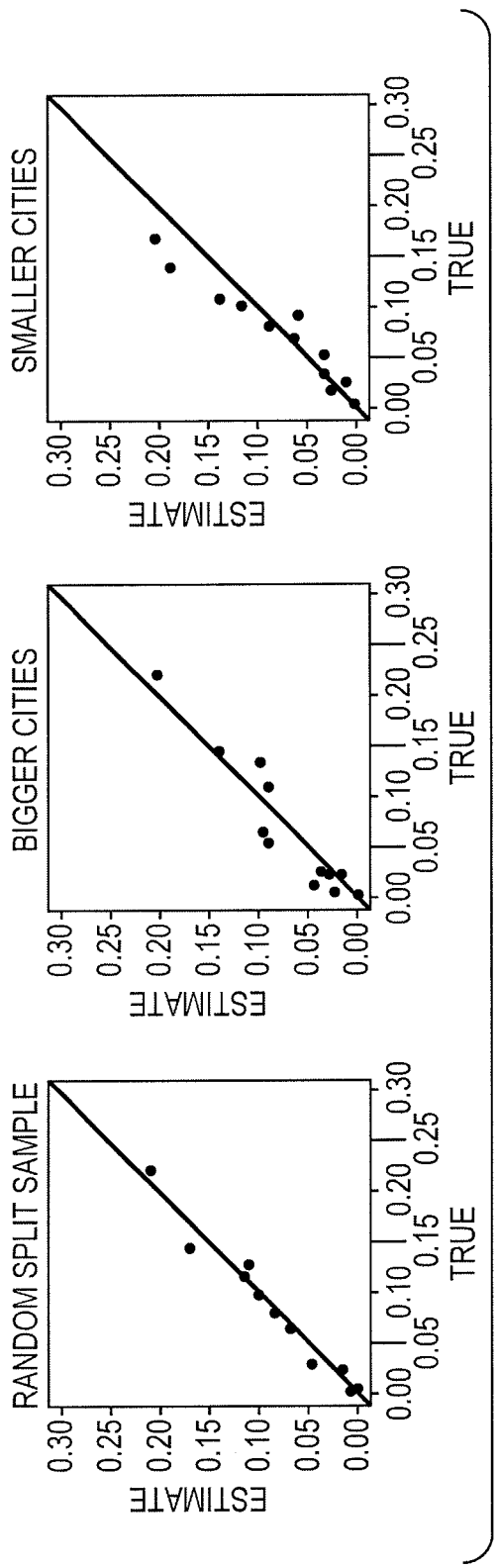
FIG. 18 shows validation in China of the verbal autopsy methods with multiple causes of death proposed by King and Lu (2007) (referenced below)

The estimates appear in the left graph of FIG. 18, which plots on the horizontal axis a direct sample estimate—the proportion of the population dying from each of 16 causes—and on the vertical axis an estimate from the verbal autopsy method. Since both are sample-based estimates and thus measures with error, if the method predicted perfectly, all points would fall approximately on the 45 degree line. Clearly, the fit of the estimates to the direct estimates of the truth is fairly close, with no clear pattern in deviations from the line.

For a more stringent test of the approach, the same sample is split into 980 observations from hospitals in large cities (Beijing, Shanghai, and Guangzhou) and 1,045 observations from hospitals in smaller cities (Haierbin, Wuhan, and Chendu). Each group then takes a turn playing the role of the "population" sample (with known cause of death used only for validation) and the other as the actual hospital sample. This is a more difficult test of the method than would be necessary in practice, since researchers would normally collect hospital data from a facility much closer to, part of, or more similar to the population to which they wish to infer.

The right two graphs in FIG. 18 give results from this test. The middle graph estimates the small city cause of death distribution from the large city hospitals, whereas the right graph does the reverse. The fit between the directly estimated true death proportions and the estimates of the method in both is slightly worse than for the left graph, where the assumptions were true by construction, but predictions in both are still excellent.

Although, to reduce graphical clutter, all these error estimates are not added to the graph, the median standard error of cause specific-mortality from this procedure is 5.8% larger than for the directly estimated proportion of the sample dying from cause j (i.e., $\overline{D}_j$, the standard error for which is approximately $$\sqrt{\overline{D}_j(1-\overline{D}_j)/n}).$$

Obviously, the reason verbal autopsy procedures are necessary is that direct estimates from the population are unobtainable, but it is encouraging that the uncertainty estimates are not that much larger than if one was able to measure causes of death directly.

Tanzania: The next example analyzes cause-specific mortality from a verbal autopsy study in Tanzania of adults and children. The adult data include 1,392 hospital deaths and 314 deaths from the general population, about which 51 symptoms questions and 31 causes of death were collected. The special feature of these data is that all the population deaths have medically certified causes, and so one can set aside that information and use it to validate the approach. Again, S and D from the hospital and S from the population are used in an attempt to estimate P(D) in the population, using D from the population only for validation after the estimation is complete.

Figure 19:
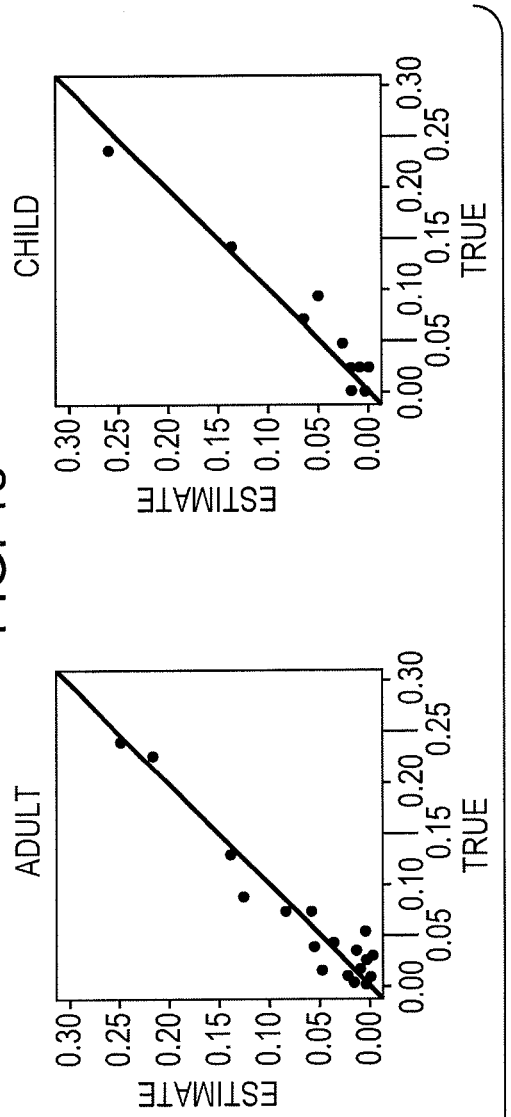
FIG. 19 shows validation in Tanzania of the verbal autopsy methods with multiple causes of death proposed by King and Lu (2007) (referenced below)

The results for adults appear in the left graph in FIG. 19. As with the China data, both the direct estimate on the horizontal axis and the estimate on the vertical axis are measured with error. In this very different context, the fit is approximately the same as for the China data. The median standard error (not shown) is, as for China, 11% higher than the direct sample estimate.

The data set on children has 453 hospital observations, 42 population observations, 31 symptoms, and 14 causes of death. FIG. 19 also includes these estimates (on the right). Even in this smaller sample, the fit between the direct estimate on the horizontal axis and the estimate from the verbal autopsy method on the vertical axis is still very close.

Five interpretations of this approach are now offered. First, the key assumption of the method connecting the two samples is that $P(S|D)=P^h(S|D)$. This assumption would fail for example for symptoms that doctors make relatives more aware of in the hospital; following standard advice for writing survey questions simply and concretely can eliminate many of these issues. Another example would be if hospitals keep patients alive for certain diseases longer than they would be kept alive in the community, then they may experience different symptoms. In these examples, and others, an advantage of this approach is that researchers have the freedom to drop symptoms that would seem to severely violate the assumption.

Second, since S contains K dichotomous variables and thus $2^K$ symptom profiles, $P(S)$ and $P(S|D)$ have $2^K$ rows, which take the role of "observations" in this linear expression. By analogy to linear regression, where more observations make for more efficient estimates (i.e., with lower variances), it can be clearly seen here that having additional symptoms that meet the assumptions of verbal autopsy studies will decrease the variance, but not affect the bias, of the estimates of cause-specific mortality.

Third, when the number of symptoms is large, direct tabulation can produce an extremely sparse matrix for $P(S)$ and $P(S|D)$. For example, the data from China introduced above have 56 symptoms, and so it is necessary to sort the n=1,074 observations collected from the population into $2^{56}$ categories, which number more than 72 quadrillion. Direct tabulation in this case is obviously infeasible. Instead, an easy computational solution may be applied to this problem based on a variant of kernel smoothing, which involves using subsets of symptoms, solving Equation 10 for each, and averaging. The procedure produces statistically consistent estimates.

Fourth, a reasonable question is whether expert knowledge from physicians or others could somehow be used to improve the estimation technique. This is indeed possible, via a Bayesian extension of the approach also implemented. However, in experimenting with the methods with verbal autopsy researchers, few were found who were sufficiently confident of the information available to them that they would be willing to add Bayesian priors to the method described here. Accordingly, a full Bayesian method is not developed here, but it may be noted that if accurate prior information does exist in some application and were used, it would improve the estimates offered by the approach described herein.

Finally, the new approach represents a major change in perspective in the verbal autopsy field. The essential goal of the existing approach is to marshal the best methods to use S to predict D. The idea is that if one can only nail down the "correct" symptoms, and use them to generate predictions with high sensitivity and specificity, one can get the right answer. There are corrections for when this fails, of course, but the conceptual perspective involves developing a proxy for D. That proxy can be well chosen symptoms or symptom profiles, or a particular aggregation of profiles as $\hat{D}$. The existing literature does not seem to offer methods for highly accurate predictions of D, even before the difficulties in ascertaining the success of classifiers are accounted for. An alternative approach as described above would also work well if symptoms or symptom profiles are chosen well enough to provide accurate predictions of D, but accurate predictions are unnecessary. In fact, choosing symptoms with higher sensitivity and specificity would not reduce bias in the approach, but in the existing approach they are required for unbiasedness except for lucky mathematical coincidences.

Instead of serving as proxies, symptoms in the new approach are only meant to be observable implications of D, and any subset of implications are fine. They need not be biological assays or in some way fundamental to the definition of the disease or injury or an exhaustive list. Symptoms need to occur with particular patterns more for some causes of death than others, but bigger differences do not help reduce bias (although they may slightly reduce the variance). The key assumption of this approach is $P(S|D)=P^h(S|D)$. Since S is entirely separable into individual binary variables, one is at liberty to choose symptoms in order to make this assumption more likely to hold. The only other criteria for choosing symptoms, then, is the usual rules for reducing measurement error in surveys, such as reliability, question ordering effects, question wording, and ensuring that different types of respondents interpret the same symptom questions in similar ways. Other previously used criteria, such as sensitivity, specificity, false positive or negative rates, or other measures of predictability, are not of as much relevance as criteria for choosing symptom questions.

By reducing the assumptions necessary for valid inference and making it possible to model all diseases simultaneously, the methods introduced here make it possible to extract considerably more information from verbal autopsy data, and as a result can produce more accurate estimates of cause-specific mortality rates.

Until now, the most successful method may have been physician review, which can be expensive as it usually involves approximately three physicians, each taking 20-30 minutes to review each death. Scholars have worked hard, and with some success, at increasing inter-physician reliability for individual studies. However, since formalizing and systematizing the rules any group of physicians use has been difficult, the cross-study reliability of this technique has remained low. Attempts to formalize physician reviews via expert algorithms are reliable by design, but appear to have lower levels of validity, in part because many diseases are not modeled explicitly. Data-derived (i.e., parametric statistical) algorithms are also easily replicable, but they have suffered from low levels of agreement with verified causes of death and are complicated for large J and in practice the choice of model has varied with every application.

Since this approach makes physician reviews, expert algorithms, and parametric statistical models unnecessary, it costs considerably less to implement and is much easier to replicate in different settings and by different researchers. The resulting increased accuracy of the relatively automated statistical approach, compared to existing methods which require many more ad hoc human judgments, is consistent with a wide array of research in other fields.

Even with the approach offered here, many issues remain. For example, to estimate the distribution of death by age, sex, or condition with these methods requires separate samples for each group. To save money and time, the methods developed here could also be extended to allow covariates, which would enable these group-specific effects to be estimated simultaneously from the same sample. In addition, scholars still need to work on reducing errors in eliciting symptom data from caregivers and validating the cause of death. Progress is needed on procedures for classifying causes of death and statistical procedures to correct for the remaining misclassifications, and on question wording, recall bias, question ordering effects, respondent selection, and interviewer training for symptom data. Crucial issues also remain in choosing a source of validation data for each study similar enough to the target population so that the necessary assumptions hold, and in developing procedures that can more effectively extrapolate assumptions from hospital to population via appropriate hospital subpopulations, data collection from community hospitals, or medical records for a sample of deaths in the target population.

The details of the estimation strategy are now described. Instead of trying to use all $2^K$ symptoms simultaneously, which will typically be infeasible given commonly used sample sizes, it is recognized below that only full rank subsets larger than J with sufficient data are required. Many subsets of symptoms are sampled, P(D) estimated in each, and the results averaged (or, if prior information is available, average using weights). Subsets may be chosen by drawing directly from the $2^K$ symptom profiles, but in this example the convenient approach of randomly drawing B<K symptoms is used, which is indexed as I(B), and the resulting symptom sub-profile is used. This procedure also has a statistical advantage in that it is mathematically equivalent to imposing a version of kernel smoothing on an otherwise highly sparse estimation task. (More advanced versions of kernel smoothing might improve these estimates further.)

$P(S_{I(B)})$ is estimated using the population data, and $P(S_{I(B)}|D)$ using the hospital data. Denote $Y=P(S_{I(B)})$ and $X=P(S_{I(B)}|D)$, where Y is of length n, X is n×J, and n is the subset of the $2^B$ symptom profiles that were observed. $P(D) \equiv \beta$ is observed by regressing Y on X under the constraint that elements of $\beta$ fall on the simplex. The subset size B should be chosen to be large enough to reduce estimation variance (and so that the number of observed symptom profiles among the $2^B$ possible profiles is larger than J) and small enough to avoid the bias that would be incurred from sparse counts used to estimate of elements of $P(S_{I(B)}|D)$. Missing data may be handled by deleting incomplete observations within each subset, by model-based imputation, or in any other suitable manner. Although cross-validation can generate optimal choices for B, estimates of P(D) are found to be relatively robust to choices of B within a reasonable range. In some applications, nonlinear optimization procedures may be used to estimate P(D) directly, but in other applications this approach tends to be sensitive to starting values, such as when J is large. As an alternative, in some applications the following estimation procedure may be used, which tends to be much faster, more reliable, and accurate in practice.

The following two steps are repeated for each different subset of symptoms and then average the results. The two steps involve reparameterization, to ensure $\Sigma\beta_j=1$, and stepwise deletion, to ensure $\beta_j>0$.

To reparameterize: (a) To impose a fixed value for some cause of death, $\Sigma\beta_j=c$, rewrite the constraint as $C\beta=1$, where C is a J-row vector of 1/c. When none of the elements of $\beta$ are known a priori, c=1. When some elements $\beta_i$, such as from another data source, are known, the constraint on the rest of $\beta$ changes to $\Sigma_{j \neq i}\beta_j=c=1-\beta_i$. (b) Construct a J−1×J matrix A of rank J−1 whose rows are mutually orthogonal and also orthogonal to C, and so $CA^{\cdot}=0$ and $AA^{\cdot}=I_{J-1}$. A Gram-Schmidt orthogonalization gives us a row-orthogonal matrix G whose first row is C, and the rest is A. (c) Rewrite the regressor as X=ZA+WC, where Z is n×J−1, W is n×1, and (W, Z)G=X. Under the constraint $C\beta=1$, one has $Y=X\beta=ZA\beta+WC\beta=Z\gamma+W$, where $\gamma=A\beta$, and $\gamma$ is a J−1 vector. (d) Obtain the least square estimate $\hat{\gamma}=(Z^{\cdot}Z)^{-1}Z^{\cdot}(Y-W)$. (e) The equality constrained $\beta$ is then $\hat{\beta}=G^{-1}\gamma^*$, where G=(C, A), a J×J row-orthogonal matrix derived above, and $\gamma^*=(1,\hat{\gamma})$. This ensures that $C\hat{\beta}=1$. Moreover, $Cov(\hat{\beta})=G^{-1}Cov(\gamma^*)(G^{\cdot})^{-1}$.

For Stepwise deletion: (a) To impose normegativity, find the $\hat{\beta}_j<0$ whose associated t-value is the biggest in absolute value among all $\hat{\beta}<0$. (b) Remove the $j^{th}$ column of the regressor X, and go to the reparameterization step again to obtain $\hat{\beta}$ with the jth element coerced to zero.

Finally, the estimate of P(D) can be obtained by averaging over the estimates based on each subset of symptoms. The associated standard error can be estimated by bootstrapping over the entire algorithm. Subsetting is required because of the size of the problem, but because S can be subdivided and the existing assumption $P(S|D)=P^h(S|D)$ implies $P(S_{I(B)}|D)=P^h(S_{I(B)}|D)$ in each subset, no bias is introduced. In addition, although the procedure is statistically consistent (i.e., as n→∞ with K fixed) the procedure is approximately unbiased only when the elements of P(S|D) are reasonably well estimated; subsetting (serving as a version of kernel smoothing) has the advantage of increasing the density of information about the cells of this matrix, thus making the estimator approximately unbiased for a much smaller and reasonably sized sample. Through extensive simulations it may be seen that this procedure is approximately unbiased, and robust even for small sample sizes.

Advantages of the Principles Discussed Herein

The techniques discussed herein for analyzing source data such as textual elements and extracting a specific type of systematic information from it requires no modeling assumptions, no modeling choices, and no complicated statistical approaches, and lets allows for applications in which theoretical questions may be posed and answered. Techniques operating according to these principles also require far less work than projects based entirely on individual classification and can be done both fast and in real time. Individual-level classification is not a result of some illustrative techniques described herein, and so these techniques are not useful for all tasks, but numerous quantities of interest, from separate subdivisions of the population or different populations, can be estimated by these techniques. Techniques described herein do benefit from careful efforts to properly define categories and to individually classify a small sample of elements.

Exemplary Implementations of the Techniques Discussed Above

The techniques described above may be implemented in any suitable manner, including, for example, as one or more software packages executing on a computing device(s) or system or as an electronic device specifically programmed or "hard-wired" to carry out tasks associated with these techniques. So components such as digital processors, field-programmable gates arrays and application-specific integrated circuits may be configured to perform the methods discussed above, acting upon a target data population provided as an input of digital data words from an electronic source, such as, for example, web crawling software configured to crawl a blog or blogs specified or of a specified type.

Figures 20A, 20B:
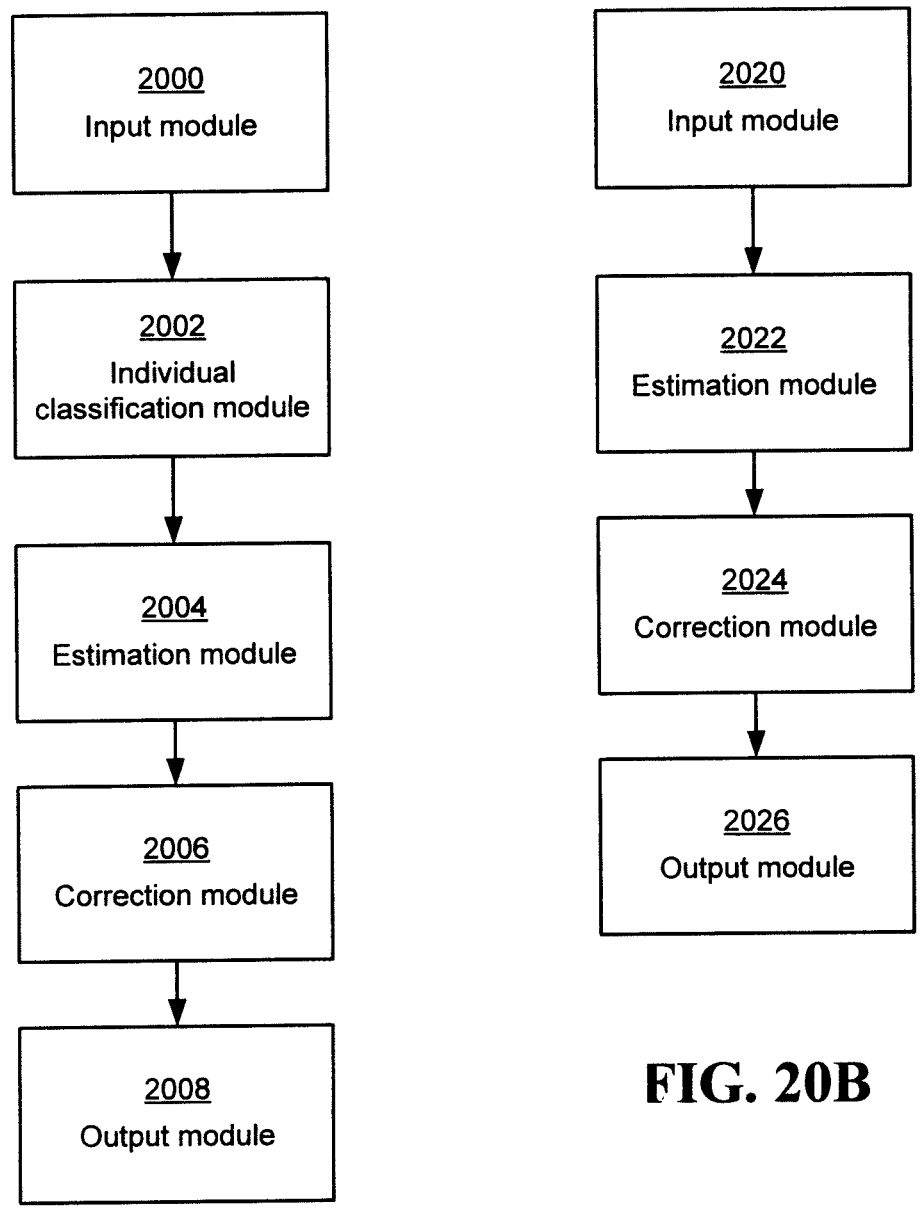
FIGS. 20A and 20B are schematic views of interactions of software modules that may implement some of the techniques described herein.

FIGS. 20A and 20B show different functional components which may be implemented by embodiments of the invention, though it should be appreciated that the set of functional components shown in FIGS. 20A and 20B is merely exemplary and that some implementations may employ greater or fewer components than shown. In the examples of FIGS. 20A and 20B, reference is made to "modules." As stated above, a module is a structural component of a system which performs a specific operational role, however instantiated, which may be a portion of or an entire software element (e.g., a function or a discrete process). A module may comprise computer-executable instructions, and may be encoded on a computer storage medium. Modules may be executed in parallel or serially, as appropriate, and may pass information between one another using a shared memory on the computer on which they are executing, using a message passing protocol or in any other suitable way.

FIG. 20A shows one set of functional components that may be employed by an exemplary implementation of a technique for performing statistically consistent and approximately unbiased estimation of a distribution of digital data elements in categories, within the context of such a system providing a useful, actionable report on the analysis of data mined from one or more text sources. The modules comprise an input module 2000 to accept or retrieve as input a source digital data set comprising a plurality of elements. The input module 2000 may be implemented in any suitable manner, such as by the web crawler described above, as a surveying apparatus, as a passive module accepting input provided by another automated process and/or from a computer storage medium, or in any other suitable manner. The data set accepted by the input module 2000 may be accepted in any suitable format, such as via any suitable data structure or as an unstructured (but presumably tagged) stream of data. Individual classification module 2002 is also shown in FIG. 20A for performing individual classification on a subset of elements to determine a labeled set, as described above, based on input comprising elements of the set of data accepted by input module 2000. Individual classification in module 2002 may be done in any suitable manner, including any suitable automated process (e.g., a process which performs searches for words or words stems in a provided lexicon and bases classification decisions on the word/word stem findings). Estimation module 2004, operating according to the techniques described above, accepts as input the individual classifications from the individual classification module 2002 and performs, in any suitable manner including any one or more of the techniques described above, an estimation of a distribution of elements of the source data in a set of categories. A correction module 2006 may accept as input digital values for the estimation calculated by the estimation module 2004, and may also accept the data set from the input module 2000, and performs correction of the estimations determined by the estimation module 2004. The correction module 2006 may, for example, implement the SIMEX procedure described above and shown in FIG. 15, or operate in any other suitable manner. Output module 2008 accepts as input digital values indicating corrected estimates from correction module 2006 and provides results to a user or any suitable interpretation module for using the results in any suitable manner (e.g., modifying a product in response to an estimated distribution of consumer opinion, as discussed above). Providing the results may comprise, for example, manipulating a display device to present the results to the user in a user interface, or may comprise encoding digital values representing the results on a computer storage medium.

FIG. 20B shows one set of functional components that may be employed by an exemplary implementation of a technique for performing correction of an aggregation of individual classification by conventional methods to determine a statistically consistent and approximately unbiased estimation of a distribution of elements in categories, within the context of a system providing a useful, actionable report on the analysis of data mined from one or more text sources. The modules comprise an input module 2020 to accept or retrieve as input a source data set comprising a plurality of elements, as well as digital values indicating an estimated distribution of elements in the overall source data set. The input module 2020 may be implemented in any suitable manner, such as by a passive module accepting input provided by an automated process (e.g., a process which performs searches for words or word stems in a provided lexicon and bases classification decisions on the word/word stem findings) and/or from a computer storage medium, or in any other suitable manner. Estimation module 2022, operating according to the techniques described above, accepts as input the individual classifications of the conventional individual classifier (accepted as input by input module 2020 as part of the source data set) and performs, in any suitable manner, an estimation of a distribution of elements of the source data in categories. A correction module 2024 accepts as input digital values indicating the distribution of elements calculated by the estimation module 2022, and performs correction of the estimations in any suitable manner, such as through the SIMEX procedure described above and shown in FIG. 15, or may operate in any other suitable manner. Output module 2024 accepts digital values indicating these corrected results, and provides the results to a user or any suitable interpretation module for using the results in any suitable manner (e.g., modifying a product in response to an estimated distribution of consumer opinion, as discussed above). Providing the results may, for example, comprise manipulating a display device to present the results to the user in a user interface, or may comprise encoding digital values representing the results on a computer storage medium.

It should be appreciated that the illustrative modules shown in FIGS. 20A and 20B are merely exemplary of the types of modules that may be implemented to employ the techniques described herein, and that other modules and combinations of modules are possible.

Figure 21:
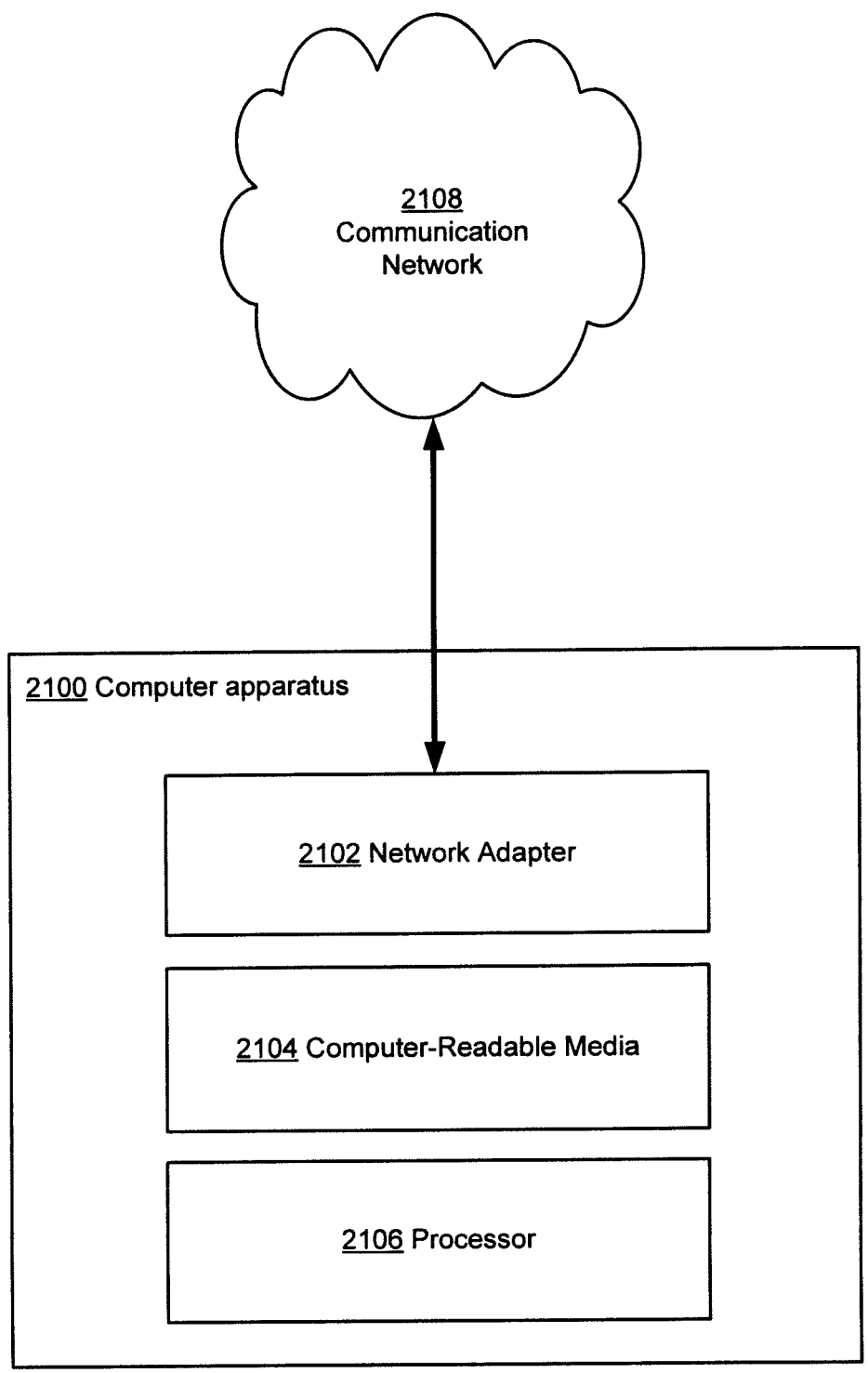
FIG. 21 is a schematic view of an illustrative computer apparatus which may be used in accordance with embodiments of the invention.

The aspects of the present invention described herein, including the functional modules shown in FIGS. 20A and 20B, can be implemented on any of numerous computer apparatuses and computer system configurations and are not limited to any particular type of configuration. For example, techniques operating according to some or all of the principles discussed herein may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system. FIG. 21 illustrates one exemplary implementation in the form of a computer apparatus 2100 that may be used in a system implementing the techniques described herein, although others are possible. Further, it should be appreciated that FIG. 21 is intended neither to be a depiction of necessary components for a computing device to operate as a computer apparatus, nor a comprehensive depiction.

FIG. 21 shows a computer apparatus 2100 that may be coupled to a communication network 2108, but it should be appreciated that embodiments of the invention may operate on a simpler computer system not coupled to a network. Computer apparatus 2100 may be any suitable computing device for sending and receiving data over a communication network 2108, such as a mainframe, a server, a desktop personal computer, and a laptop personal computer, among others. It should be appreciated that while computer apparatus 2100 is shown as a single apparatus, embodiments of the invention may execute on a computer apparatus 2100 that may be distributed across multiple computers coupled via any communication medium (e.g., a network) in any way.

Communication network 2108 can be any suitable wired and/or wireless communication medium or media for exchanging data between two or more computers (e.g., a server and a client), including the Internet.

Computer apparatus 2100 comprises network adapter 2102 to facilitate communication with other devices connected to communication network 2108. Computer apparatus 2100 also comprising at least one computer-readable medium 2104 for storing data to be processed and/or instructions to be executed by a processor 2106. Processor 2106 enables processing of data and execution of instructions. The data and instructions may be stored on the at least one computer-readable medium 2104 and may, for example, enable communication between components of the computer apparatus 2100.

In accordance with some embodiments of the invention, the data and instructions stored on the at least one computer-readable medium 2104 may comprise a data store comprising labeled and unlabeled sets of elements and instructions to carry out a method of determining a distribution of unlabeled elements among categories, as described above. The data and instructions may instead comprise or may further comprise data on categorization error rates among labeled elements and instructions for correcting that error when determining a distribution of unlabeled elements among categories, such at the SIMEX method described above.

Computer apparatus 2100 may implement the techniques described above in any suitable manner. For example, in some embodiments, computer apparatus 2100 may be a web server hosting one or more web pages, scripts, and other web site elements which implement the techniques described above such that these techniques may be offered via a web site and over communication network 2108 (e.g., the Internet). In such embodiments, a business offering estimation and classification services may operate the web site and provide services via the techniques described here. Such a web site may, for example, accept as input from a client of the business the source data and provide to the client, via a web page, estimation results. In alternative embodiments, computer apparatus 2100 may be a server or other computing device operating in a business, laboratory, or other organization performing estimation and classification according to the techniques described herein, and may operate on any source data provided, such as information provided by a client or information generated by research tasks. In such embodiments, the computer apparatus 2100 may execute software operating according to the techniques discussed herein which was either developed by the business, laboratory, or other organization, or which was provided by a business or other organization providing estimation and classification services. In further alternative embodiments, computer apparatus 2100 may be a personal computer or other computing device executing software implementing the techniques described herein but which is itself not affiliated with a business, laboratory, or other organization. The software executing on the personal computer or other computing device in this embodiment may have been, for example, provided by a business offering estimation and classification services.

Variations

Figure 22:
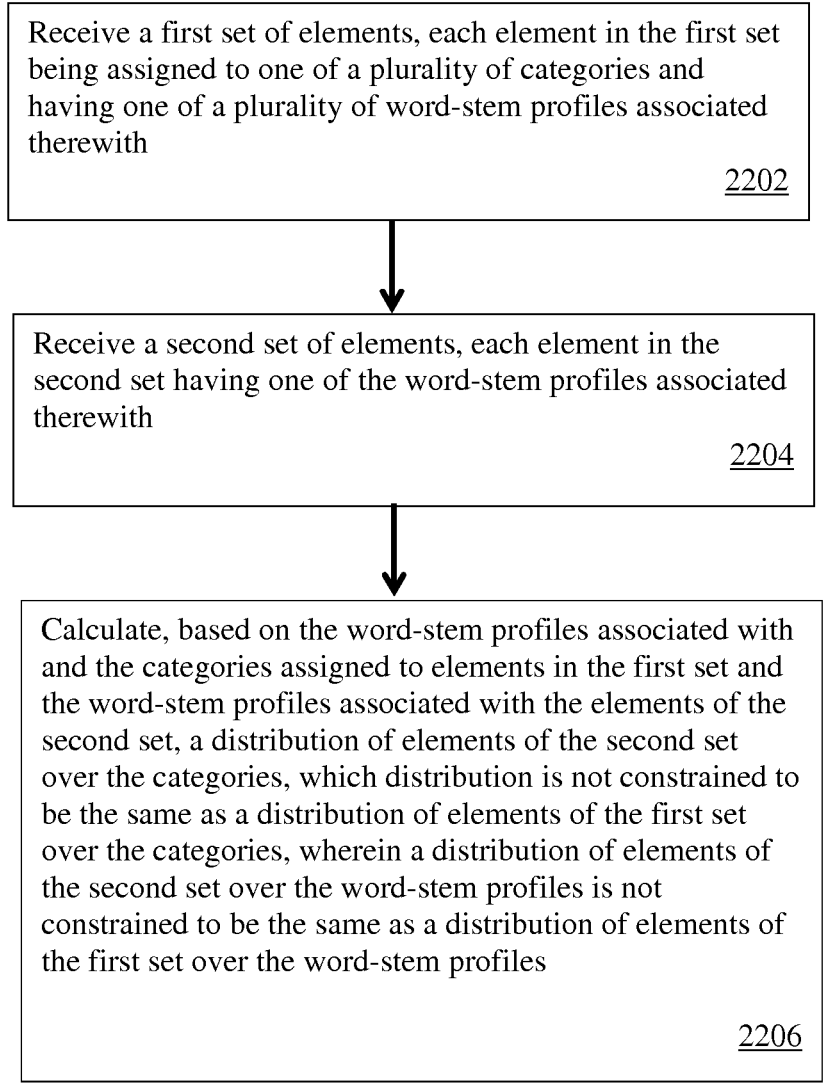
FIGS. 22 and 23 show flowcharts of calculating distributions of elements over input data in accordance with embodiments of the present invention.
Figure 23:
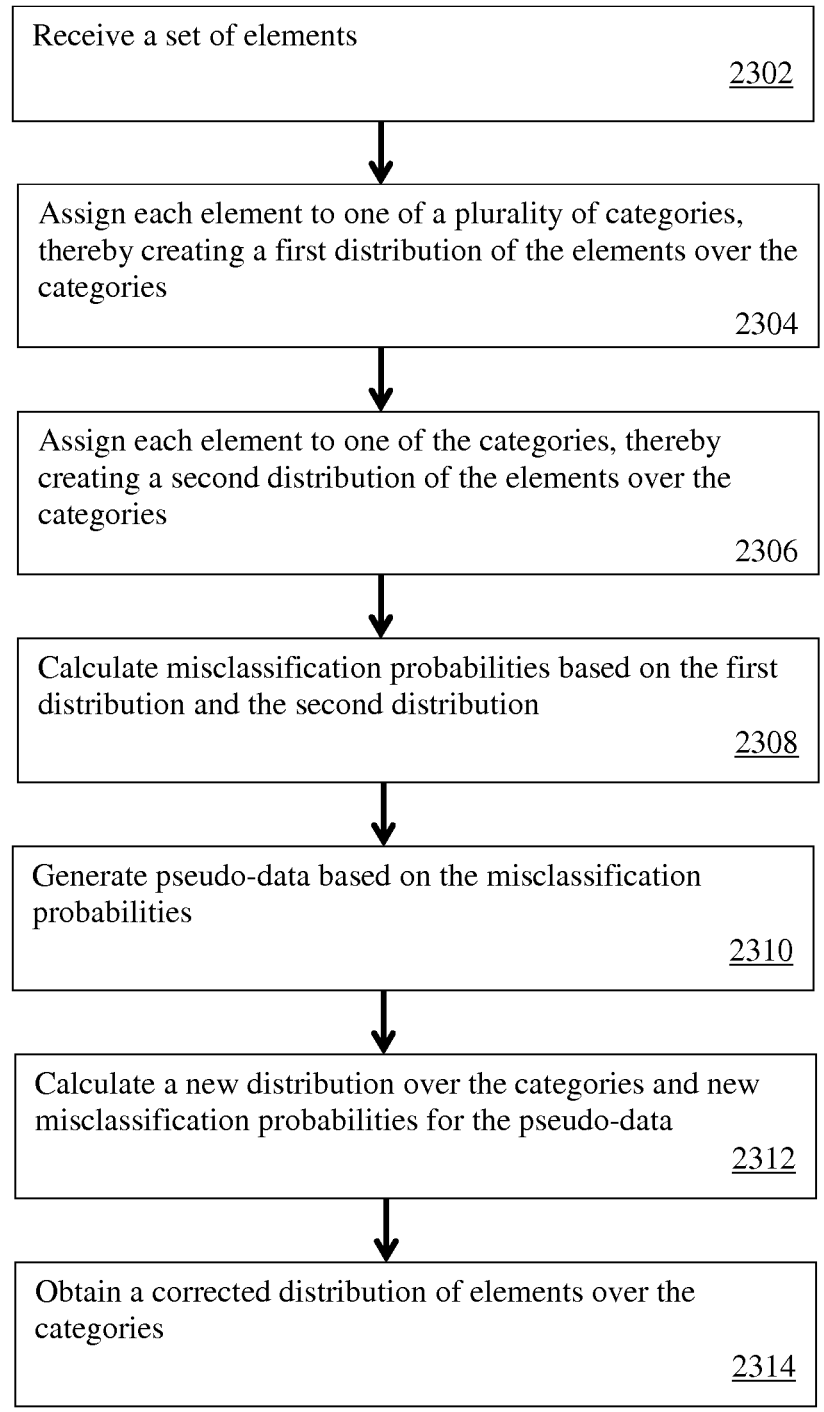

Having described several aspects of embodiments of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. FIG. 22 illustrates a method, for example, that begins with receiving a first set of elements, each element in the first set being assigned to one of a plurality of categories and having one of a plurality of content profiles associated therewith (step 2202). A second set of elements is received, each element in the second set having one of the content profiles associated therewith (step 2204). Based on the content profiles associated with and the categories assigned to elements in the first set and the content profiles associated with the elements of the second set, a distribution of elements of the second set over the categories is calculated, which distribution is not constrained to be the same as a distribution of elements of the first set over the categories, wherein a distribution of elements of the second set over the content profiles is not constrained to be the same as a distribution of elements of the first set over the content profiles (step 2206). In another embodiment, as shown in FIG. 23, a set of elements is received (step 2302) and each element is assigned to one of a plurality of categories, thereby creating a first distribution of the elements over the categories (step 2304). Each element is assigned to one of the categories, thereby creating a second distribution of the elements over the categories (step 2306). Misclassification probabilities are calculated based on the first distribution and the second distribution (step 2308). Pseudo-data is generated based on the misclassification probabilities (step 2310). A new distribution over the categories and new misclassification probabilities for the pseudo-data are calculated (step 2312), and corrected distribution of elements over the categories is obtained (step 2314).

What is claimed is:

1. A computer-implemented method, comprising:
   (a) receiving a first set of elements, each element in the first set being assigned to one of a plurality of categories and having one of a plurality of word-stem profiles associated therewith;
   (b) receiving a second set of elements, each element in the second set having one of the word-stem profiles associated therewith; and
   (c) using a processor to calculate, based on the word-stem profiles associated with and the categories assigned to elements in the first set and the word-stem profiles associated with the elements of the second set, a distribution of elements of the second set over the categories, which distribution is not constrained to be the same as a distribution of elements of the first set over the categories, wherein a distribution of elements of the second set over the word-stem profiles is not constrained to be the same as a distribution of elements of the first set over the word-stem profiles.

2. The method of claim 1 wherein a relation between a distribution of elements of the second set over the word-stem profiles and the distributions of elements of the second set over the categories is constrained to be the same as a relation between a distribution of elements of the first set over the word-stem profiles and the distributions of elements of the first set over the categories.

3. The method of claim 1 wherein the distribution of elements of the second set over the categories is unbiased.

4. The method of claim 1 further comprising storing the distribution of elements of the second set over the categories on a computer storage medium.

5. The method of claim 1 wherein the elements comprise text.

6. The method of claim 5 wherein the word-stem profiles indicate whether certain words occur in the text.

7. The method of claim 5 wherein the word-stem profiles indicate whether certain combinations of words occur in the text.

8. The method of claim 5 wherein the text is unstructured.

9. The method of claim 1 further comprising analyzing at least some of the elements of the first set or the second set to obtain the word-stem profiles associated with said elements.

10. The method of claim 1 wherein step (c) comprises:
  (i) creating, based on the word-stem profiles associated with and the categories assigned to elements in the first set, a model for assigning a category to an element based on the element's word-stem profile, and further calculating misclassification probabilities associated with the model;
  (ii) applying the model to the elements of the second set, thereby assigning each element of the second set to one of the categories;
  (iii) determining a raw distribution of elements in the second set over the categories; and
  (iv) correcting the raw distribution of elements in the second set based on the misclassification probabilities, thereby calculating a corrected distribution of elements in the second set over the categories.

11. The method of claim 10 wherein step (i) comprises dividing the first set into a training set and a test set, creating the model based on the word-stem profiles associated with and the categories assigned to elements of the training set, applying the model to the test set, and calculating misclassification probabilities based on the categories assigned to the element of the test set.

12. The method of claim 1 wherein the distribution of elements of the second set over the categories is calculated without assigning the elements of the second set to the categories individually.

13. The method of claim 1 wherein step (c) comprises:
  (i) determining, based on a distribution of elements of the first set over the word-stem profiles and the distribution of elements in the first set over the categories, a relation between distributions over the word-stem profiles and distributions over the categories;
  (ii) determining a distribution of elements in the second set over the word-stem profiles; and
  (iii) calculating, based on the relation and the distribution of elements in the second set over the word-stem profiles, a distribution of elements in the second set over the categories.

14. The method of claim 13 wherein the relation is expressed as a matrix of conditional probabilities, the distribution of elements in the second set over the word-stem profiles is expressed as a vector, and the distribution of elements in the second set over the categories is calculated by multiplying the matrix to the vector.

15. The method of claim 13 further comprising calculating a probability that a particular element of the second set belongs to a particular category based on the word-stem profile of said element, the relation, and the distribution of elements in the second set over the categories.

16. A computer-implemented method, comprising:
  (a) receiving a set of elements;
  (b) assigning each element to one of a plurality of categories, thereby creating a first distribution of the elements over the categories;
  (c) independently of step (b), assigning each element to one of the categories, thereby creating a second distribution of the elements over the categories;
  (d) using a processor, calculating misclassification probabilities based on the first distribution and the second distribution;
  (e) generating pseudo-data based on the misclassification probabilities;
  (f) calculating a new distribution over the categories and new misclassification probabilities for the pseudo-data; and
  (g) obtaining a corrected distribution of elements over the categories,
  wherein step (g) comprises repeating steps (e) and (f), thereby obtaining a series of distributions over the categories, and extrapolating the series of distributions backwards.

* * * * *